(12) United States Patent
Nadaoka et al.

(10) Patent No.: US 10,724,205 B2
(45) Date of Patent: Jul. 28, 2020

(54) FRONT LOADER AND WORKING MACHINE

(71) Applicant: KUBOTA CORPORATION, Osaka (JP)

(72) Inventors: Ryuichi Nadaoka, Osaka (JP); Yuta Ozeki, Osaka (JP); Masaki Abe, Osaka (JP); Koshiro Hirakawa, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 16/227,537

(22) Filed: Dec. 20, 2018

(65) Prior Publication Data

US 2019/0194903 A1 Jun. 27, 2019

(30) Foreign Application Priority Data

Dec. 22, 2017 (JP) ................. 2017-247021
Dec. 22, 2017 (JP) ................. 2017-247022
Oct. 25, 2018 (JP) ................. 2018-200960

(51) Int. Cl.
*E02F 3/36* (2006.01)
*E02F 3/34* (2006.01)
*G05G 1/04* (2006.01)
*G05G 5/06* (2006.01)
*G05G 9/00* (2006.01)
*F16H 21/54* (2006.01)

(52) U.S. Cl.
CPC .............. *E02F 3/3631* (2013.01); *E02F 3/34* (2013.01); *E02F 3/3672* (2013.01); *F16H 21/54* (2013.01); *G05G 1/04* (2013.01); *G05G 5/06* (2013.01); *G05G 9/00* (2013.01); *G05G 2505/00* (2013.01)

(58) Field of Classification Search
CPC .................................. E02F 3/36; E02F 3/3631
USPC ......................................................... 414/723
See application file for complete search history.

(56) References Cited

U.S. PATENT DOCUMENTS

| 5,685,689 | A | 11/1997 | Schneider et al. |
| 5,692,855 | A | 12/1997 | Burton et al. |
| 7,674,085 | B2 * | 3/2010 | Bystrom ............... E02F 3/3668 414/723 |

FOREIGN PATENT DOCUMENTS

| AU | 2008 243058 A1 | 5/2009 |
| EP | 1 288 378 | 3/2003 |
| JP | 2013241727 | 12/2013 |
| WO | 2006 036103 A1 | 4/2006 |

* cited by examiner

*Primary Examiner* — Ronald P Jarrett
(74) *Attorney, Agent, or Firm* — Greenblum & Bernstein, P.L.C.

(57) ABSTRACT

A front loader includes a working tool and an attachment body to which the working tool is attached, including a lock pin configured to attach and fix the working tool, a lock lever configured to move the lock pin between a releasing position and an attaching position, and a latching portion having a retaining mechanism configured to retain the lock lever at the releasing position and another mechanism configured to move the lock lever to the attaching position.

19 Claims, 38 Drawing Sheets

FRONT LOADER AND WORKING MACHINE

CROSS-REFERENCE TO RELATED APPLICATIONS

The present application claims priority under 35 U.S.C. § 119 to Japanese Patent Application No. 2017-247021, filed Dec. 22, 2017, to Japanese Patent Application No. 2017-247022, filed Dec. 22, 2017, and to Japanese Patent Application No. 2018-200960, filed Oct. 25, 2018. The contents of these applications are incorporated herein by reference in their entirety.

BACKGROUND OF THE INVENTION

Field of the Invention

The present invention relates to a front loader and a working machine having the front loader.

Description of Related Art

A front loader disclosed in Japanese Unexamined Patent Application Publication No. 2013-241727 has been conventionally known.

The front loader disclosed in Japanese Unexamined Patent Application Publication No. 2013-241727 has a lock mechanism configured to be switched between a state in which a working tool (a bucket) is attached to an attachment body (an attaching tool) (a locked state) and a state in which the working tool can be detached from the attachment body (an unlocked state). The switching between the locked state and the unlocked state is performed by swinging the lock lever to change the position thereof.

SUMMARY OF THE INVENTION

Problems to be Solved by the Invention

However, the lock mechanism disclosed in Japanese Unexamined Patent Application Publication No. 2013-241727 does not have a structure capable of keeping the lock lever in the unlocked state position when the working tool is detached from the attachment body.

Thus, the present invention intends to provide a front loader having a lock mechanism configured to keep the lock lever at the unlocked position when the working tool is detached from the attachment body and provide a working machine having the front loader.

Means of Solving the Problems

A front loader includes a working tool and an attachment body to which the working tool is attached, including a lock pin configured to attach and fix the working tool, a lock lever configured to move the lock pin between a releasing position and an attaching position, and a latching portion having a retaining mechanism configured to retain the lock lever at the releasing position and another mechanism configured to move the lock lever to the attaching position.

A front loader includes a working tool having a first engaging portion and an attachment body to which the working tool is attached, having a second engaging portion and including a lock pin configured to move between an attaching position to be engaged to the first engaging portion and the second engaging portion and a releasing position to be disengaged from the first engaging portion and the second engaging portion, a pushing member configured to push the lock pin toward the attaching position, a lock lever coupled to the lock pin and configured to be swung between a first position to set the lock pin at the releasing position and a second position to set the lock pin at the attaching position, a retaining member including a retaining portion configured to retain the lock lever at the first position, and a working tool detection lever including the latching portion configured to latch the lock lever at the first position and to be turned in a first direction in the disengaging of the working tool, the working tool detection lever releases the latching of the lock lever to the latching portion from a state where the lock lever is latched to the latching portion at the first position, and allows the retaining portion of the retaining member to retain the lock lever released from the latching.

A front loader includes a working tool having a first engaging portion and an attachment body to which the working tool is attached, having a second engaging portion and including a lock pin configured to move between an attaching position to be engaged to the first engaging portion and the second engaging portion and a releasing position to be disengaged from the first engaging portion and the second engaging portion, a pushing member configured to push the lock pin toward the attaching position, a lock lever coupled to the lock pin and configured to be swung between a first position to set the lock pin at the releasing position and a second position to set the lock pin at the attaching position, a retaining member including a retaining portion configured to retain the lock lever at the first position, and a working tool detection lever configured to be turned in a first direction in the disengaging of the working tool and to release the lock lever retained by the retaining portion from a state where the lock lever is retained at the first position by the retaining portion, and includes the latching portion configured to latch the lock lever released from the retaining.

A working machine includes the front loader mentioned above and a vehicle body supporting the front loader.

Effects of the Invention

According to the front loader and the working machine of one embodiment of the present invention, the lock lever can be kept in the unlocked position when the working tool is detached from the attachment body.

According to the front loader and the working machine according to one aspect of the present invention, when the working tool is detached from the attachment body, the working tool detecting lever is rotated in the first direction, and the lock lever is operated to release the engagement of the lock lever with respect to the engaging portion from the state where the lock lever is engaged with the engaging portion of the tool detection lever, and thus the lock lever released from the engagement can be held by the holding portion of the holding member.

In this manner, the lock lever can be held at the first position, which is the position in the unlocked state, by the holding portion.

According to the front loader and the working machine according to one aspect of the present invention, when the working tool is detached from the attachment body, the working tool detection lever rotates in the first direction, the lock lever moves the lock pin to the release position, the holding of the lock lever with respect to the holding portion can be released from the state held by the holding portion at the first position, and the lock lever from which the holding is released can be latched by the latching portion.

In this manner, the lock lever can be held at the first position, which is the position in the unlocked state, by the latching portion.

DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
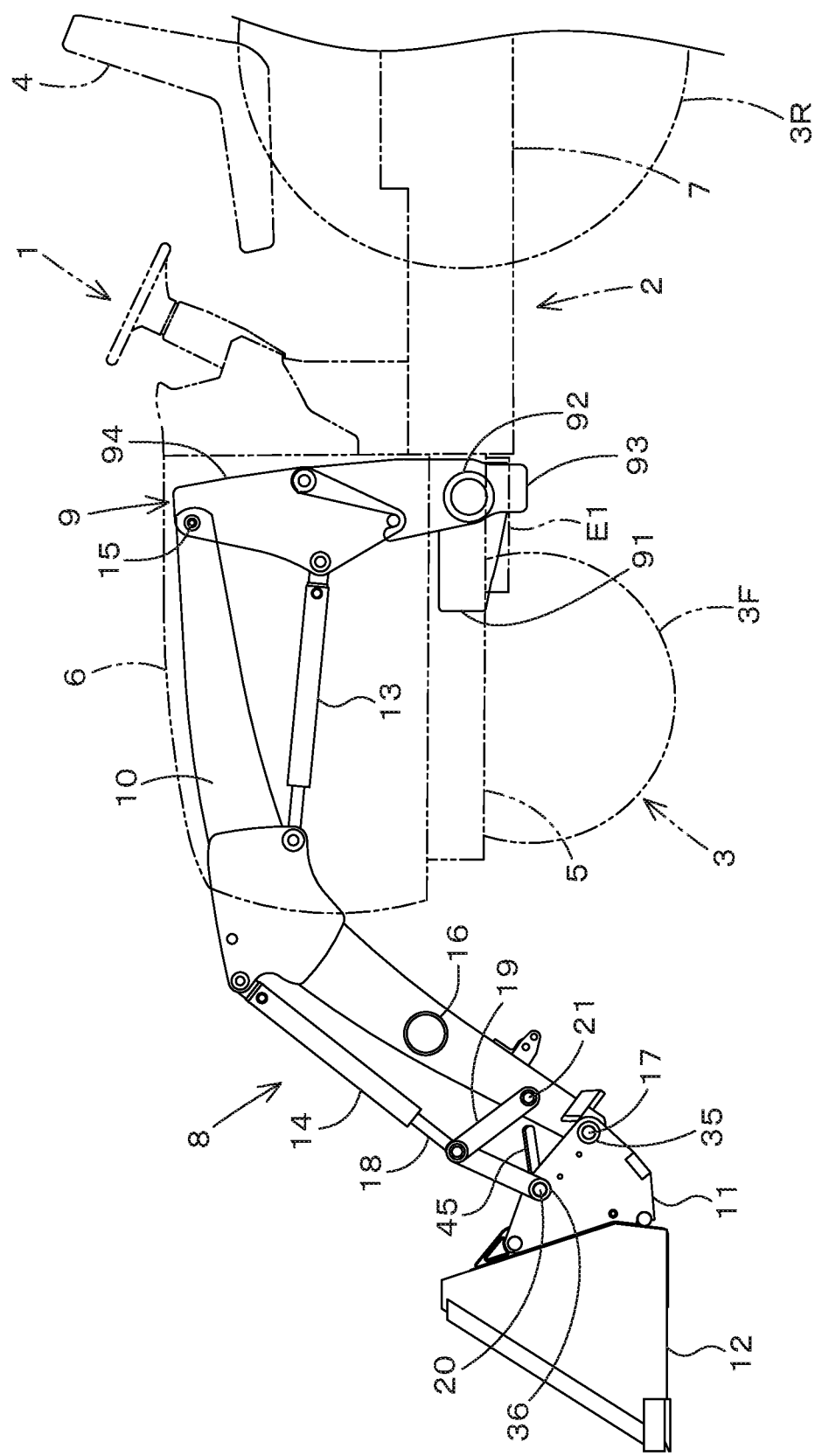
FIG. 1 is a side surface view illustrating a working machine according to one embodiment of the present invention.

The embodiments will now be described with reference to the accompanying drawings, wherein like reference numerals designate corresponding or identical elements throughout the various drawings. The drawings are to be viewed in an orientation in which the reference numerals are viewed correctly.

Hereinafter, embodiments of the present invention will be described with reference to the drawings.

FIG. 1 is a side view showing one embodiment of the working machine 1. In the case of the present embodiment, the working machine 1 is a tractor. However, the working machine 1 is not limited to a tractor, but may be another type of working machine (a working vehicle).

A front side (the left side of FIG. 1) of the operator seated on the operator seat 4 of the tractor (a working machine) 1 is referred to as the front, the rear side (the right side of FIG. 1) of the operator is referred to as the rear, the left side (a front surface side of FIG. 1) of the operator is referred to as the left, and the right side (a back surface side of FIG. 1) of the operator is referred to as the right.

Further, the horizontal direction (the depth direction in FIG. 1), which is a direction orthogonal to the front-rear direction of the working machine 1, will be described as the machine width direction. A direction away from the center in the width direction of the vehicle body and a direction away from the center in the machine width direction will be described as a machine outward direction, and a direction approaching the center in the machine width direction in the machine width direction will be described as a machine inward direction.

The tractor 1 is provided with a vehicle body 2 and a traveling device 3.

A operator seat 4 is provided on the upper portion of the vehicle body 2. An engine E1 is mounted on a front portion of the vehicle body 2. A front frame 5 extends in the front-rear direction at the front lower part of the vehicle body 2. A bonnet 6 covering the upper part of the engine E1 is mounted on the front frame 5.

On the rear portion of the vehicle body 2, a clutch housing, a transmission case 7 and the like are provided. The traveling device 3 includes a front wheel 3F provided at the front portion of the vehicle body 2 and a rear wheel 3R provided at the rear portion of the vehicle body 2.

On the vehicle body 2, a front loader 8 as a working device is mounted. The front loader 8 is supported on the front portion of the vehicle body 2.

The front loader 8 will be described below.

As shown in FIG. 1, the front loader 8 includes an attaching frame 9, a boom 10, an attachment body 11, a working tool 12, a boom cylinder 13, and a working tool cylinder 14.

The attaching frame 9 is provided on the left and right portions of the vehicle body 2, respectively. The attaching frame 9 has an attachment plate 91, a support body 92, a main frame 93, and a side frame 94.

The attachment plate 91 is attached to the left side and the right side of the vehicle body 2, respectively. The support body 92 projects outward from the left and right mounting plates 91, respectively.

The main frame 93 extends upward from the end portions on the vehicle body outer side of the left and right support bodies 92, respectively.

The side frame 94 extends upward from the main frame 93. A first pivot 15 extending in the machine width direction is provided on the upper portion of the side frame 94.

The boom 10 extends forward from the left and right sides of the vehicle body 2. The middle portion of the boom on the left side and the middle portion of the boom on the right side are connected by a connecting body 16. The base end side of the boom 10 is supported swingably about the first pivot 15 provided on the attachment frame 9 (a side frame 94). A second pivot 17 extending in the machine width direction is provided on the distal end side of the boom 10.

The boom cylinder 13 connects the side frame 94 and the boom 10 to each other. The boom 10 swings upward about the first pivot 15 by the extension of the boom cylinder 13 and swings downward around the first pivot 15 due to the shortening of the boom cylinder 13.

The attachment body 11 is swingably supported around the second pivot 17. The working tool 12 is detachably attached to the front portion of the attachment body 11. In a state in which the implement 12 is mounted on the attachment body 11, the attachment body 11 and the working tool 12 are integrally rotatable around the second pivot 17.

The proximal end side of the working tool cylinder 14 is connected to the middle portion of the boom 10. The distal end side of the implement tool cylinder 14 is connected to one end side of the push link 18 and the control link 19.

The other end side of the pushing link 18 is connected to the third pivot 20 provided on the attachment body 11. The other end side of the control link 19 is connected to the fourth pivot 21 provided on the distal end side of the boom 10.

In the case of this embodiment, the implement 12 is a bucket. Thus, the following description will be made assuming that the implement 12 is a bucket.

The bucket (the working tool) 12 performs a squeeze operation around the second pivot 17 by the extension of the working tool cylinder 14 and performs a dump operation around the second pivot 17 by shortening of the implement tool cylinder 14.

Figure 2:
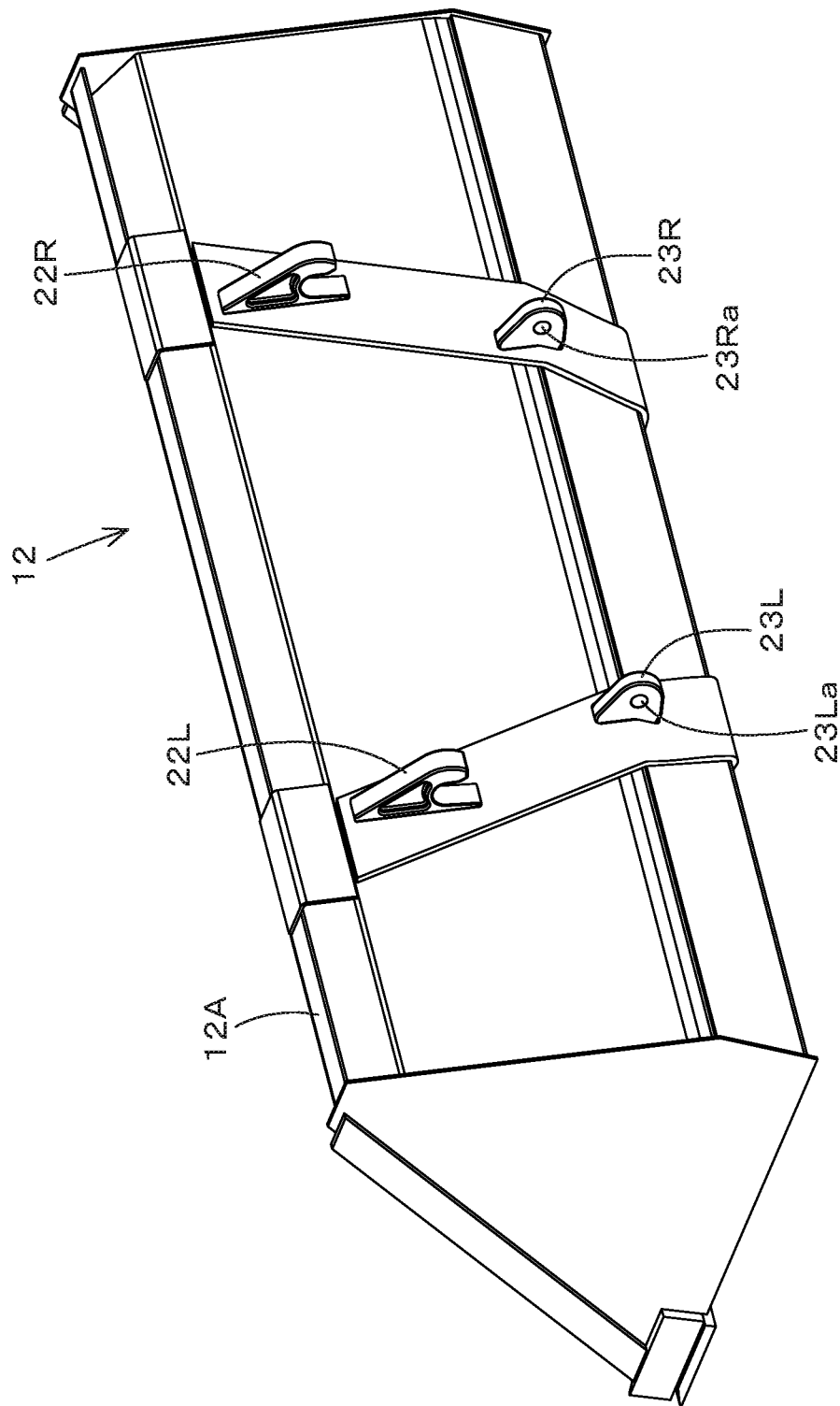
FIG. 2 is a back perspective view of a working tool (a bucket) according to the embodiment.

As shown in FIG. 2, the bucket 12 has a bucket body 12A, hooking portions 22L and 22R, and first engaging portions 23L and 23R.

The bucket body 12A is a portion for scooping (accommodating) earth and sand and the like.

The hooking portion 22L is provided on the left portion of the rear surface of the bucket body 12A. The hooking portion 22R is provided on the right portion of the rear surface of the bucket body 12A.

The hooking portions 22L and 22R are formed in a downward hook shape (a hook shape) and project rearward from the rear surface of the bucket body 12A. The hooking portion 22L and the hooking portion 22R are provided at the same height position.

The first engaging portion 23L is provided on the left portion of the rear surface of the bucket body 12A. The first engaging portion 23R is provided on the right portion of the rear surface of the bucket body 12A.

The first engaging portions 23L and 23R are flat plate-like in shape, one face oriented to the left and the other face toward the right. The first engaging portion 23L is positioned below the engaging portion 22L and inward (rightward) of the vehicle body. The first engaging portion 23R is positioned below the engaging portion 22R and inward (leftward) of the vehicle body.

The first engaging portions 23L and 23R protrude rearward from the rear surface of the bucket main body 12A. Through holes 23La and 23Ra are respectively formed in the first engaging portions 23L and 23R. The through holes 23La and 23Ra penetrate the first engaging portions 23L and 23R in the machine width direction.

The center of the through hole 23La formed in the first engaging portion 23L and the center of the through hole 23Ra formed in the first engaging portion 23R are arranged on the same straight line.

The rear portion of the first engaging portion 23L is formed in an arcuate surface centered on the center of the through hole 23La. The rear portion of the first engaging portion 23R is formed in an arcuate surface centered on the center of the through hole 23Ra.

Next, the attachment body 11 will be described. The front loader 8 includes three embodiments (first to third embodiments), and the front loader 8 of each embodiment has a configuration of the attachment body 11 different from each other.

FIG. 3 to FIG. 15 show the attachment body 11 of the first embodiment. FIG. 16 to FIG. 27 show the attachment body 11 of the second embodiment. FIG. 28 to FIG. 38 show the attachment body 11 of the third embodiment.

First, with reference to FIG. 3 to FIG. 15, the configuration of the attachment body 11 of the front loader 8 of the first embodiment will be described. In the following description of the first embodiment, the description of the configuration common to the second and third embodiments is shown in parentheses in the correspondence diagrams of the second and third embodiments.

The figure numbers (FIG. 16 to FIG. 27) described in the parentheses are correspondence diagrams in the second embodiment. FIG. 28 to FIG. 38 described in square brackets are correspondence diagrams in the third embodiment. In the second and third embodiments, the correspondence diagrams of FIG. 7 and FIG. 9 of the first embodiment are omitted since they are common to the first embodiment.

Figure 3:
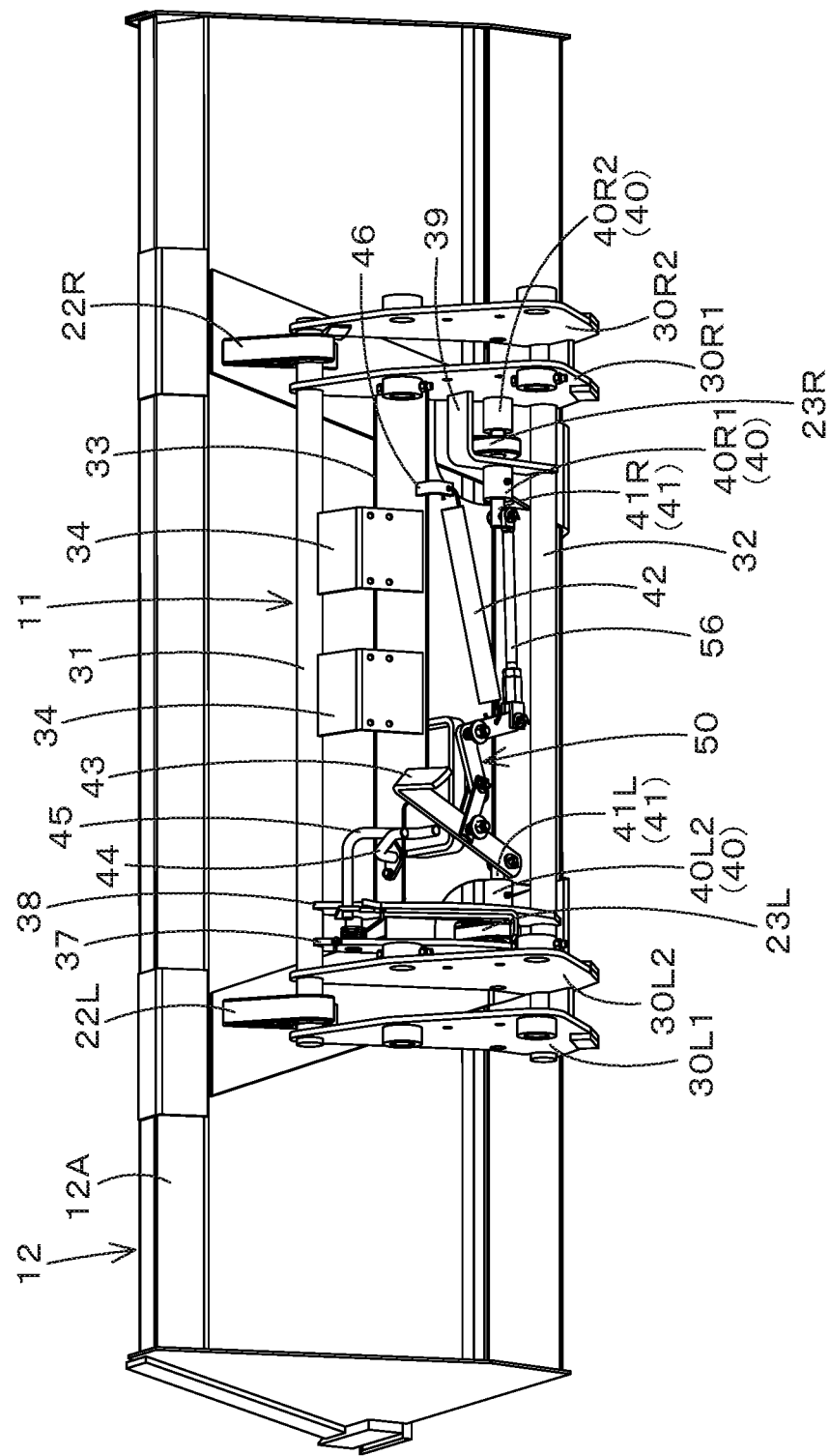
FIG. 3 is a back surface perspective view illustrating a state (an attaching state) where the working tool is attached to an attachment body according to the embodiment.
Figure 15:
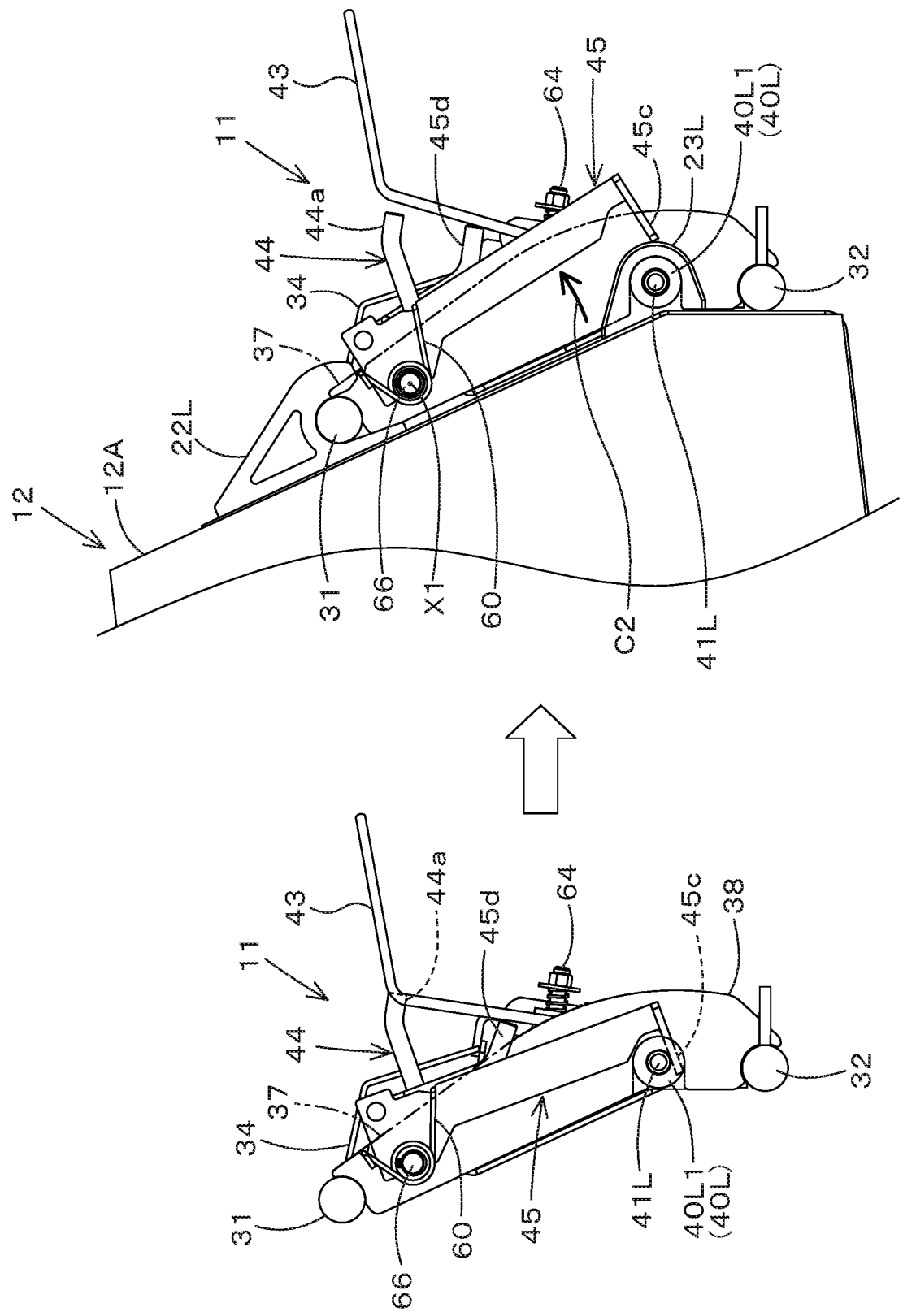
FIG. 15 is a side view illustrating a detaching state (a left drawing) and an inserting state (a right drawing) of the working tool according to the embodiment.

In the second embodiment, the correspondence diagrams of FIG. 3 and FIG. 15 of the first embodiment are omitted because they are not indispensable for explanation of the differences from the first embodiment.

Figure 4:
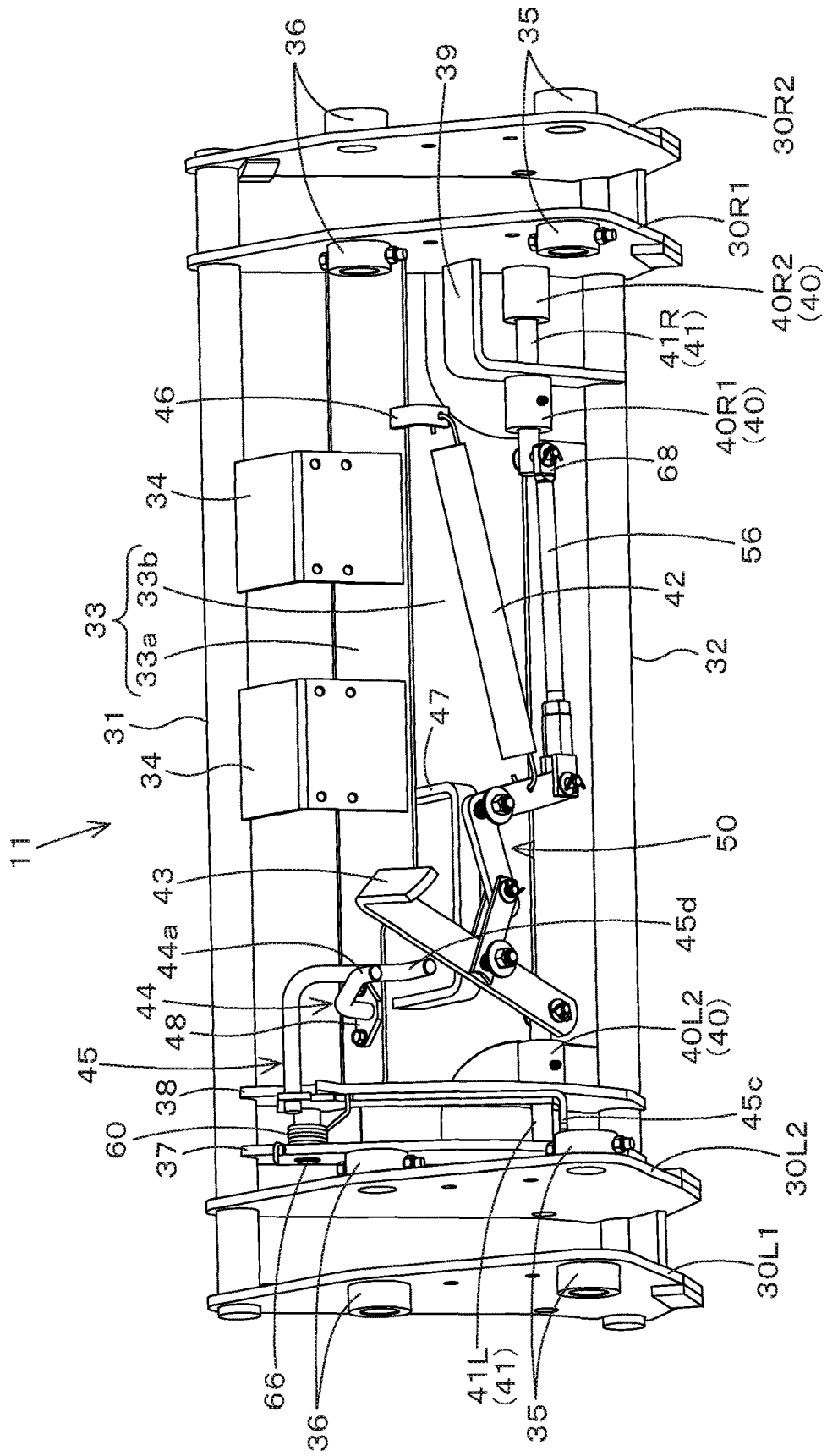
FIG. 4 is a back surface perspective view of the attachment body according to the embodiment.
Figure 5:
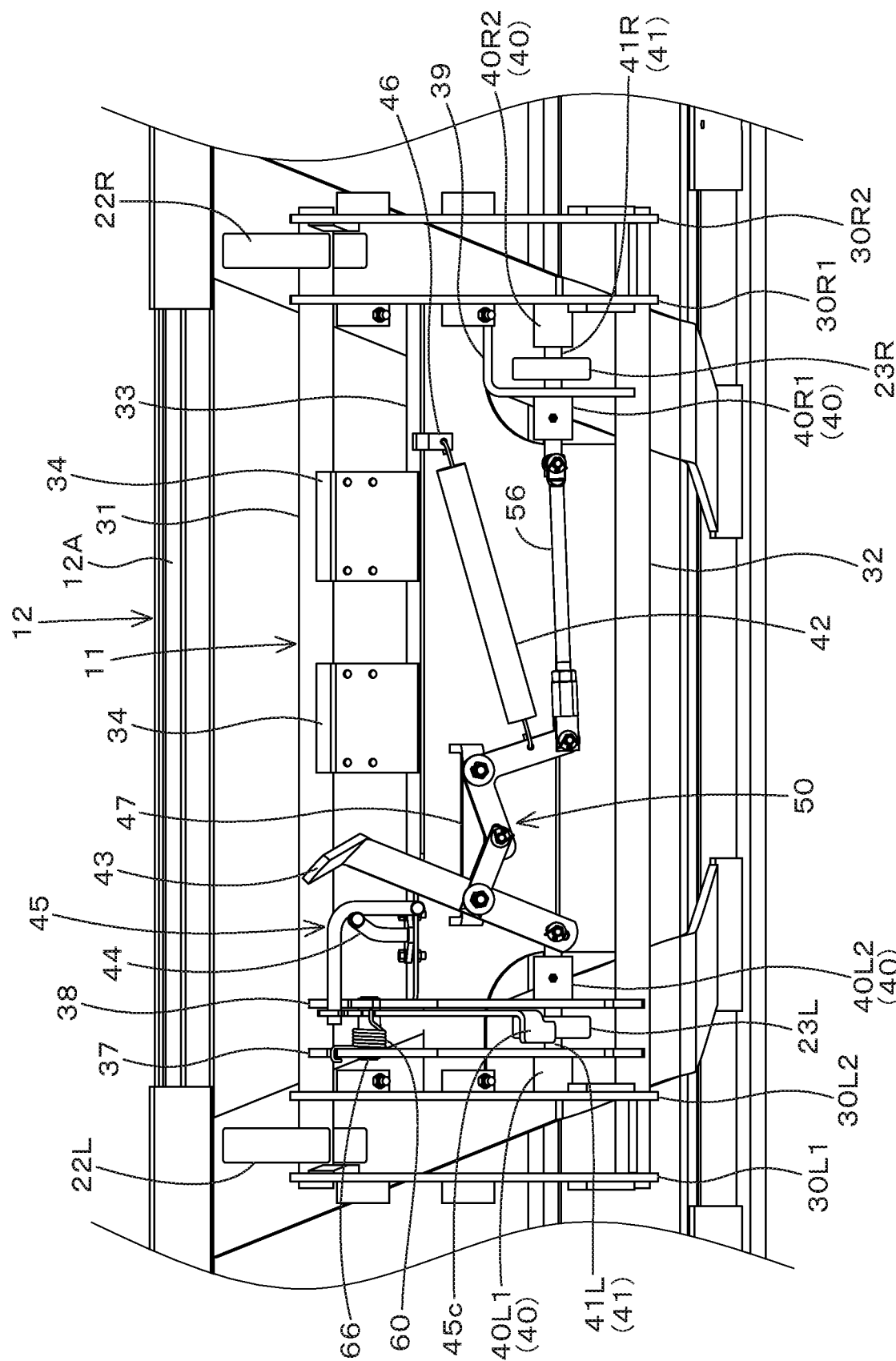
FIG. 5 is a back surface view illustrating a main portion is the state where the working tool is attached to the attachment body according to the embodiment.
Figure 28:
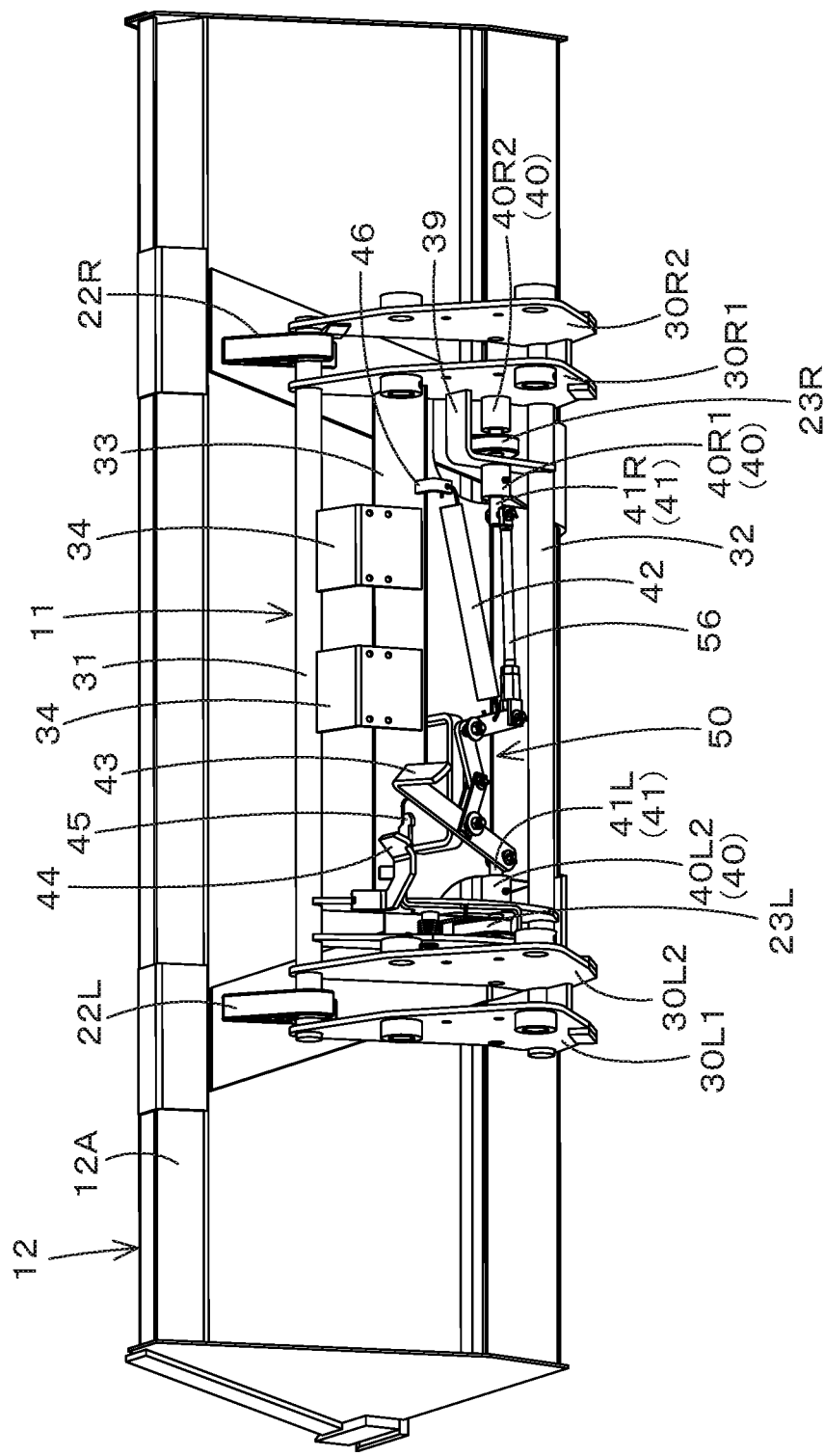
FIG. 28 is a back surface perspective view illustrating a state (a attaching state) where a working tool is attached to an attachment body according to a third embodiment of the present invention.
Figure 29:
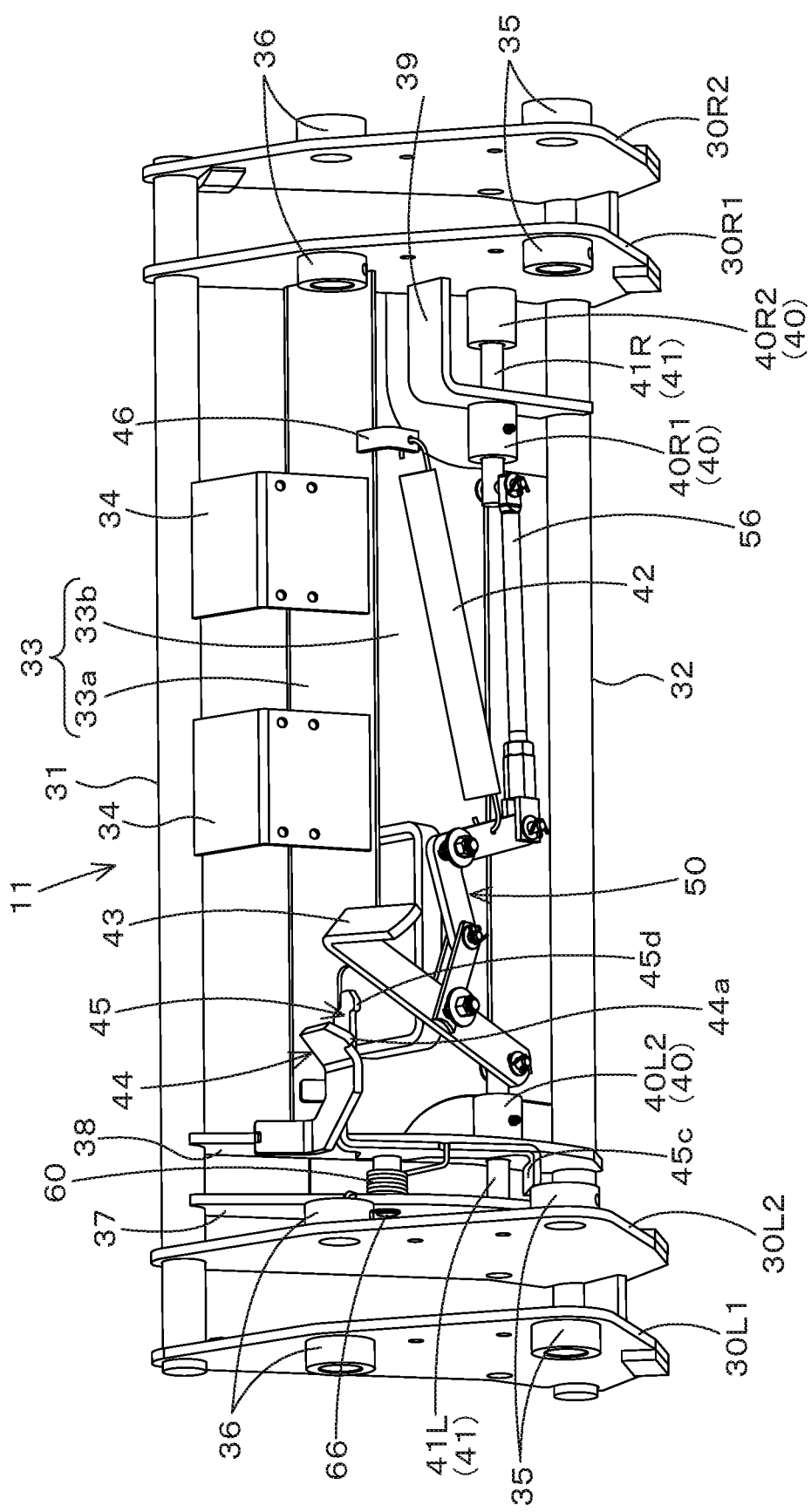
FIG. 29 is a back surface perspective view of the attachment body according to the third embodiment.
Figure 30:
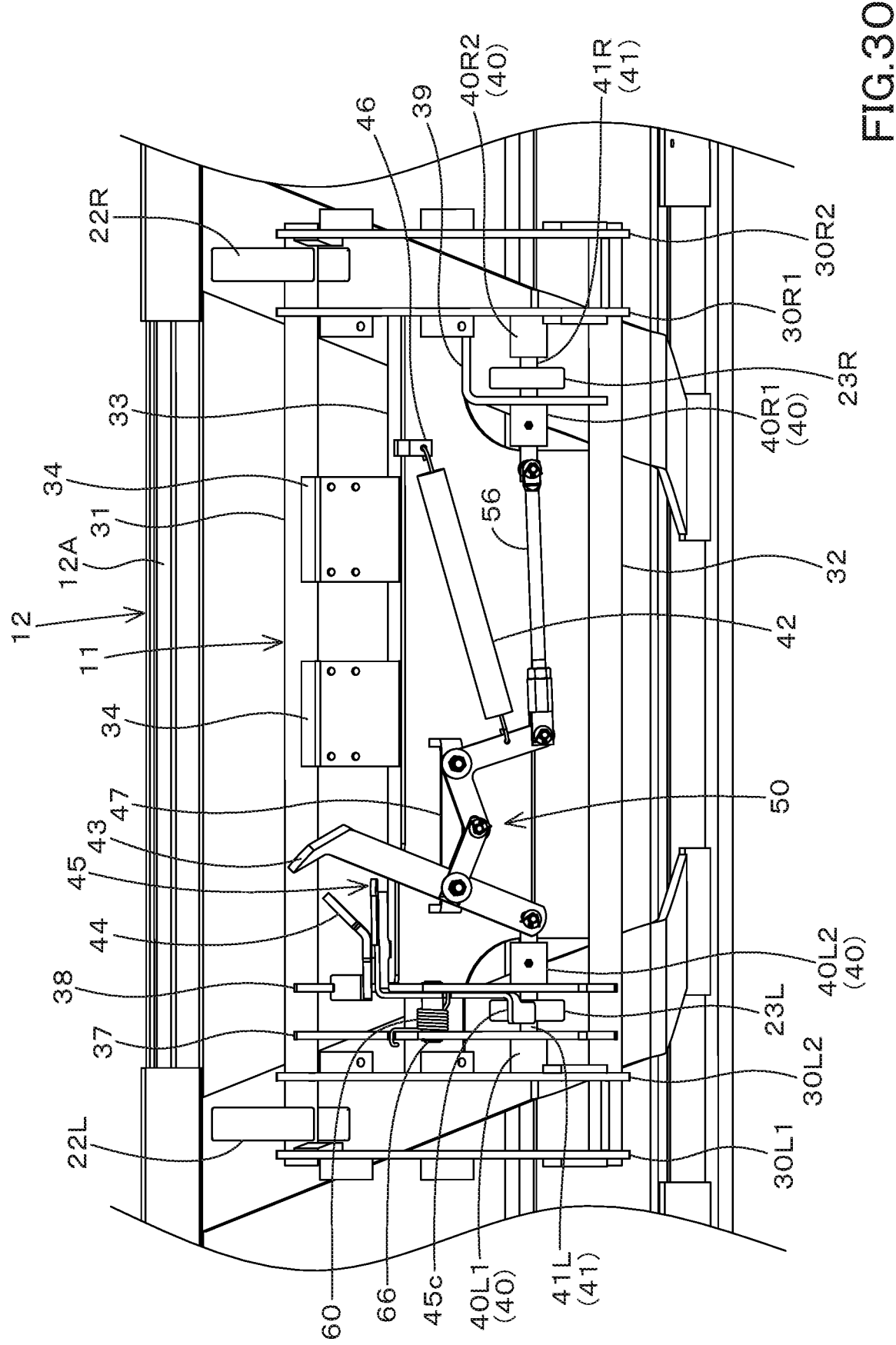
FIG. 30 is a back surface view illustrating a main portion of an attachment body according to the third embodiment.

As shown in FIG. 3 to FIG. 5 (FIG. 16 and FIG. 18) [FIG. 28 to FIG. 30], the attachment body 11 has attaching brackets 30L1, 30L2, 30R1, and 30R2. The attaching brackets 30L1 and 30L2 are disposed on the left side of the attachment body 11 and abut on the left side of the rear surface of the bucket body 12A.

The attaching brackets 30R1 and 30R2 are disposed on the right side of the attachment body 11 and abut on the right side of the rear surface of the bucket body 12A. The attaching bracket 30L1 is disposed to the left of the attaching bracket 30L2. The attaching bracket 30R1 is disposed on the left side of the attaching bracket 30R2.

The upper portions of the attaching brackets 30L1, 30L2, 30R1, and 30R2 are connected by the upper rod 31. The lower portions of the attaching brackets 30L1, 30L2, 30R1, and 30R2 are connected by a lower rod 32.

The upper rod 31 and the lower rod 32 are disposed in parallel to each other and extend in the machine width direction. As shown in FIG. 3 [FIG. 28], the hooking portion 22L of the bucket 12 is latched to the upper rod 31 between the attaching bracket 30L1 and the attaching bracket 30L2.

A hooking portion 22R of the bucket 12 is hooked on the upper rod 31 between the attaching bracket 30R1 and the attaching bracket 30R2.

The attaching bracket 30L2 and the attaching bracket 30R1 are connected by a coupling plate 33 extending in the machine width direction. As shown in FIG. 4 (FIG. 18) [FIG. 29], the coupling plate 33 has an upper connecting portion 33a and a lower connecting portion 33b.

The attaching bracket 30L2 and the attaching bracket 30R1 are connected by a coupling plate 33 extending in the machine width direction. As shown in FIG. 4 (FIG. 18) [FIG. 29], the coupling plate 33 has an upper communicating portion 33a and a lower connecting portion 33b.

The upper rod 31 and the coupling plate 33 are connected by an L-shaped curved plate 34. As shown in FIG. 4 (FIG. 18) [FIG. 29], the attaching brackets 30L1, 30L2, 30R1, 30R2 each have a first boss portion 35 and a second boss portion 36.

As shown in FIG. 1, the second pivot 17 is inserted through the first boss portion 35. The third pivot 20 is inserted through the second boss portion 36. As a result, the attachment body 11 is connected to the distal end side of the boom 10 and the other end side of the pushing link 18 via the second pivot 17 and the third pivot 20.

As shown in FIG. 3 to FIG. 7 (FIG. 16 to FIG. 18) [FIG. 28 to FIG. 31], the attachment body 11 has a first support plate 37, a second support plate 38, and a third support plate 39.

The first support plate 37 and the second support plate 38 are disposed on the left side of the attachment body 11. The upper portion of the first support plate 37 and the upper portion of the second support plate 38 are connected to the upper rod 31. The lower portion of the first support plate 37 and the lower portion of the second support plate 38 are connected to the lower rod 32.

One side of the first support plate 37 and the second support plate 38 is directed to the left and the other side is directed to the right. The first support plate 37 and the second support plate 38 are aligned in the machine width direction, the first support plate 37 is disposed on the left side, and the second support plate 38 is arranged on the right side.

The first supporting plate 37 and the second supporting plate 38 are disposed between the attaching bracket 30L2 and the attaching bracket 30R1 and in the vicinity of the attaching bracket 30L2.

The third support plate 39 is disposed on the right side of the attachment body 11. The third support plate 39 is disposed between the attaching bracket 30L2 and the attaching bracket 30R1 and in the vicinity of the attaching bracket 30R1. The third support plate 39 is bent in an L-shape, one end of which is connected to the left surface of the attaching bracket R1 and the other end thereof is connected to the lower rod 32.

Figure 6:
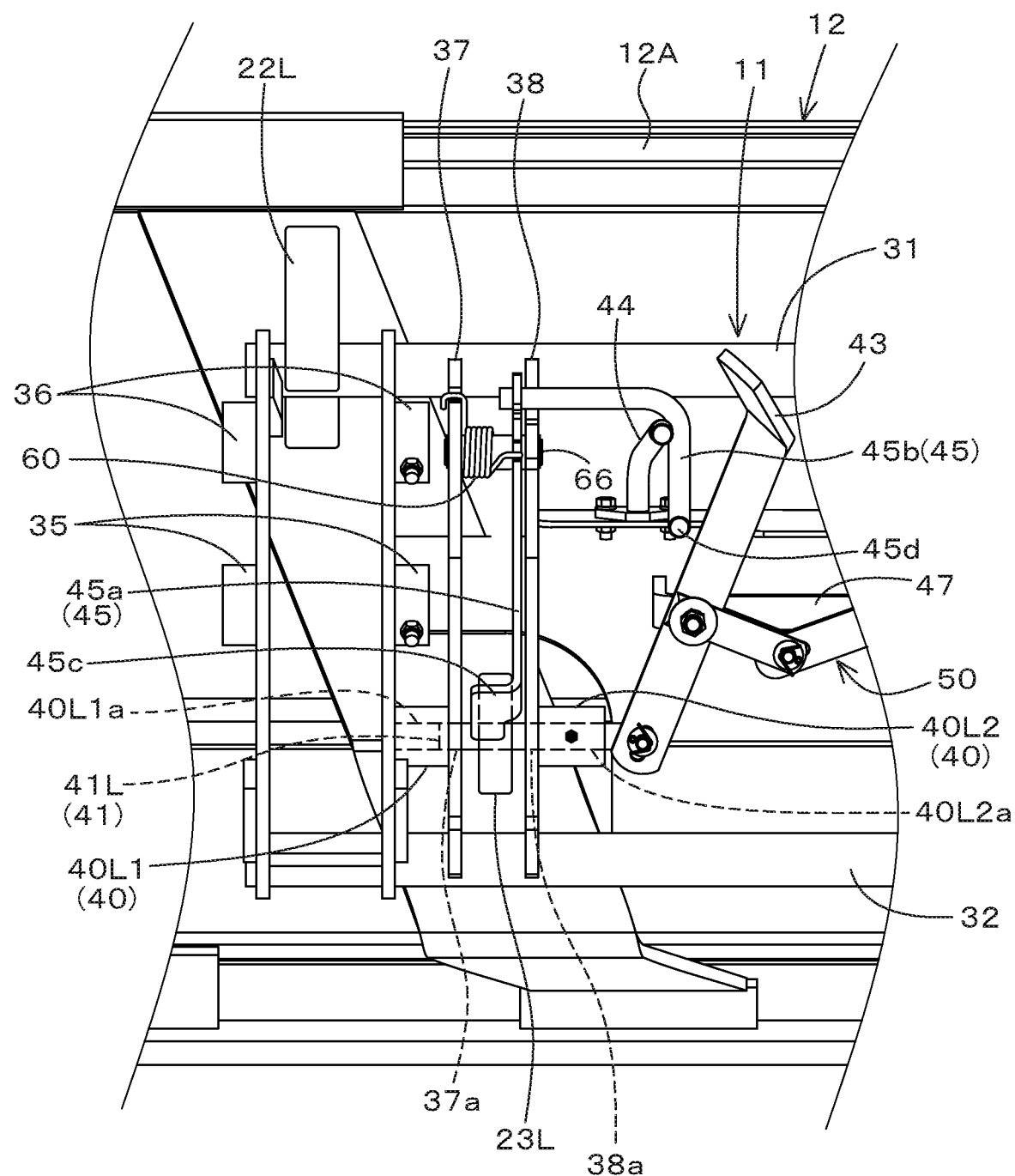
FIG. 6 is a back surface view illustrating a left portion (on a first lock pin side) of the state where the working tool is attached to the attachment body according to the embodiment.
Figure 7:
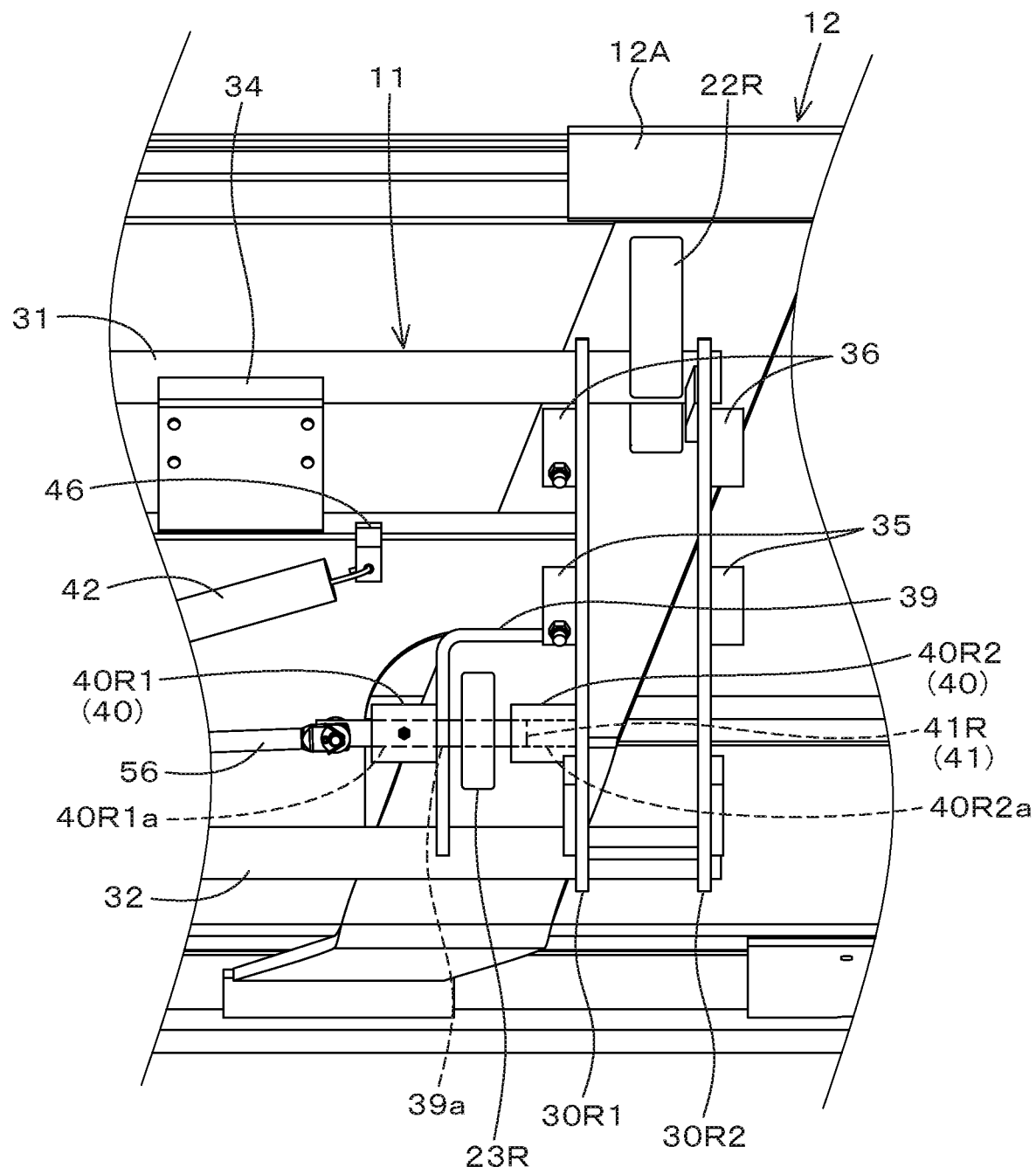
FIG. 7 is a back surface view illustrating a right portion (on a second lock pin side) of the state where the working tool is attached to the attachment body according to the embodiment.
Figure 31:
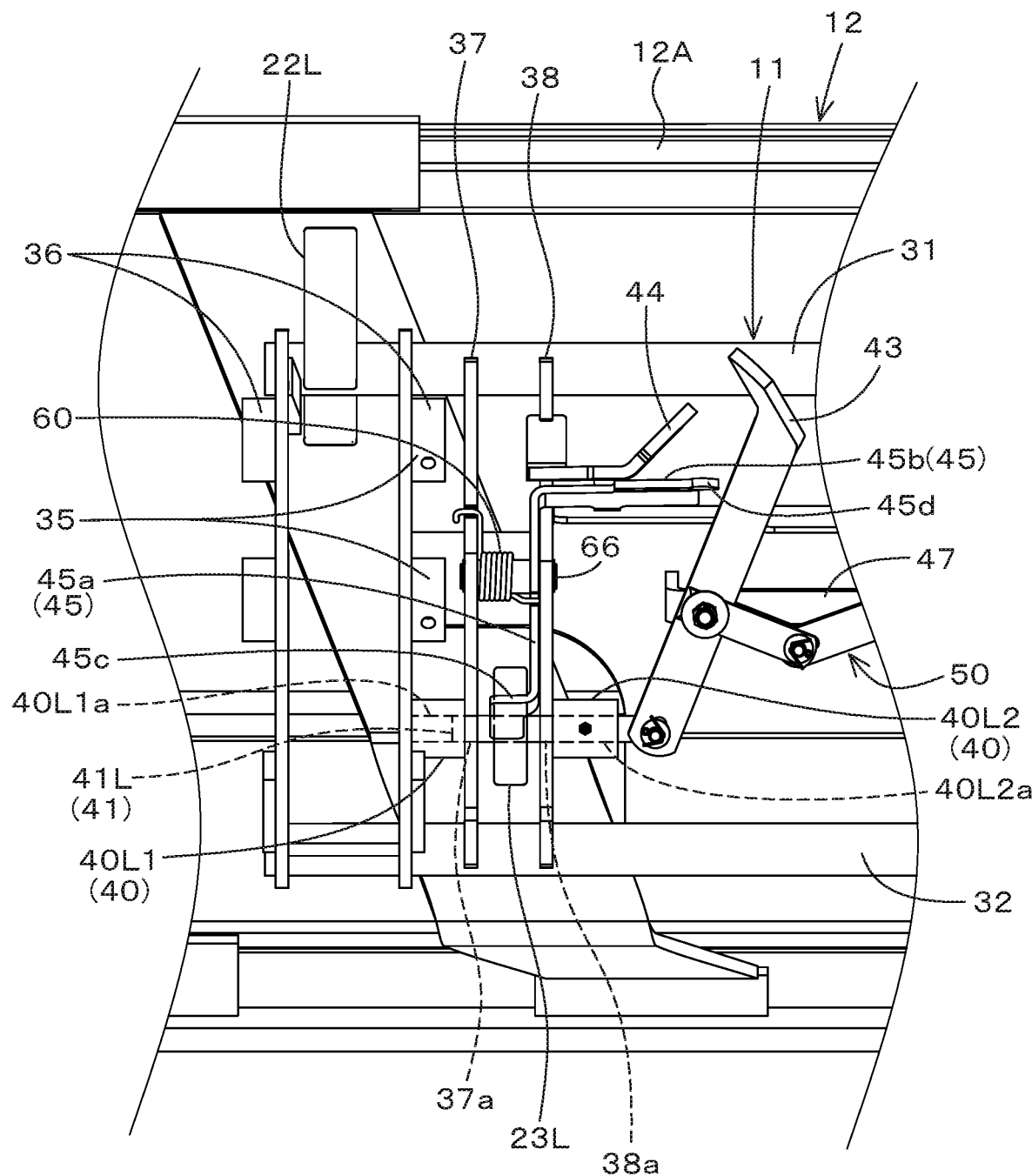
FIG. 31 is a back surface view illustrating a left portion (on a first lock pin side) of the state where a working tool is attached to the attachment body according to the third embodiment.

As shown in FIG. 6 (FIG. 17) [FIG. 31], a first through hole 37a is formed in the first support plate 37. A second through hole 38a is formed in the second support plate 38. As shown in FIG. 7, a third through hole 39a is formed in the third support plate 39. The centers of the first through hole 37a, the second through hole 38a, and the third through hole 39a are arranged on the same straight line extending in the machine width direction.

The attachment body 11 has a second engaging portion 40. As shown in FIG. 5 to FIG. 7 (FIG. 16 and FIG. 17) [FIG. 30 and FIG. 31], two second engaging portions 40 are provided on the left portion and the right portion of the mounting member 11.

Hereinafter, for convenience of the description, the two second engaging portions provided on the left portion of the attachment body 11 are referred to as the second engaging portion 40L1 and the second engaging portion 40L2, respectively. Two second engaging portions provided on the right portion of the attachment body 11 are referred to as a second engaging portion 40R1 and a second engaging portion 40R2, respectively.

When collectively describing the second engaging portion 40L1 and the second engaging portion 40L2, they are referred to as a second engaging portion 40L, and the second engaging portion 40R1 and the second engaging portion 40R2 are collectively described in this case, they are called a second engaging portion 40R.

The second engaging portions 40L1, 40L2, 40R1, and 40R2 are formed in a cylindrical shape having through holes. The central axes of the through hole 40L1a of the second engaging portion 40L1, the through hole 40L2a of the second engaging portion 40L2, the through hole 40R1a of the second engaging portion 40R1, and the through hole 40R2a of the second engaging portion 40R2 are located in the vehicle body and are arranged on the same straight line extending in the width direction.

As shown in FIG. 6 (FIG. 17) [FIG. 31], the second engaging portion 40L1 is fixed to the left surface of the first supporting plate 37, and the through hole 40L1a communicates with the first through hole 37a. The second engaging portion 40L2 is fixed to the right surface of the second supporting plate 38, and the through hole 40L2a communicates with the second through hole 38a.

As shown in FIG. 7, the second engaging portion 40R1 is fixed to the left surface of the third support plate 39, and the through hole 40R1a communicates with the third through hole 39a. The second engaging portion 40R2 is fixed to the left surface of the attaching bracket 30R1.

The front loader 8 is equipped with a locking mechanism capable of switching between a state (a locked state) in which the bucket (the working tool) 12 is attached to the attachment body 11 and a state in which it can be removed (a unlocked state).

Figure 8:
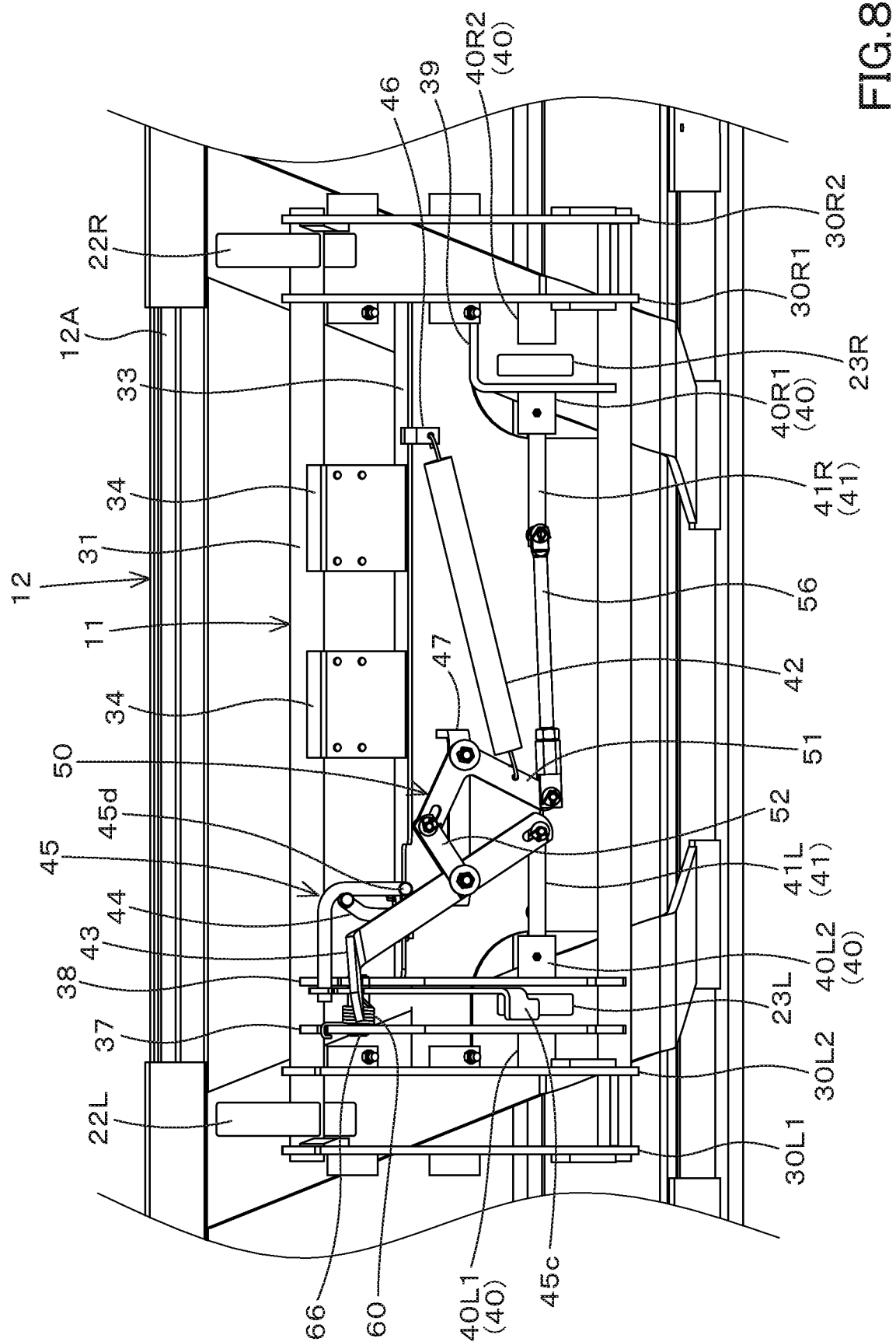
FIG. 8 is a back surface view illustrating a state where locking between the working tool and the attachment body is released according to the embodiment.
Figure 12:
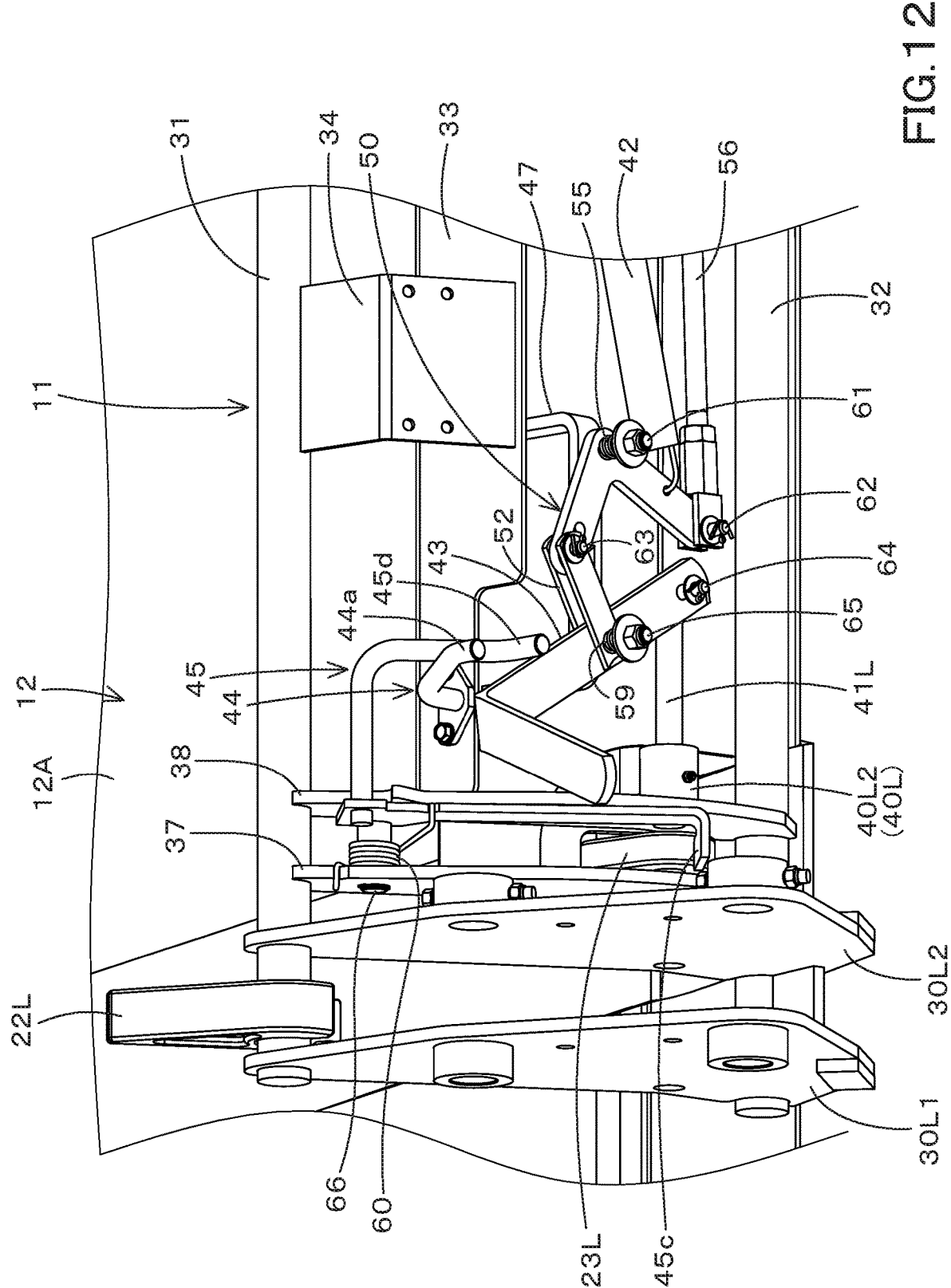
FIG. 12 is a back surface perspective view illustrating a state (a released state) where the locking of the working tool caused by a locking mechanism is released according to the embodiment.
Figure 32:
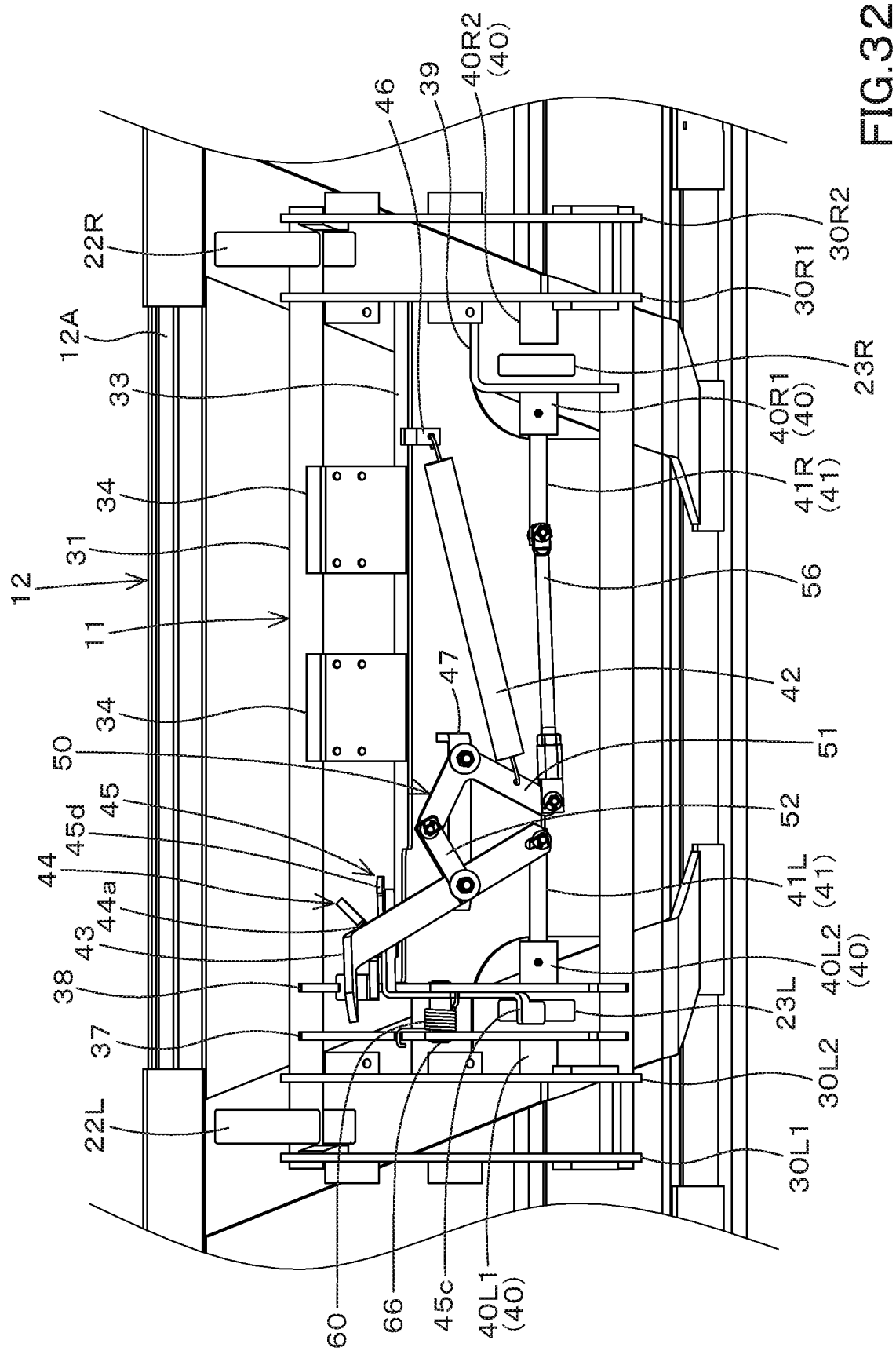
FIG. 32 is a back surface view illustrating a state where locking between the working tool and the attachment body is released according to the third embodiment.
Figure 35:
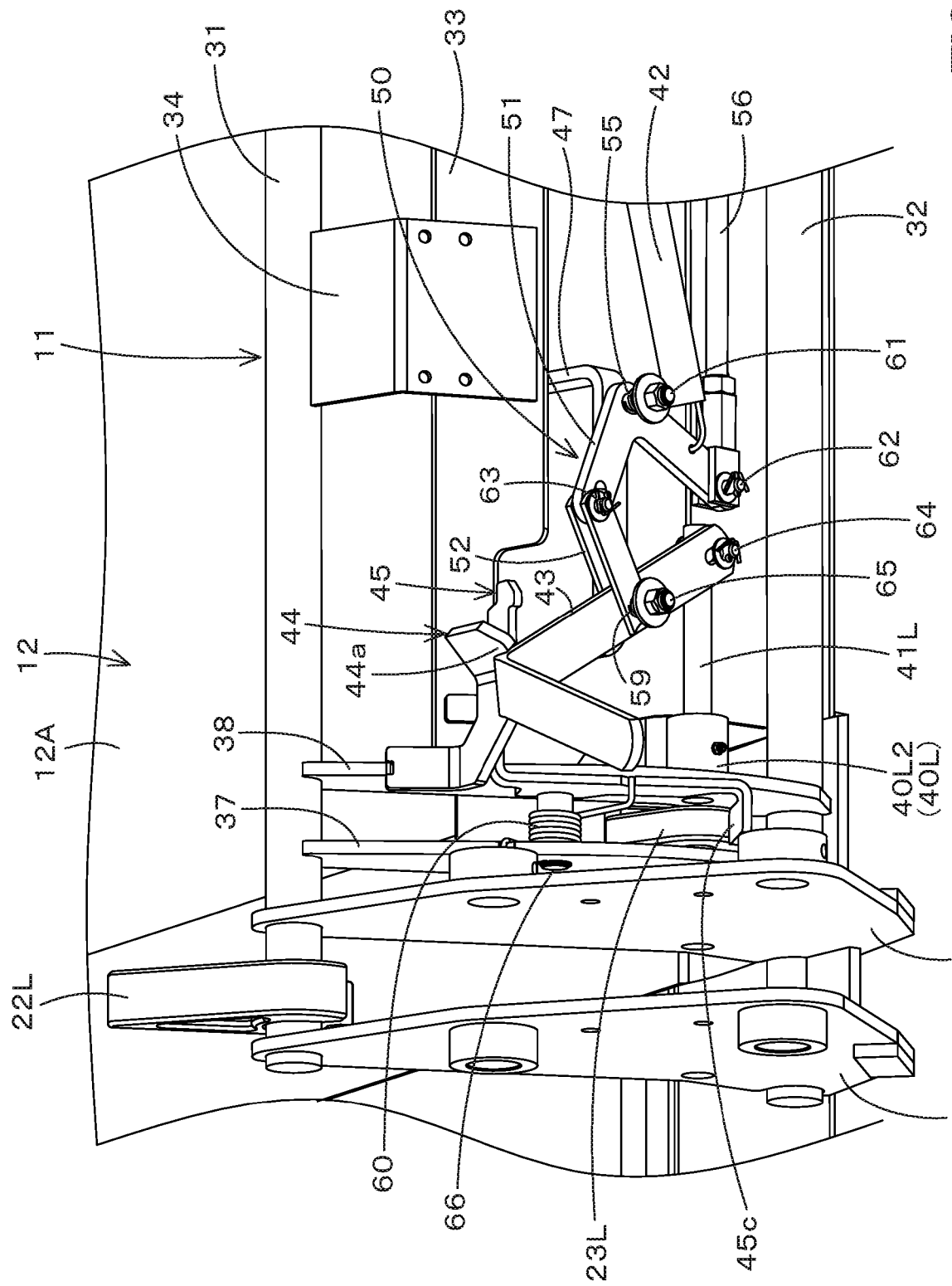
FIG. 35 is a back surface perspective view illustrating a state (a released state) where the locking of the working tool caused by a locking mechanism is released according to the third embodiment.

FIGS. 3 to 7, 10, and 11 (FIGS. 16 to 18, 20, and 21) [FIGS. 28 to 31, 33, and 34] show the locked state, FIGS. 8 and 12 (FIG. 19 and FIG. 22) [FIG. 32 and FIG. 35] show the unlocked state.

The locking mechanism includes a first engaging portion 23, a second engaging portion 40, a lock pin 41, a pushing member 42, a lock lever 43, a holding member 44, and a working tool detection lever 45.

Among the components constituting the locking mechanism, the first engaging portion 23 is provided in the bucket 12. The second engaging portion 40, the lock pin 41, the pushing member 42, the lock lever 43, the holding member 44, and the working tool detecting lever 45 are provided on the attachment body 11.

The lock pin 41 includes a first lock pin 41L and a second lock pin 41R. The first lock pin 41L is disposed on the left side of the attachment body 11. The second lock pin 41R is disposed on the right side of the attachment body 11.

The first lock pin 41L and the second lock pin 41R can move to one side (the left side) or the other (the right side) in the machine width direction. The first lock pin 41L and the second lock pin 41R move in opposite directions.

In other words, the first lock pin 41L and the second lock pin 41R both move toward the inside of the vehicle body or both move toward the outside of the vehicle body.

As shown in FIG. 5 and FIG. 6 (FIG. 16 and FIG. 17) [FIG. 30 and FIG. 31], when the first lock pin 41L moves to one side (the left side) in the machine width direction, the first through hole 37a, the second through hole 38a, the through hole 40L1a, and the through hole 40L2a.

Accordingly, the first lock pin 41L is engaged with the first engaging portion 23L and the second engaging portions 40L1 and 40L2. Further, when the first lock pin 41L moves to the other side (the right side) in the machine width direction, it is removed from the first through hole 37a, the second through hole 38a, the through hole 40L1a, and the through hole 40L2a.

As a result, as shown in FIG. 8 (FIG. 19) [FIG. 32], the first lock pin 41L separates from the first engaging portion 23L and the second engaging portion 40L. At this time, the first lock pin 41L only needs to be detached from the second engaging portion 40L1 at least outside the vehicle body (one side in the machine width direction), and thus it is not necessary to separate from the second engaging portion 40L2 arranged on the machine inward side (the other side in the machine width direction).

In the case of the present embodiment, the first lock pin 41L separates from the second engaging portion 40L1 but does not separate from the second engaging portion 40L2.

As shown in FIG. 7, the second lock pin 41R is inserted through the third through hole 39a, the through hole 40R1a, and the through hole 40R2a when the second lock pin 41R moves to the other side (the right side) in the machine width direction. Thereby, the second lock pin 41R is engaged with the first engaging portion 23R and the second engaging portions 40R1 and 40R2.

Further, when the second lock pin 41R moves to one side (the left side) in the machine width direction, it is removed from the third through hole 39a, the through hole 40R1a, and the through hole 40R2a. As a result, as shown in FIG. 8 (FIG. 19) [FIG. 32], the second lock pin 41R is disengaged from the first engaging portion 23R and the second engaging portion 40R.

At this time, the second lock pin 41R only has to separate from the second engaging portion 40R2 at least outside the vehicle body (the other side in the width direction of the vehicle body), and thus it is not necessary to separate from the second engaging portion 40R1 arranged on the inner side of the vehicle body (one side in the machine width direction).

In the case of the present embodiment, the second lock pin 41R is disengaged from the second engaging portion 40R2, but is not detached from the second engaging portion 40R1.

Hereinafter, the positions shown in FIG. 4 to FIG. 7 (FIG. 16 to FIG. 18) [FIG. 29 to FIG. 31] are referred to as a "attaching positions" for the positions of the lock pins (the first lock pin 41L and the second lock pin 41R), and the position shown in FIG. 8 (FIG. 19) [FIG. 32] is referred to as a "releasing position".

In the attaching position, the first lock pin 41L is engaged with the first engaging portion 23L and the second engaging portions 40L1 and 40L2, and the second lock pin 41R is engaged with the first engaging portion 23R and the second engaging portions 40R1 and 40R2.

In addition, at the releasing position, the first lock pin 41L is disengaged from the first engaging portion 23L and the second engaging portion 40L1, and the second lock pin 41R is disengaged from the first engaging portion 23R and the second engaging portion 40.

The pushing member 42 biases the lock pin (the first lock pin 41L and the second lock pin 41R) toward the attachment position. In the case of the present embodiment, the pushing member 42 is composed of a tension spring.

One end portion of the pushing member 42 is engaged with the first stay 46 fixed to the right portion of the connection plate 33. The other end portion of the pushing member 42 is connected to the first lock pin 41L via the link mechanism 50 and the lock lever 43, and is connected to the second lock pin 41R via the link mechanism 50.

Figure 9:
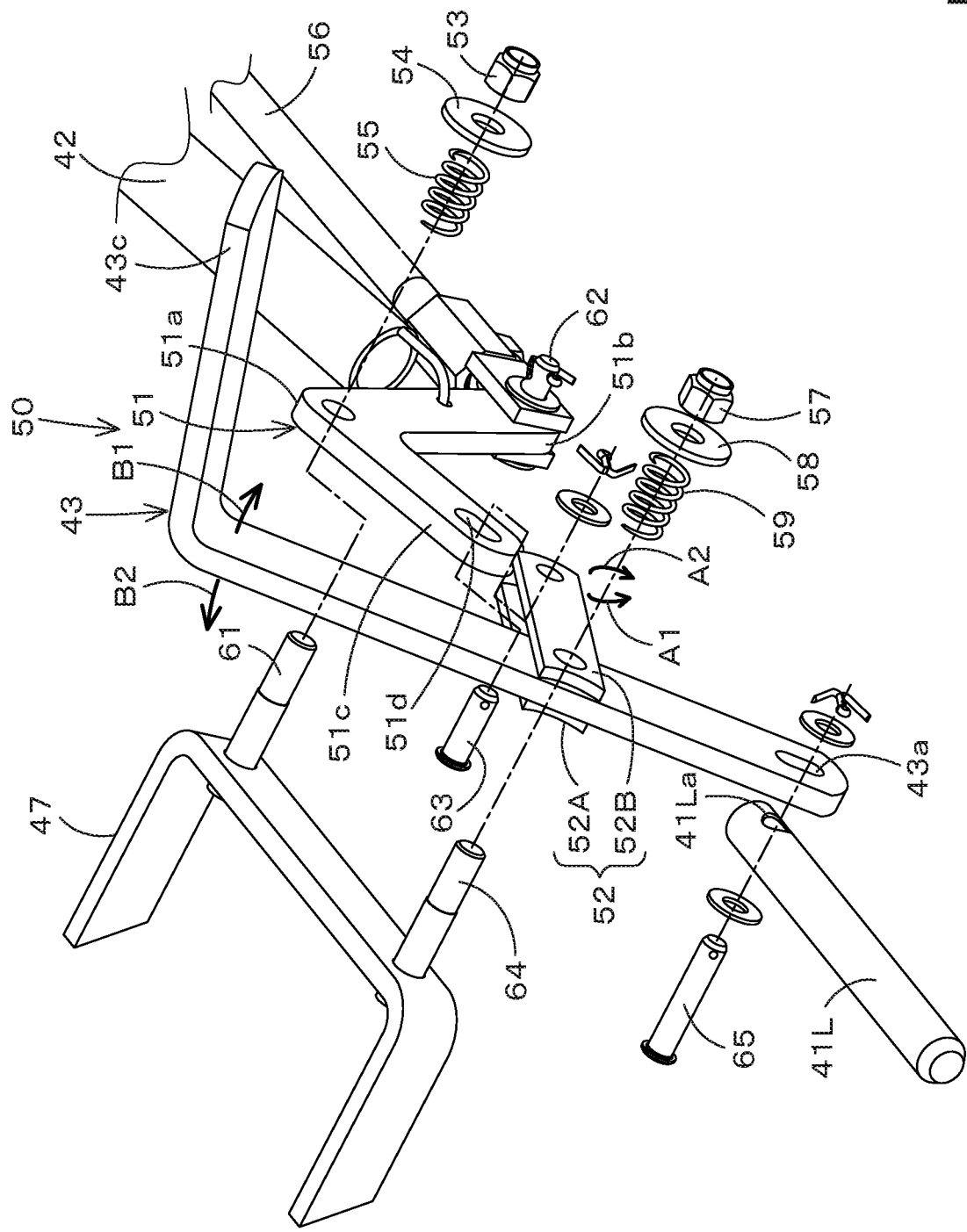
FIG. 9 is an exploded perspective view of a linkage mechanism according to the embodiment.
Figure 10:
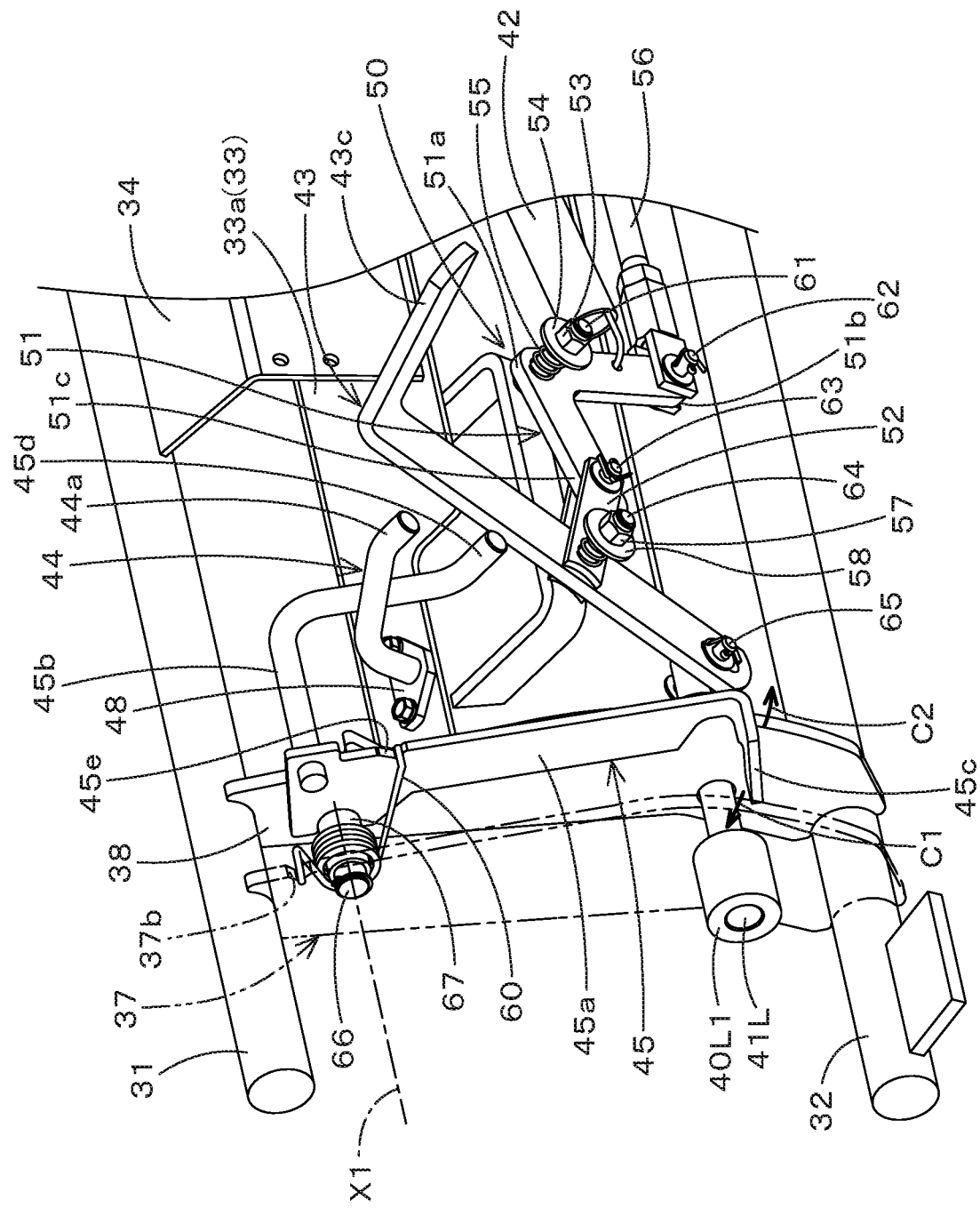
FIG. 10 is a back surface perspective view illustrating a working tool detection lever, a lock lever, a retaining member, the linkage mechanism, and the like of the state where the working tool is attached to the attachment body according to the embodiment.
Figure 11:
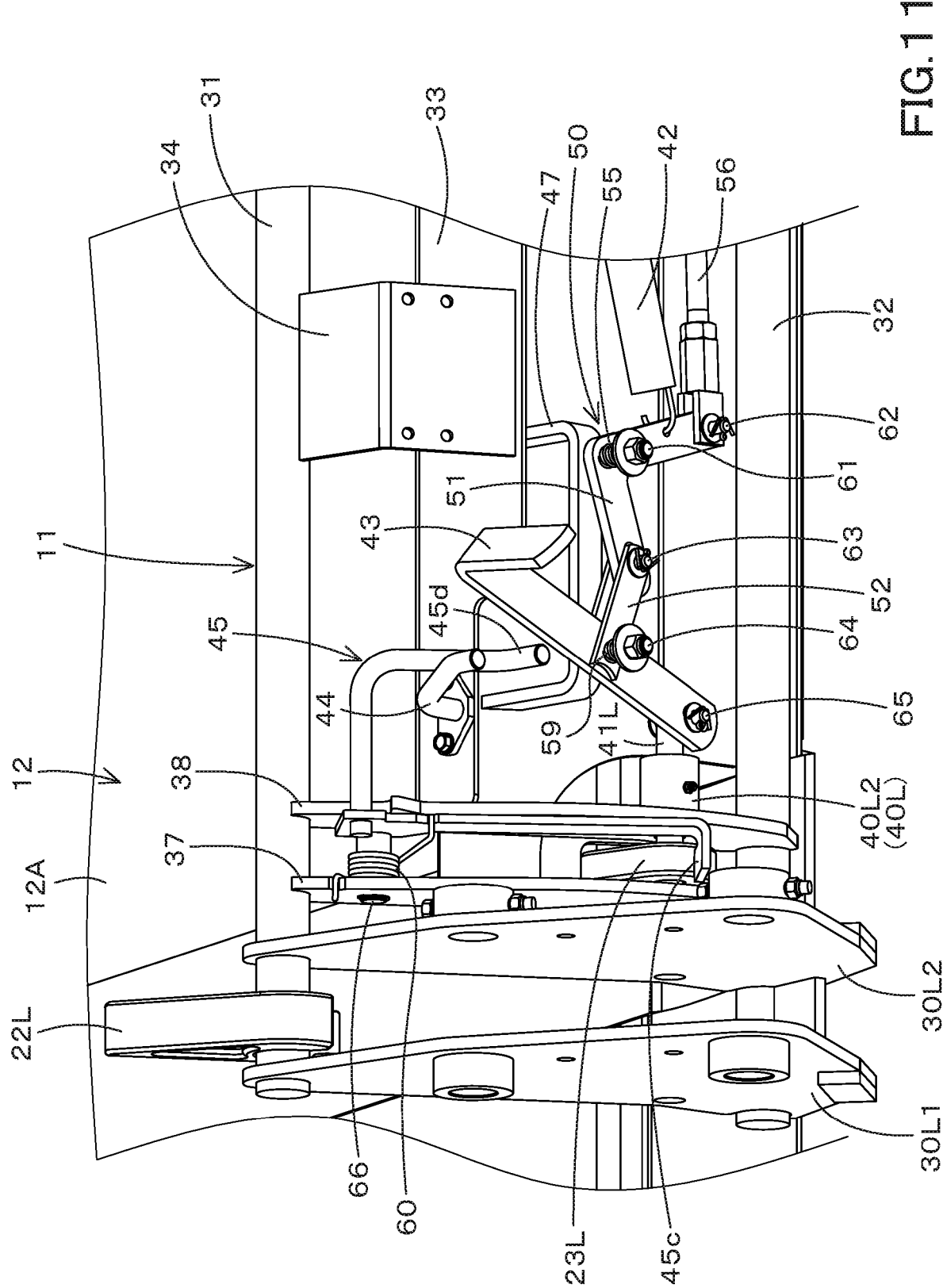
FIG. 11 is a back surface perspective view illustrating the state (the attaching state) where the working tool is attached to the attachment body according to the embodiment.
Figure 33:
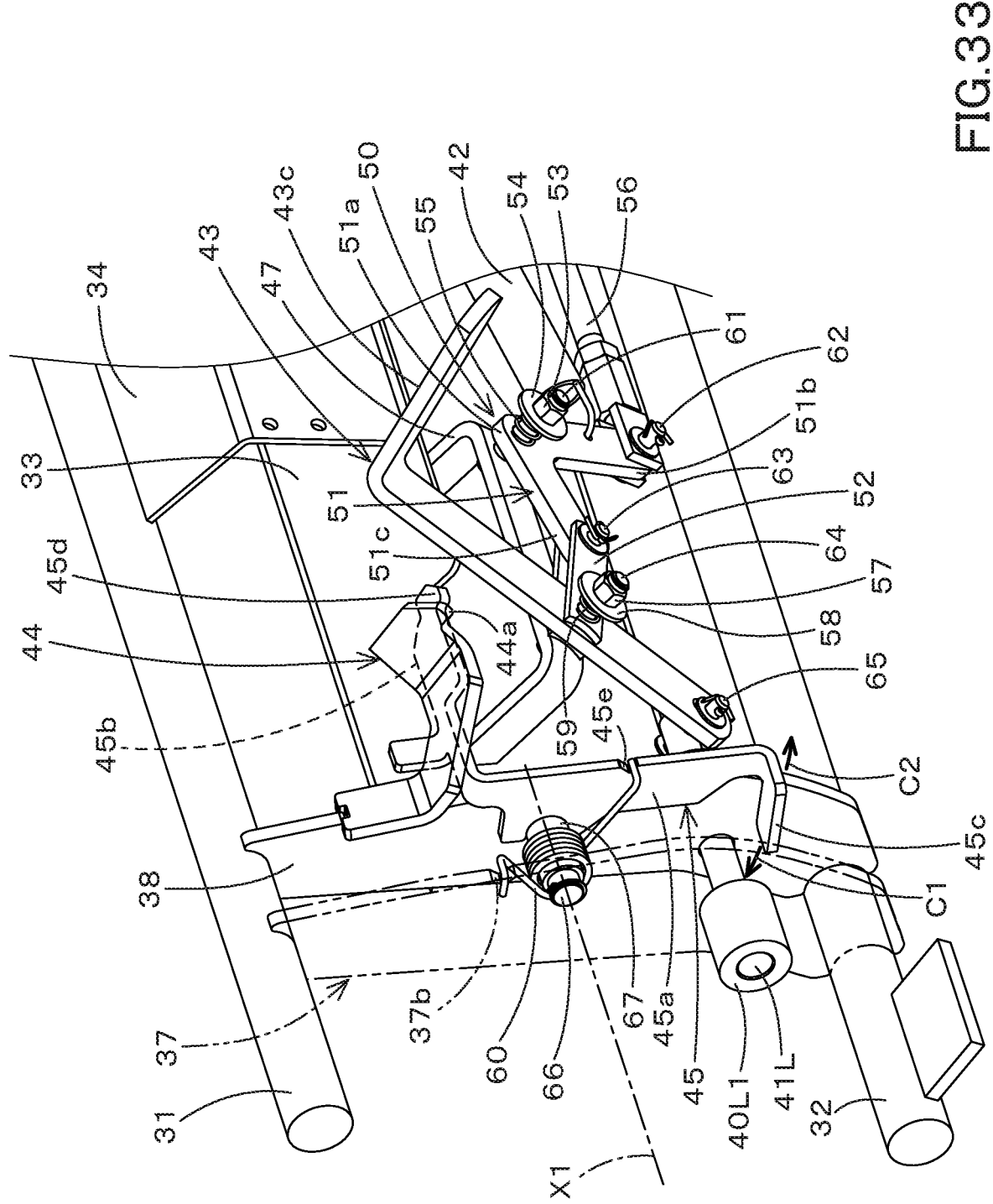
FIG. 33 is a back surface perspective view illustrating a working tool detection lever, a lock lever, a retaining member, the linkage mechanism, and the like of the state where the working tool is attached to the attachment body according to the third embodiment.
Figure 34:
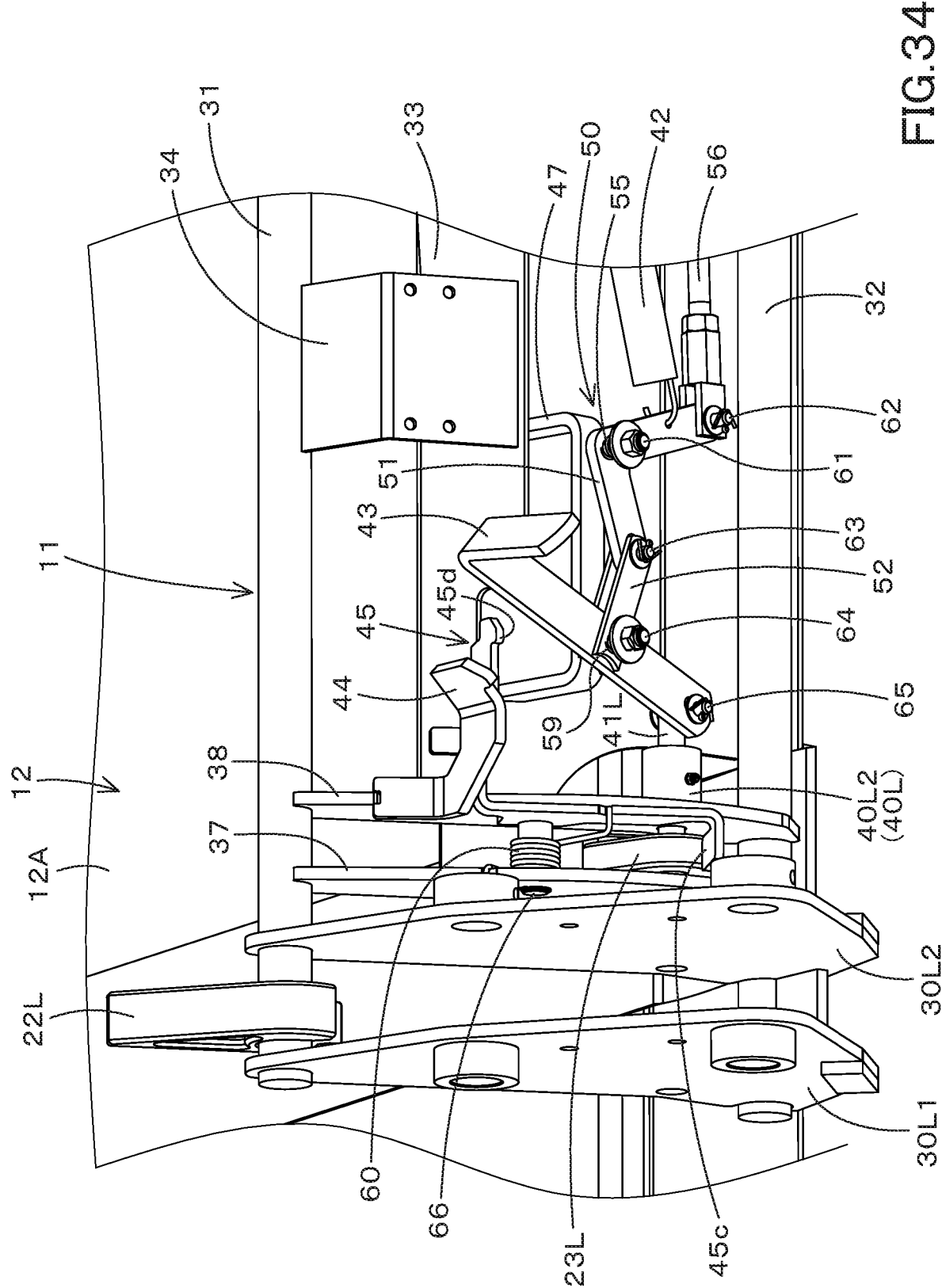
FIG. 34 is a back surface perspective view illustrating the state (the attaching state) where the working tool is attached to the attachment body according to the third embodiment.

As shown in FIG. 9, FIG. 10 (FIG. 20) [FIG. 33], the link mechanism 50 has a first link member 51 and a second link member 52.

The first link member 51 is a member bent in an L-shape. The bent portion 51a of the first link member 51 is pivotally supported by the first shaft 61. One end side of the first shaft 61 is fixed to the second stay 47 fixed to the coupling plate 33.

The other end side of the first shaft 61 passes through the bent portion 51a of the first link member 51 and projects rearward (in a direction away from the second stay 47). A male screw is formed on the other end side of the first shaft 61, and a first nut 53 is screwed to the male screw.

A first washer 54 is externally fitted to the male thread of the first shaft 61, and a pressing member 55 (hereinafter, referred to as a "first pressing member 55") is provided between the first washer 54 and the bent portion 51a of the first link member 51 is interposed. In the case of this embodiment, the first pressing member 55 is constituted of a compression spring.

The first pressing member 55 presses the first link member 51 toward the second stay 47. That is, the first pressing member 55 has a pressing force to press the first link member 51 forward.

One end portion (a left end portion) of the connecting member 56 is pivotally supported by the one end portion 51b of the first link member 51 via the second shaft 62.

As shown in FIG. 4 (FIG. 18) [FIG. 29] and the like, the other end portion (a right end portion) of the connecting member 56 is connected to one end portion (a left end portion) of the second lock pin 41R. That is, the first link member 51 is connected to the second lock pin 41R via the second shaft 62 and the connecting member 56.

The other end portion of the pushing member 42 is connected between the bent portion 51a and the other end portion 51c of the first link member 51. One end portion of the second link member 52 is pivotally supported on the other end portion 51c of the first link member 51 via a third shaft 63.

As shown in FIG. 9, the second link member 52 has a front member 52A and a rear member 52B. One end portion of the front member 52A is in contact with the front surface of the first link member 51, and one end portion of the rear member 52B is in contact with the rear surface of the first link member 51.

That is, the first link member 51 is sandwiched between the front member 52A and the rear member 52B. An intermediate portion (a portion between one end portion and the other end portion) of the lock lever 43 is connected between the other end portion of the front member 52A and the other end portion of the rear member 52B. The second link member 52 and the lock lever 43 integrally move (swing).

The third shaft 63 is inserted through the through holes formed in the first link member 51 and the second link member 52, respectively. Of the through holes through which the third shaft 63 is inserted, the through hole 51d formed in the first link member 51 is an elongated hole (hereinafter referred to as a "first elongated hole 51d").

The other end portion of the second link member 52 is pivotally supported by the fourth shaft 64. One end side of the fourth shaft 64 is fixed to the second stay 47. The other end side of the fourth shaft 64 penetrates the other end portion of the second link member 52 and the intermediate portion of the lock lever 43, and projects rearward (in a direction away from the second stay 47).

A male thread is formed on the other end side of the fourth shaft 64, and a second nut 57 is threadedly engaged with the male thread. A second washer 58 is externally fitted to the male thread of the fourth shaft 64. Between the second washer 58 and the rear member 52B of the second link member 52, a pressing member 59 (hereinafter referred to as a "second pressing member 59") is interposed in the casing.

In the present embodiment, the second pressing member 59 is constituted of a compression spring. The second pressing member 59 presses the second link member 52 and the lock lever 43 toward the second stay 47. That is, the second pressing member 59 has a pressing force to press the second link member 52 and the lock lever 43 forward.

One end side of the lock lever 43 is connected (pivoted) to the first lock pin 41L via the fifth shaft 65. The first shaft 61, the second shaft 62, the third shaft 63, the fourth shaft 64, and the fifth shaft 65 are parallel to each other, and extend in the front-rear direction.

The fifth shaft 65 is inserted through the through hole 41La formed at the right side of the first lock pin 41L and the through hole 43a formed at one end side of the lock lever 43. The through hole 43a formed at one end side of the lock lever 43 is an elongated hole (hereinafter referred to as a "second elongated hole 43a").

The intermediate portion of the lock lever 43 is pivotally supported by the second stay 47 together with the second link member 52 via the fourth shaft 64. The other end side of the lock lever 43 is bent rearward. The other end portion of the lock lever 43 becomes a grip portion 43c that the operator holds when operating the lock lever 43.

The lock lever 43 can swing with the fourth shaft 64 as a fulcrum (a center). In particular, the lock lever 43 rotates around the fourth shaft 64 as a fulcrum, and can swing in the machine width direction (hereinafter referred to as a "first swinging") and swing in the front-rear direction (hereinafter referred to as a "second swinging").

In FIG. 9, the direction of the first swing of the lock lever 43 is indicated by arrowed lines A1 and A2, and the direction of the second swing of the lock lever 43 is indicated by arrowed lines B1 and B2.

First, the first swing of the lock lever 43 will be described.

The lock lever 43 moves to the first position and the second position by the first swing. FIG. 8 (FIG. 19) [FIG. 32] shows a state in which the lock lever 43 is in the first position. FIG. 5 (FIG. 16) [FIG. 30] shows a state in which the lock lever 43 is in the second position.

In the first position shown in FIG. 8 (FIG. 19) [FIG. 32], the other end side (the upper end side) of the lock lever 43 is on one side (the left side) in the machine width direction, and the one end side (the lower end side) is on the other side (the right side) in the width direction. In the second position shown in FIG. 5 (FIG. 16) [FIG. 30], the other end side is on the other side (the right side) in the machine width direction, and one end side is on one side (the left side) in the machine width direction.

When the lock lever 43 moves to the first position in the first swing, the other end side (the upper end side) of the lock lever 43 moves to one side (the left side) in the machine width direction, and the one end side (the lower end side) moves to the other side (the right side) in the width direction.

When one end side of the lock lever 43 moves to the right, the first lock pin 41L connected to one end side of the lock lever 43 moves to the right.

As the result, the first lock pin 41L is in the releasing position (see FIG. 8 (FIG. 19) [FIG. 32]) which is separated from the first engaging portion 23L and the second engaging portion 40L1.

When one end side of the lock lever 43 moves to the right, a force opposing the pushing force of the pushing member 42 is applied. Thus, when one end side of the lock lever 43 moves to the right, a force (a force for extending the pushing member 42) against the pushing force of the pushing member 42 is transmitted to the second lock pin 41R via the link mechanism 50. The second lock pin 41R is pulled toward one side (the left side) in the machine width direction and moves to the one side (the left side).

As the result, the second lock pin 41R becomes the releasing position (see FIG. 8 (FIG. 19) [FIG. 32]) where the second lock pin 41R is separated from the first engaging portion 23R and the second engaging portion 40R2.

When the lock lever 43 moves to the second position in the first swing, the other end side (the upper end side) of the lock lever 43 moves to the other (the right side) in the machine width direction, and the one end side (the lower end side) moves to one side (the left side) in the machine width direction. When one end side of the lock lever 43 moves to the left, the first lock pin 41L connected to one end side of the lock lever 43 moves to the left.

As the result, the first lock pin 41L is moved to the attaching position (FIG. 5 and FIG. 6 (FIG. 16 and FIG. 17) [FIG. 30 and FIG. 31]).

Also, when one end side of the lock lever 43 moves to the left, a force against the pushing force of the pushing member 42 does not act. Thus, due to the pushing force of the pushing member 42, the first link member 51 is pulled to the right with the first shaft 61 as a fulcrum. Thus, the second lock pin 41R is pushed to the right and moves to the right.

As the result, the second lock pin 41R is in the attaching position (see FIG. 5 and FIG. 7 (FIG. 16) [FIG. 30]) to be engaged with the first engaging portion 23R and the second engaging portions 40R1 and 40R2.

The lock lever 43 can be held by the holding member 44 in a state of being moved to the first position by the first swinging motion. In other words, the holding member 44 can hold the lock lever 43 in the first position.

As shown in FIG. 4 and FIG. 10 (FIG. 20), the holding member 44 is fixed to the coupling plate 33 via the base plate 48. The board 48 is fixed to the left part of the upper connecting part 33a of the coupling plate 33 by bolts. The holding member 44 is a bent bar-like member. One end side of the holding member 44 is fixed to the base plate 48.

The holding member 44 extends upward from the base plate 48, then bends and extends rearward and rightward, further bends and extends rearward. The holding member 44 has a holding portion 44a on the other end side. The holding portion 44a is a portion that can hold the lock lever 43 at the first position. The holding portion 44a is a portion extended rearward (toward the lock lever 43 side), and the lock lever 43 can be hooked and held on the left side of the holding portion 44a (see FIG. 13).

The lock lever 43 is biased in the direction toward the second position (see FIG. 5) by the pushing member 42, but the lock lever 43 can be held in the first position (see FIG. 8) by being held by the holding portion 44a.

Next, the second swing of the lock lever 43 will be described.

The locking mechanism includes a support mechanism that supports the lock lever 43 so as to allow the second swinging.

The support mechanism supports the lock lever 43 so as to swing the lock lever 43 in a direction in which the lock lever 43 approaches the holding member 44 (hereinafter referred to as a "third direction"), and swing in a direction away from the holding member 44 (hereinafter referred to as a "fourth direction").

The support mechanism includes a first shaft 61, a third shaft 63, a fourth shaft 64, a fifth shaft 65, a first pressing member 55, a second pressing member 59, a first elongated hole 51d, and a second elongated hole 43a, shown in FIG. 9 and FIG. 10 (FIG. 20) [FIG. 33].

A gap formed between the inner surface of the first elongated hole 51d and the outer peripheral surface of the third shaft 63 and a gap formed between the inner surface of the second elongated hole 43a and the outer peripheral surface of the fifth shaft 65 are allowances (clearances) allowing the second swinging of the lock lever 43.

The first pressing member 55 externally fitted to the first shaft 61 and the second pressing member 59 fitted over the fourth shaft 64 apply the pressing forces in the third direction (forward) to the lock lever 43. This pressing force is applied to the lock lever 43 by extending the compression springs constituting the first pressing member 55 and the compression spring constituting the second pressing member 59.

When the lock lever 43 receives the pressing force in the third direction (forward), the second elongated hole 43a relatively moves with respect to the fifth shaft 65, and the first elongated hole 51d moves with respect to the third shaft 63, relatively.

As the result, the lock lever 43 swings in a direction indicated by the arrowed line B2 about the fifth shaft 65 as a fulcrum, and the other end portion (the upper end portion) 43b of the lock lever 43 approaches the holding member 44.

Further, when a force in the fourth direction (rearward) acts on the lock lever 43, the compression springs constituting the first pressing member 55 and the second pressing member 59 are shortened. In addition, the second elongated hole 43a moves relative to the fifth shaft 65, and the first elongated hole 51d moves relative to the third shaft 63.

As a result, the lock lever 43 swings in the direction indicated by the arrowed line B1 around the fifth shaft 65 as a fulcrum, and the other end (the upper end) 43b of the lock lever 43 separates from the holding member 44. The force in the fourth direction is a force generated by rotation of the working tool detection lever 45 described later.

As shown in FIG. 10 (FIG. 20) [FIG. 33], the working tool detection lever 45 is supported by a support shaft 66 that protrudes from the second support plate 38 in one direction (leftward) in the machine width direction. The working tool detection lever 45 has a cylindrical boss 67 and is rotatable about the axis X1 of the support shaft 66 when the boss 67 is externally fitted to the support shaft 66.

The working tool detection lever 45 is rotatable in a direction indicated by an arrowed line C1 which is one direction around the axis X1 (hereinafter referred to as a "first direction") and in a direction indicated by an arrowed line C2 which is another direction around the axis X1 (hereinafter referred to as a "second direction"). In other words, the working tool detection lever 45 is rotatable in the first direction and in the second direction opposite to the first direction.

The working tool detection lever 45 has a first portion 45a and a second portion 45b. The first portion 45a is formed by bending a plate material. The first portion 45a extends downward from the support shaft 66, then bends and extends leftward. The first portion 45a has a pressure receiving portion 45c.

The pressure receiving portion 45c is a portion (a lower end portion) extending to the left of the first portion 45a. The pressure receiving portion 45c is a portion that receives a pressing force from the bucket 12 when the bucket 12 is attached.

The second portion 45b is formed by bending a bar. One end of the second portion 45b is fixed to the first portion 45a above the support shaft 66. The second portion 45b extends rightward from the support shaft 66, then bends and extends downward, further bends, and extends rearward. The second portion 45b has a latching portion 45d.

The latching portion 45d is a portion extending toward the rear of the second portion 45b (toward the lock lever 43), and the lock lever 43 in the first position can be locked to the left side of the portion (see FIG. 8 and FIG. 12).

In the present embodiment, the first portion 45a and the second portion 45b of the working tool detection lever 45 are formed of separate members, but they may be formed of an integral member. For example, the first portion 45a and the second portion 45b may be formed by bending one bar.

As shown in FIG. 10, each of the pressure receiving portion 45c and the latching portion 45d is disposed below the support shaft 66. Thereby, when the working tool detection lever 45 rotates around the axis X1 of the support shaft 66, the pressure receiving portion 45c and the latching portion 45d move in the same direction.

In particular, when the working tool detection lever 45 is rotated in the first direction (the direction indicated by the arrowed line C1), the pressure receiving portion 45c and the latching portion 45d move forward (in the direction approaching the bucket 12). When the working tool detection lever 45 rotates in the second direction (the direction indicated by the arrowed line C2), the pressure receiving portion 45c and the latching portion 45d move rearward (direction away from the bucket 12).

The latching portion 45d is disposed below the holding portion 44a and is located at a position in the vertical direction from the fourth shaft 64 which is the swinging fulcrum of the lock lever 43 as compared with the holding portion 44a.

Thus, the other end portion (the upper end portion) of the lock lever 43 is located to the left of the state (see FIG. 13) held by the holding portion 44a in a state where it is engaged with the latching portion 45d (see FIG. 12).

The latching portion 45d is disposed on the right side of the holding portion 44a and is located at a position closer to the fourth shaft 64 which is the swinging fulcrum of the lock lever 43 than the holding portion 44a in the machine width direction from.

As shown in FIG. 10 (FIG. 20) [FIG. 33], the locking mechanism further includes a rotary pushing member 60.

The rotary pushing member 60 is constituted of a torsion spring, and is attached to the support shaft 66. One end portion of the rotary pushing member 60 is engaged with the latching portion 37b provided on the first support plate 37. The other end portion of the rotary pushing member 60 is engaged with a second engaging portion 45e provided in the working tool detection lever 45.

The latching portion 37b is disposed above the support shaft 66, and the second latching portion 45e is disposed below the support shaft 66. The rotary pushing member 60 applies an pushing force that rotates in the first direction (the direction indicated by the arrowed line C1) around the axis X1 with respect to the working tool detection lever 45.

The action (operation) of the locking mechanism will be described below. The process of shifting from the detached state to the inserted state, which will be described below, is referred to as "in attaching", and the process of shifting from the released state to the disengaged state is referred to as "in detaching".

<Attached State of Bucket (Working Tool)>

FIG. 3 to FIG. 7 and FIG. 11 show a state in which the bucket 12 is attached to the attachment body 11 (hereinafter referred to as an "attached state"). In the attached state, the hooking portions 22L and 22R of the bucket 12 are hooked on the upper rod 31 of the attachment body 11.

In addition, the first lock pin 41L is engaged with the first engaging portion 23L of the bucket 12 and the second engaging portion 40L of the attachment body 11. The second lock pin 41R is engaged with the first engaging portion 23R of the bucket 12 and the second engaging portion 40R of the attachment body 11.

That is, the lock pins (the first lock pin 41L and the second lock pin 41R) are in the attaching position. Further, the first lock pin 41L and the second lock pin 41R are urged toward the attachment position by the pushing member 42. As a result, the locking mechanism is in a state (a locked state) in which the bucket 12 is attached to the attachment body 11.

Since the first lock pin 41L is in the attaching position, the lock lever 43 connected to the first lock pin 41L is in the second position. That is, the other end side (the upper end side) of the lock lever 43 is positioned on the right side, and the one end side (the lower end side) is positioned on the left side.

The working tool detection lever 45 is in a position where the pressure receiving portion 45c is in contact with the first engaging portion 23L of the bucket 12 and is pushed by the first engaging portion 23L and rotated in the second direction (rearward). Thus, the pressure-receiving portion 45c and the latching portion 45d are located rearward (the side away from the bucket 12). The latching portion 45d is not in contact with the lock lever 43 and does not engage the lock lever 43.

<Unlocked State>

In order to release the lock from the attached state in which the locking mechanism is in the locked state, the operator manually pivots the lock lever 43, moves the other end side (the upper end side) of the lock lever 43 to the left, move one end side (the lower end side) to the right. Then, the other end side of the lock lever 43 is engaged with the latching portion 45d of the working tool detection lever 45.

As a result, the locking mechanism is unlocked (hereinafter referred to as a "released state").

FIG. 8 and FIG. 12 show the released state. In the release state, the first lock pin 41L is disengaged from the first engaging portion 23L of the bucket 12 and the second engaging portion 40L1 of the attachment body 11. The second lock pin 41R is detached from the first engaging portion 23R of the bucket 12 and the second engaging portion 40R2 of the attachment body 11.

That is, the lock pins (the first lock pin 41L and the second lock pin 41R) are in the releasing position. Thus, the bucket 12 can be detached from the attachment body 11.

The lock lever 43 is in the first position and is held in the first position by the latching portion 45d of the working tool detection lever 45. Here, since the lock lever 43 is pressed forward by the pressing force of the first pressing member 55 and the second pressing member 59, which is a direction approaching the holding member 44, the locking by the latching portion 45*d* is reliable.

Since the state in which the pressure receiving portion 45*c* is in contact with the first engaging portion 23L of the bucket 12 is maintained, the working tool detection lever 45 is at the same position as the attached state.

<Disengaged State of Bucket (Working Tool)>

Figure 13:
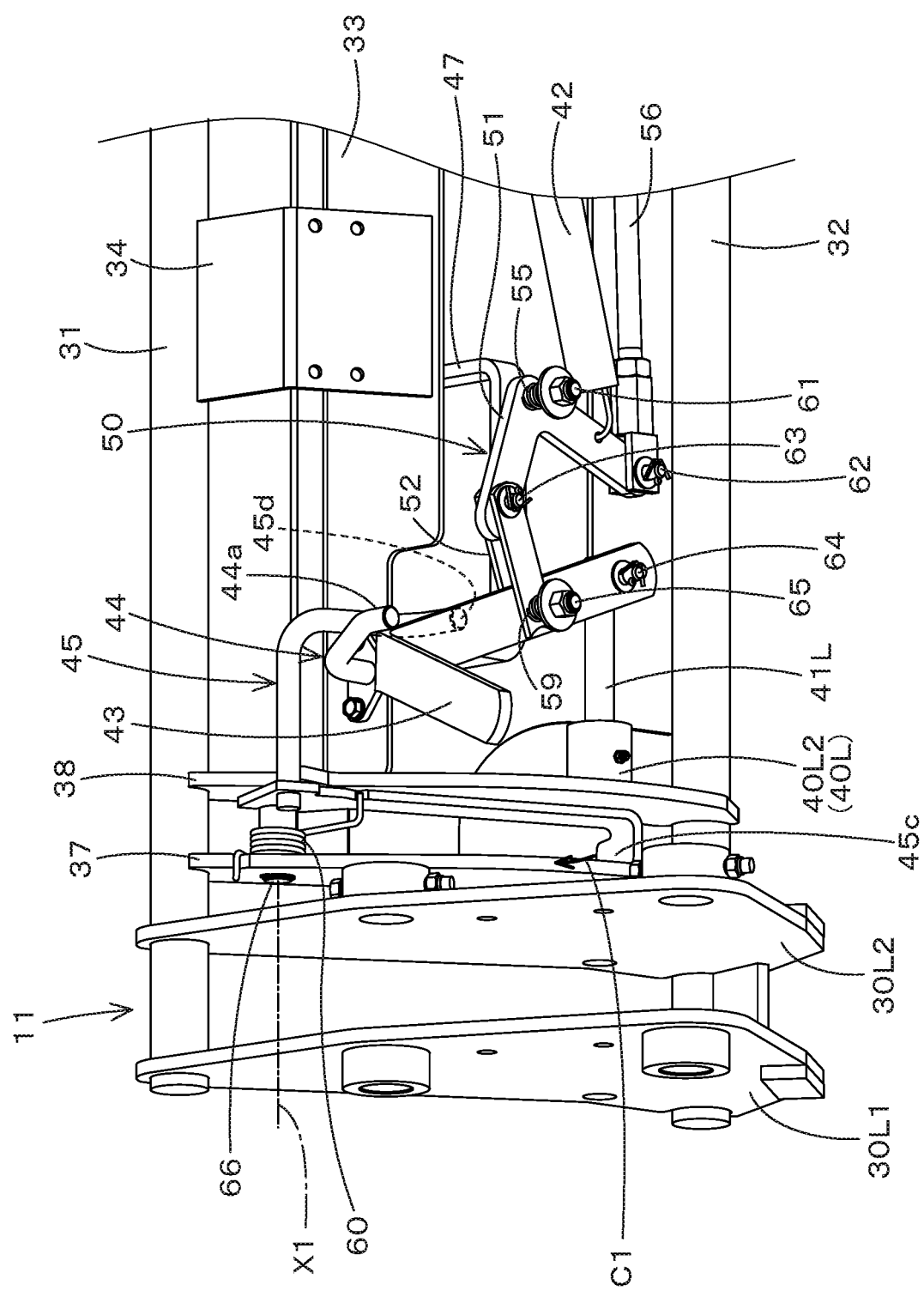
FIG. 13 is a back surface perspective view illustrating a state (a detaching state) where the working tool is detached from the attachment body according to the embodiment.

FIG. 13 shows a state (hereinafter referred to as a "disengaged state") in which the bucket 12 is detached from the attachment body 11. When the bucket 12 is detached from the attachment body 11, the first engaging portion 23L of the bucket 12 separates from the pressure receiving portion 45*c* of the working tool detecting lever 45.

Thus, the pressure receiving portion 45*c* is in a state not receiving the pressing force from the bucket 12, and rotates forward in the first direction (the direction indicated by the arrowed line C1) around the axis center X1 by the pushing force of the rotary pushing member 60. Along with this rotation, the latching portion 45*d* also moves forward, and the lock lever 43 is disengaged from the latching portion 45*d*.

When the lock lever 43 is disengaged from the latching portion 45*d*, the lock lever 43 rocks around the fourth shaft 64 as a fulcrum by the pushing force of the pushing member 42. As a result, the other end side (the upper end side) of the lock lever 43 moves to the right and is caught by and held by the holding portion 44*a* of the holding member 44.

That is, when the bucket 12 is detached from the attachment body 11, the working tool detection lever 45 rotates in the first direction, and the state where the lock lever 43 is locked to the latching portion 45*d* at the first position. The engagement of the lock lever 43 with respect to the latching portion 45*d* is released, and the lock lever 43 from which the lock is released is held by the holding portion 44*a*.

Here, since the lock lever 43 is pushed forward by the pressing force of the first pressing member 55 and the second pressing member 59, which is the direction approaching the holding member 44, the holding by the holding portion 44*a* is reliably performed.

As described above, the lock lever 43 is disengaged from the engagement by the latching portion 45*d* by the rotation of the working tool detection lever 45 in the first direction, but the lock lever 43 is held by the holding portion 44*a* of the holding member 44.

That is, the lock lever 43 moves from the latching portion 45*d* to the holding portion 44*a* of the holding member 44 by detaching from the locking by the latching portion 45*d* of the working tool detection lever 45. However, the lock lever 43 is held by the holding portion 44*a* of the holding member 44, and stays at the first position.

The lock lever 43 is positioned on the first position (the other end side (the upper end side) is on the left side and the one end side (the lower end side) is on the right side) in both of the latched state by the latching portion 45*d* and the held state by the holding portion 44*a*). However, the other end side (the upper end side) is located leftward than that of the holding state (see FIG. 13) by the holding portion 44*a* in the latched state (see FIG. 12) by the latching portion 45*d*.

<Inserted State of Bucket (Working Tool)>

Figure 14:
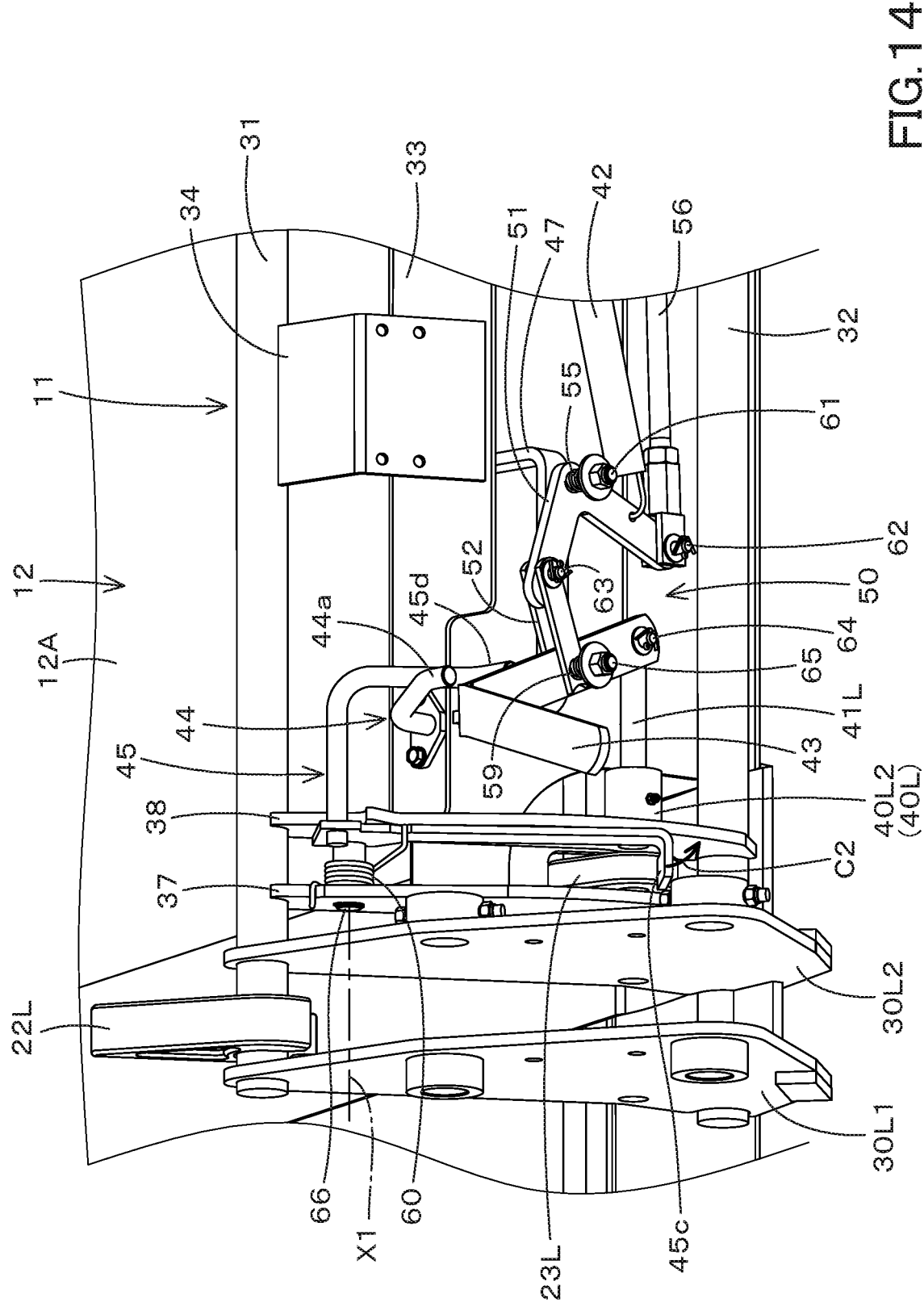
FIG. 14 is a back surface perspective view illustrating a state (an inserting state) where the working tool is inserted into the attachment body according to the embodiment.

FIG. 14 shows a state (hereinafter referred to as an "inserted state") in which the bucket 12 is inserted into the attachment body 11. FIG. 15 shows the detached state (the left figure) and inserted state (the right figure) of the bucket 12. The inserted state is a state before the attachment state, in which the bucket 12 is in the same position as the attachment state but the lock by the locking mechanism is released.

When the bucket 12 is inserted into the attachment body 11, the pressure receiving portion 45*c* of the working tool detection lever 45 receives a pressing force from the first engaging portion 23L of the bucket 12. As a result, the working tool detection lever 45 rotates in the second direction (the direction indicated by the arrowed line C2) around the axis X1 against the pushing force of the rotary pushing member 60.

When the working tool detection lever 45 rotates in the second direction (rearward), the latching portion 45*d* pushes the lock lever 43 rearward. As a result, the other end side (upper end side) of the lock lever 43 moves rearward (away from the bucket 12), and the holding of the lock lever 43 by the holding portion 44*a* is released.

When the holding of the lock lever 43 by the holding portion 44*a* is released, the lock lever 43 moves toward the second position by the pushing force of the pushing member 42, and the lock pin (the first lock pin 41L and the second lock pin 41R) becomes the attachment position. As a result, the locking mechanism is in the locked state, and the bucket 12 is attached to the attachment body 11 to be in the attached state.

FIG. 16 to FIG. 27 are views showing a second embodiment of the front loader 8.

In the second embodiment, the configuration different from the first embodiment will be mainly described, the same reference numerals are given to the configurations common to the first embodiment, and the explanation thereof will be omitted.

The first position and the second position in the second embodiment are the same positions as the first position and the second position in the first embodiment, respectively. Further, the first direction and the second direction in the second embodiment mean the same direction as the first direction and the second direction in the first embodiment.

In the front loader 8 of the second embodiment, the configuration of the attachment body 11 is different from that of the first embodiment. The differences will be described below.

Figure 16:
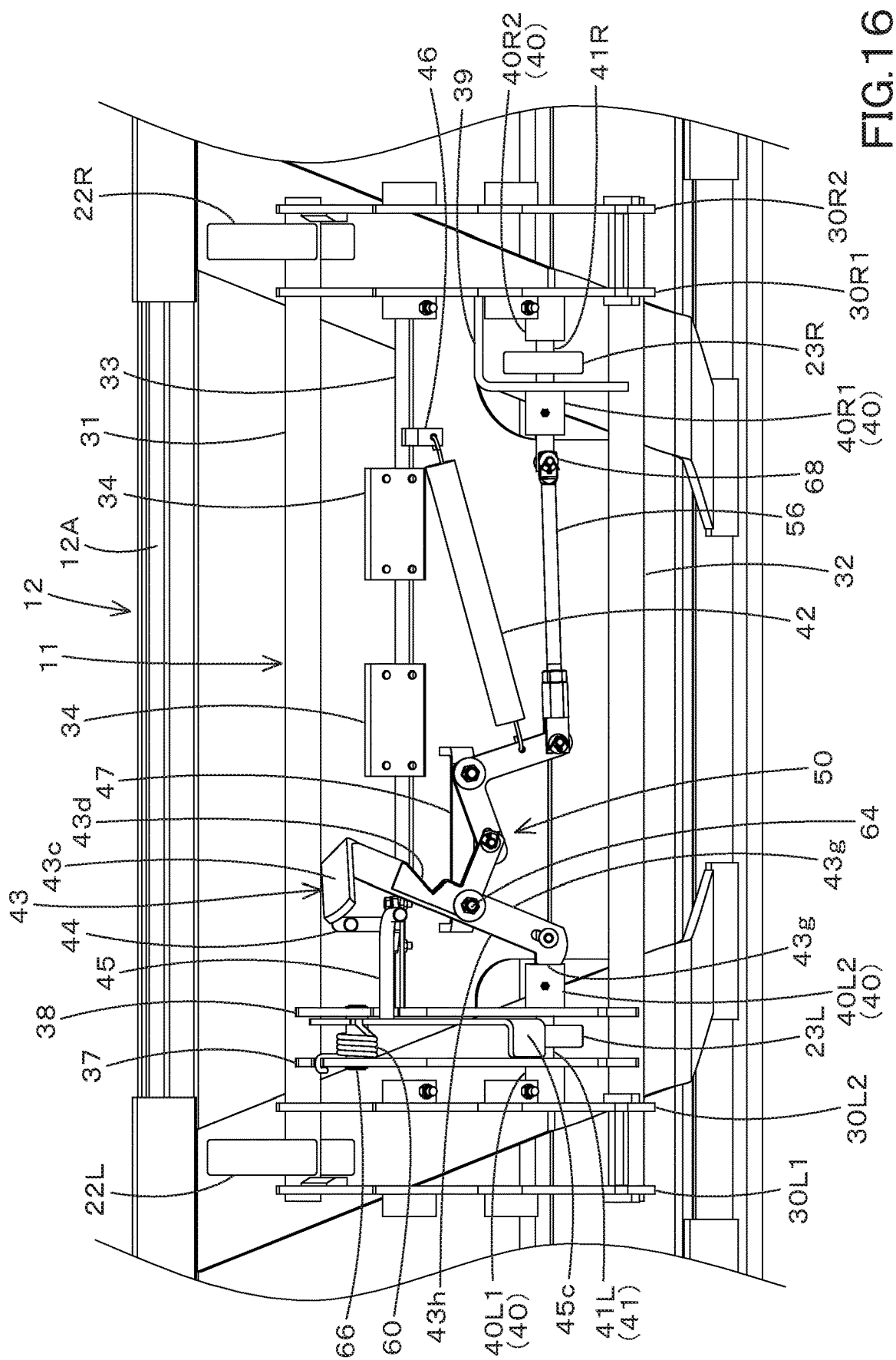
FIG. 16 is a back surface view illustrating a main portion is a state where a working tool is attached to an attachment body according to a second embodiment of the present invention.
Figure 17:
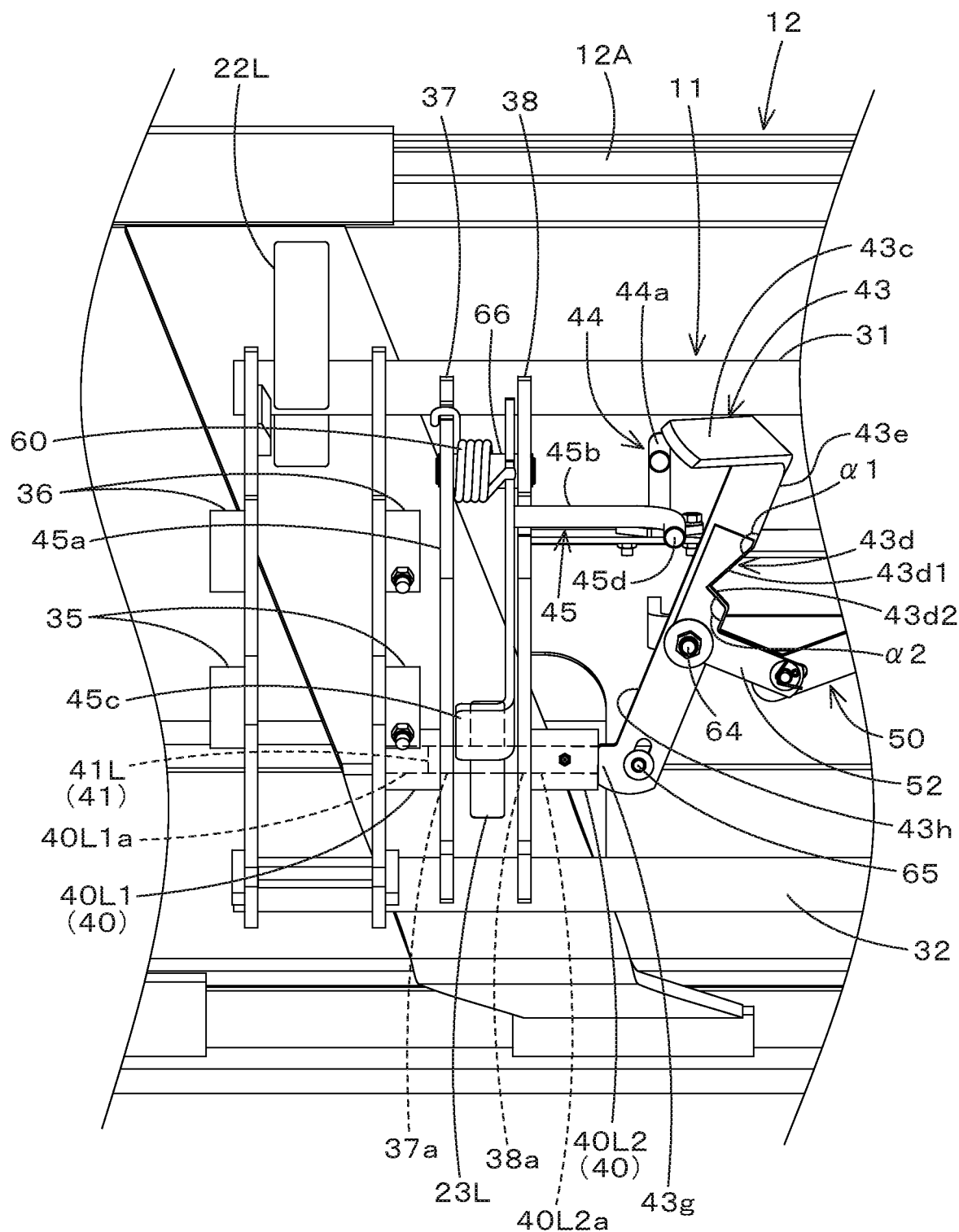
FIG. 17 is a back surface view illustrating a left portion (on a first lock pin side) of the state where the working tool is attached to the attachment body according to the second embodiment.

As shown in FIG. 16, FIG. 17, and the like, in the attachment body 11 of the front loader 8 of the second embodiment, the lock lever 43 has a cutout portion 43*d*. The cutout portion 43*d* is provided between the grip portion 43*c* and the fourth shaft 64 (a fulcrum of swinging of the lock lever 43). The cutout portion 43*d* is formed by cutting out a right edge portion (an edge portion on the machine inward side) 43*e* of the lock lever 43 into a triangular shape.

Figure 27:
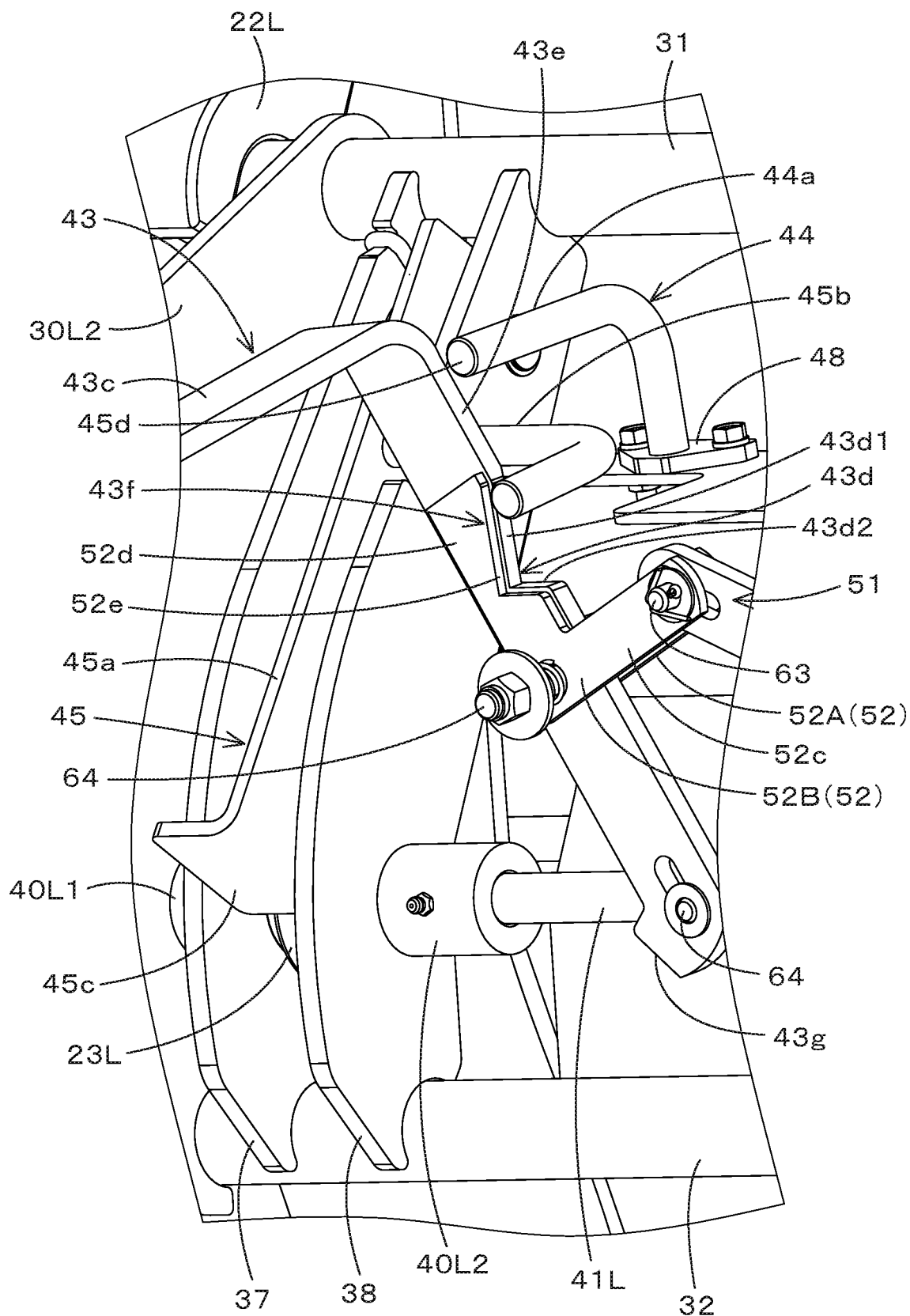
FIG. 27 is a back surface perspective view illustrating the working tool detection lever, the lock lever, the retaining member, and the like under the released state according to the second embodiment.

As shown in FIG. 17 and FIG. 27, the cutout portion 43*d* has a first edge portion 43*d*1 and a second edge portion 43*d*2. The second edge portion 43*d*2 is provided below the first edge portion 43*d*1 (toward the fourth axis 64).

The first edge portion 43*d*1 and the second edge portion 43*d*2 are inclined with respect to the right edge portion 43*e* of the lock lever 43. Specifically, the first edge portion 43*d*1 is inclined so as to shift from the right edge portion 43*e* (toward the outside of the vehicle body) toward the one end side (the lower end side) of the lock lever 43.

The second edge portion 43*d*2 is inclined so as to shift from the right edge portion 43*e* (toward the outside of the vehicle body) toward the other end side (the upper end side) of the lock lever 43. The angle $\alpha 1$ formed between the first edge portion 43*d*1 and the right edge portion 43*e* is larger than the angle $\alpha 2$ formed by the second edge portion 43 *d* 2 and the right edge portion 43 *e* ($\alpha 1 > \alpha 2$). Both the angle $\alpha 1$ and the angle $\alpha 2$ are obtuse angles.

Figure 19:
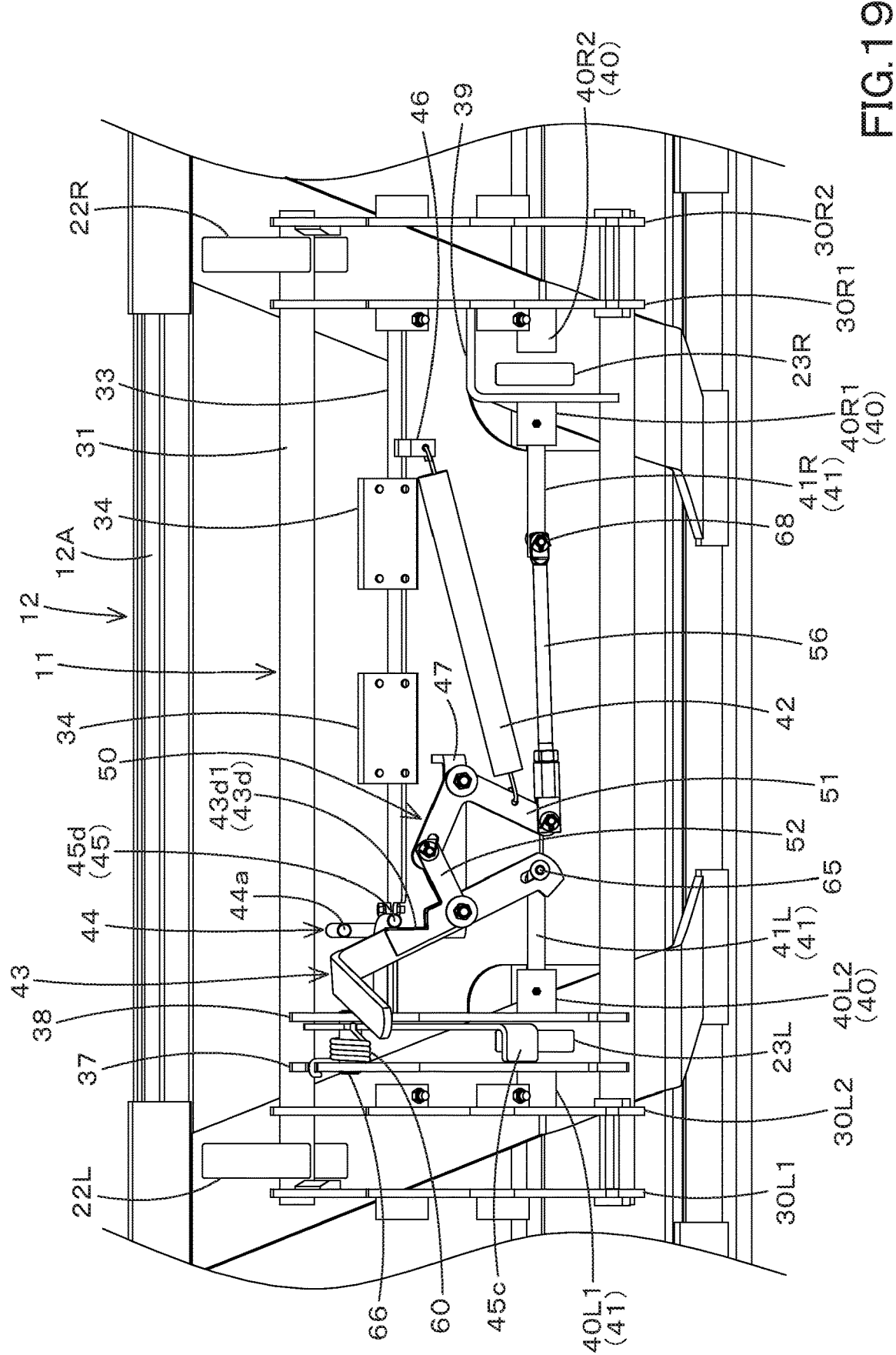
FIG. 19 is a back surface view illustrating a state where locking between the working tool and the attachment body is released according to the second embodiment.

The length of the first edge portion 43*d*1 and the length of the second edge portion 43*d*2 are larger than the diameter of the latching portion 45d. As shown in FIG. 19, when the lock lever 43 is in the first position, the first edge portion 43d1 extends in the vertical direction.

In other words, the first edge portion 43d1 follows the track along which the latching portion 45d moves when the lock lever 43 is in the first position and the working tool detection lever 45 rotates in the first direction.

Figure 20:
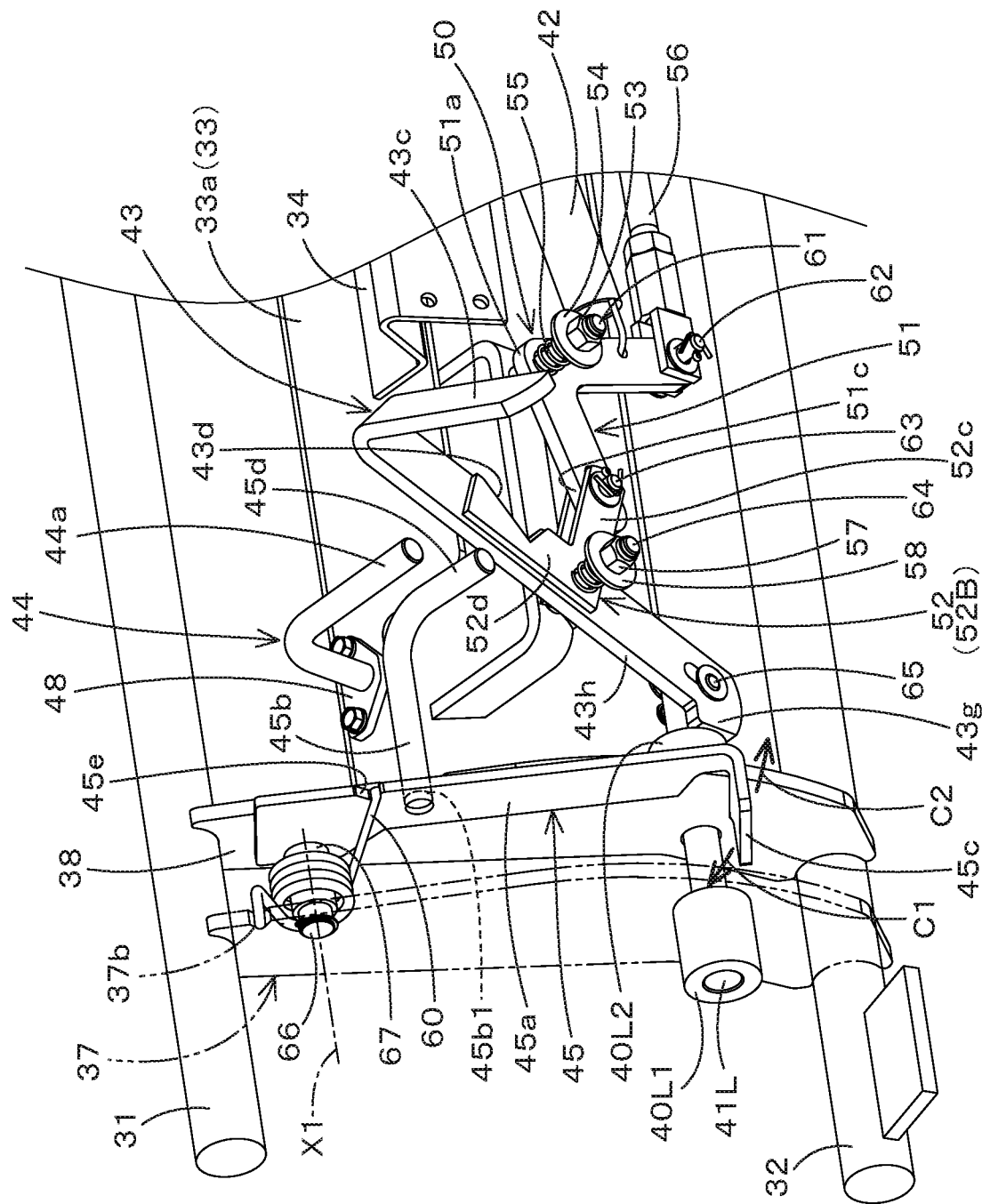
FIG. 20 is a back surface perspective view illustrating a working tool detection lever, a lock lever, a retaining member, the linkage mechanism, and the like of the state where the working tool is attached to the attachment body according to the second embodiment.

As shown in FIG. 20, FIG. 27, and the like, the second link member 52 of the link mechanism 50 is formed in an L-shape. Specifically, the rear member 52B of the second link member 52 is formed in an L-shape.

The rear member 52B has one portion 52c extending from the portion pivotally supported by the fourth shaft 64 toward the third shaft 63 side and the other portion 52d extending upward along the lock lever 43 from a portion pivotally supported by the fourth shaft 64, respectively.

As shown in FIG. 27, the other portion 52d is provided with a cutout portion 52e (hereinafter referred to as a "second cutout portion 52e") having the same shape as the cutout portion 43d of the lock lever 43.

The second cutout portion 52e is arranged so as to overlap with the cutout portion 43d. As a result, the thick portion 43f in which the cutout portion 43d and the second cutout portion 52e are overlapped is formed.

In the thick portion 43f, the second cut portion 52e is provided in both the front member 52A and the rear member 52B of the second link member 52, and the thick portion 43f may be formed by overlapping both the second cut portions 52e with the cut portion 43d. Further, the thickness of the cutout portion 43d of the lock lever 43 may be increased to form the thick portion 43f.

Figure 22:
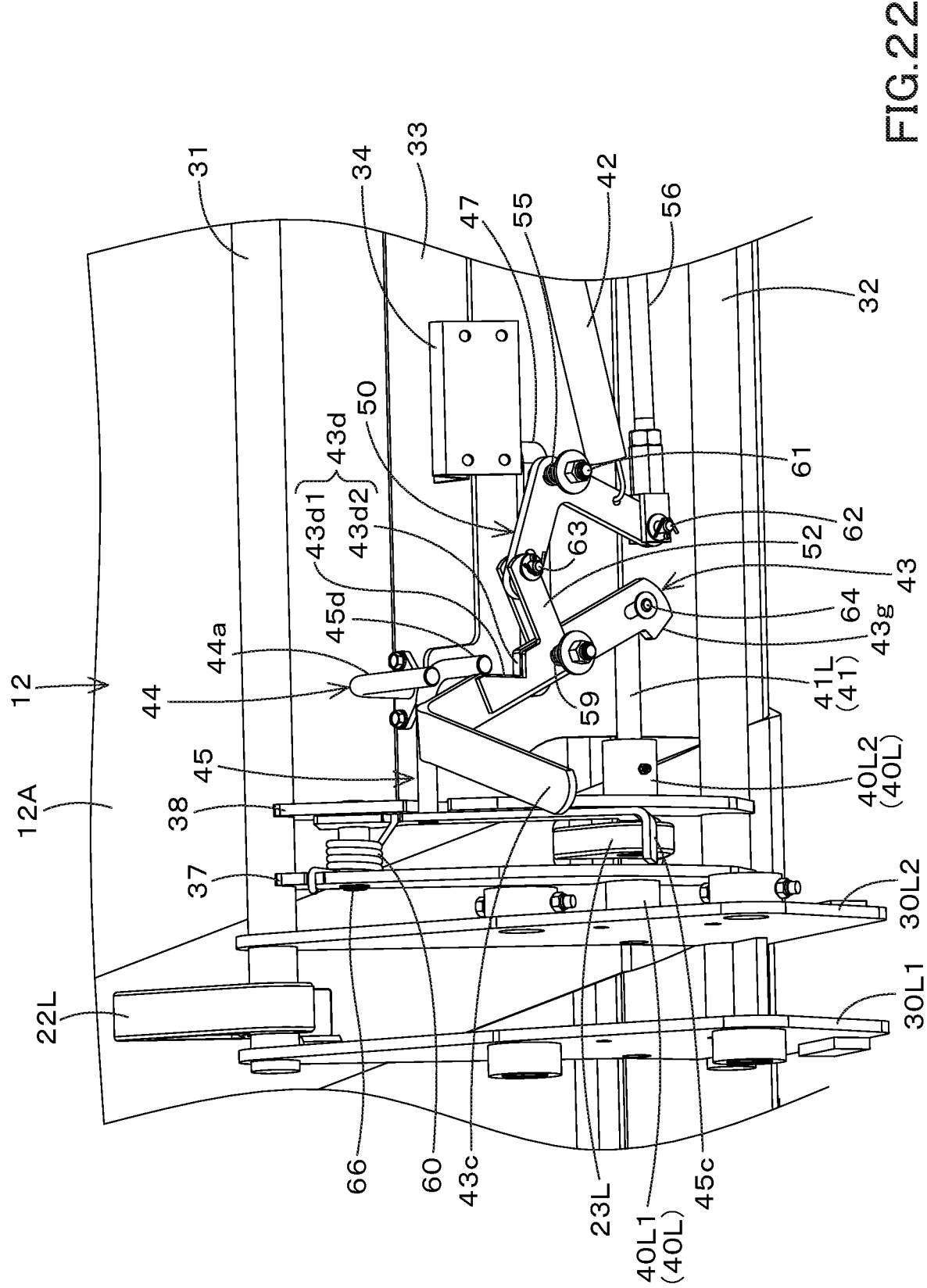
FIG. 22 is a back surface perspective view illustrating a state (a released state) where the locking of the working tool caused by a locking mechanism is released according to the second embodiment.

As shown in FIG. 19, FIG. 22, and FIG. 27, when the lock lever 43 is in the first position, the latching portion 45d of the working tool detection lever 45 abuts against the cutout portion 43d. The first edge portion 43d1 of the cutout portion 43d guides the latching portion 45d in a direction in which the lock lever 43 in the first position is not pushed when the working tool detection lever 45 rotates in the first direction.

This prevents the lock lever 43 in the first position from being pushed and being swung by the latching portion 45d. The operation of the cutout portion 43d will be described in detail later.

Figure 18:
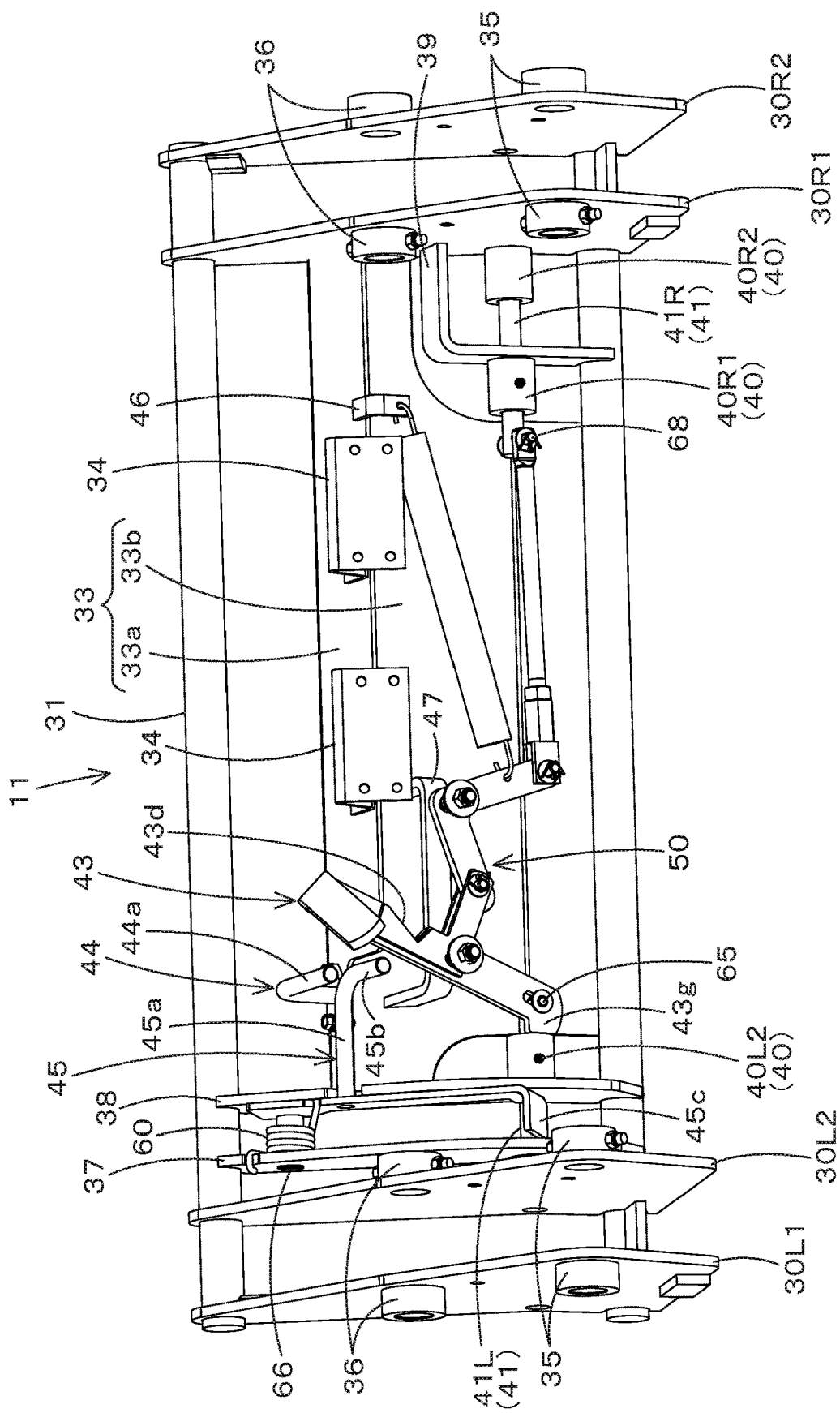
FIG. 18 is a back surface perspective view of the attachment body according to the second embodiment.

As shown in FIG. 16 to FIG. 18 and the like, a stopper portion 43g is provided on one end side (the lower end side) of the lock lever 43. A lock pin (a first lock pin 41L) is connected to one end side of the lock lever 43.

That is, in the lock lever 43, the stopper portion 43g and the portion to which the lock pin (the first lock pin 41L) is connected are provided on the same side (the lower end side) in the vertical direction.

The stopper portion 43g is a portion for restricting the end position of the swinging when the lock lever 43 swings toward the second position. The stopper portion 43g is provided on the left edge portion 43h of the lock lever 43 and protrudes to the left from the left edge portion 43h.

That is, the stopper portion 43g is provided on the edge portion (the left edge portion 43h) opposite to the edge portion (the right edge portion 43e) where the cutout portion 43d is provided. The stopper portion 43g moves in the same direction as the direction of the movement as the first lock pin 41L moves.

The stopper portion 43g is disposed to the right of the second engaging portion 40L2 and protrudes toward the second engaging portion 40L2. When the lock lever 43 swings toward the second position, the stopper portion 43g strikes the right surface (the surface on the inner side of the vehicle body) of the second engaging portion 40L2 (see FIG. 16 to FIG. 18).

As a result, the swinging of the lock lever 43 stops, so that the end position of the swinging motion is restricted. The operation of the stopper portion 43g will be described in detail later.

Figure 25:
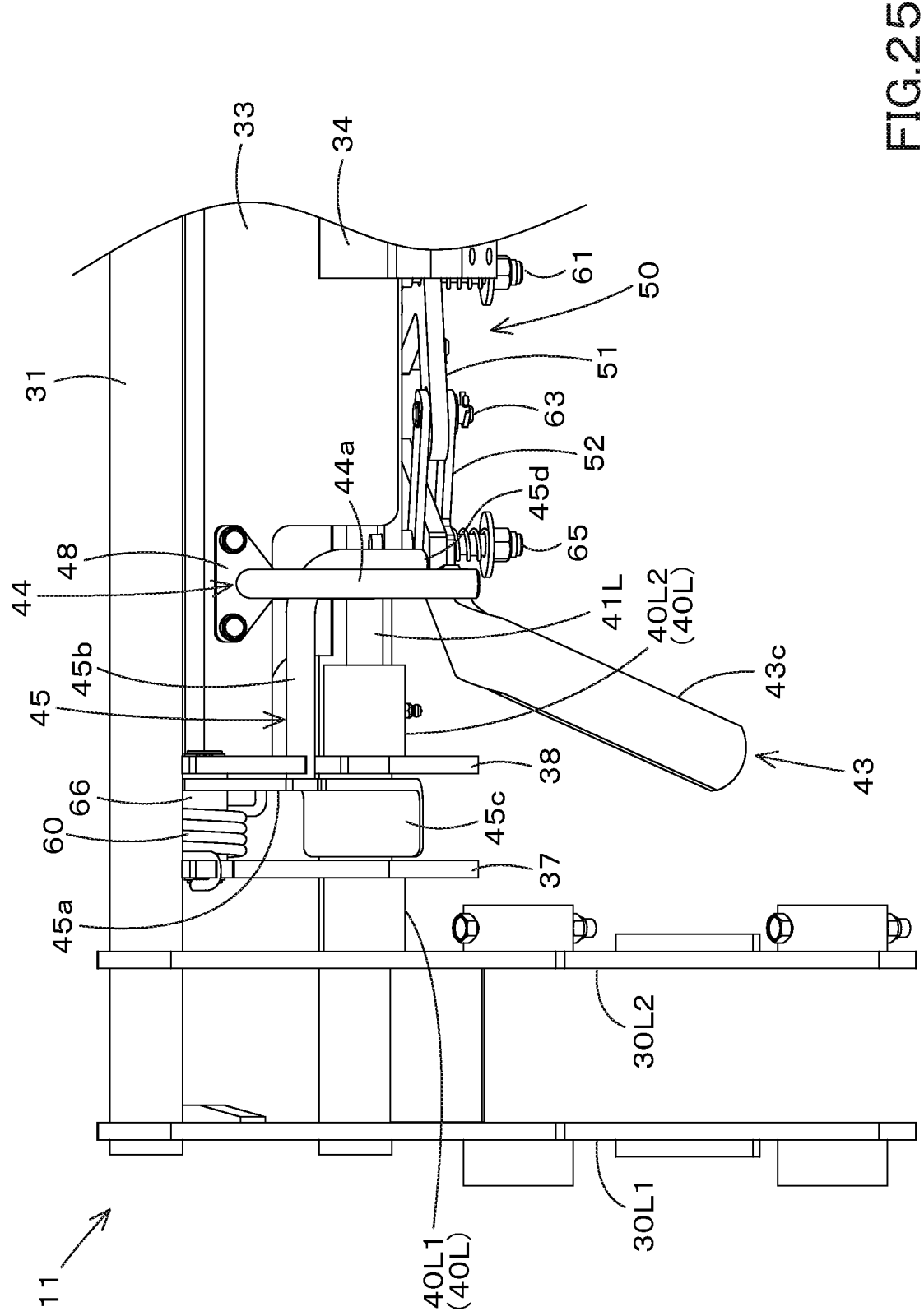
FIG. 25 is a plan view illustrating the state (the detaching state) where the working tool is detached from the attachment body according to the second embodiment, which is seen from above.

The holding member 44 of the second embodiment is different in shape from the holding member 44 of the first embodiment. As shown in FIG. 20, FIG. 25, FIG. 27, and the like, the holding member 44 of the second embodiment extends upward from the base plate 48, then bends and extends rearward.

The holding member 44 of the first embodiment has two bent portions (see FIG. 10 and others), but the holding member 44 of the second embodiment has one bent portion. Thus, the holding member 44 of the second embodiment has a simpler shape than the holding member 44 of the first embodiment. Thus, it is easy to manufacture the holding member 44, and thus the manufacturing cost can be reduced.

In the holding member 44 of the second embodiment, the other end side than the bent portion is a holding portion 44a that can hold the lock lever 43 in the first position. The holding portion 44a is a portion extended rearward (toward the lock lever 43), and the lock lever 43 can be hooked and held on the left side of the holding portion 44a (see FIG. 24).

The lock lever 43 is urged in the direction toward the second position (see FIG. 16) by the pushing member 42, but the lock lever 43 can be held in the first position (see FIG. 19) by being held by the holding portion 44a.

The working tool detecting lever 45 of the second embodiment is different from the working tool detecting lever 45 of the first embodiment in the fixing position and fixing mode of one end portion of the second portion 45b.

As shown in FIG. 20 and the like, in the second portion 45b of the working tool detection lever 45 of the second embodiment, one end portion 45b1 is fixed to the first portion 45a below the support shaft 66. One end portion 45b1 of the second portion 45b is embedded and welded to the first portion 45a.

Thereby, the one end portion 45b1 of the second portion 45b does not protrude to the left from the first portion 45a.

In addition, in the working tool detection lever 45 of the second embodiment, the bent shape of the second portion 45b is different from that of the working tool detection lever 45 of the first embodiment. As shown in FIG. 17, FIG. 20, FIG. 25 and the like, the second portion 45b extends rightward from the fixed position below the support shaft 66 and then bends and extends rearward.

The second portion 45b of the first embodiment has two bent portions (see FIG. 10 and the like), but the second portion 45b of the second embodiment has one bent portion. Thus, the working tool detection lever 45 of the second embodiment has a simpler shape than the working tool detection lever 45 of the first embodiment. Thus, it is easy to manufacture the working tool detection lever 45, and the manufacturing cost can be reduced.

Similarly to the first embodiment, the latching portion 45d is disposed below the holding portion 44a in the second embodiment, and the fourth shaft 64 which is the swing fulcrum of the lock lever 43 as compared with the holding portion 44a in the vertical direction.

The latching portion 45d is disposed on the right side of the holding portion 44a and is located at a position closer to the fourth shaft 64 which is the swinging fulcrum of the lock lever 43 in the machine width direction than the holding portion 44a.

Figure 21:
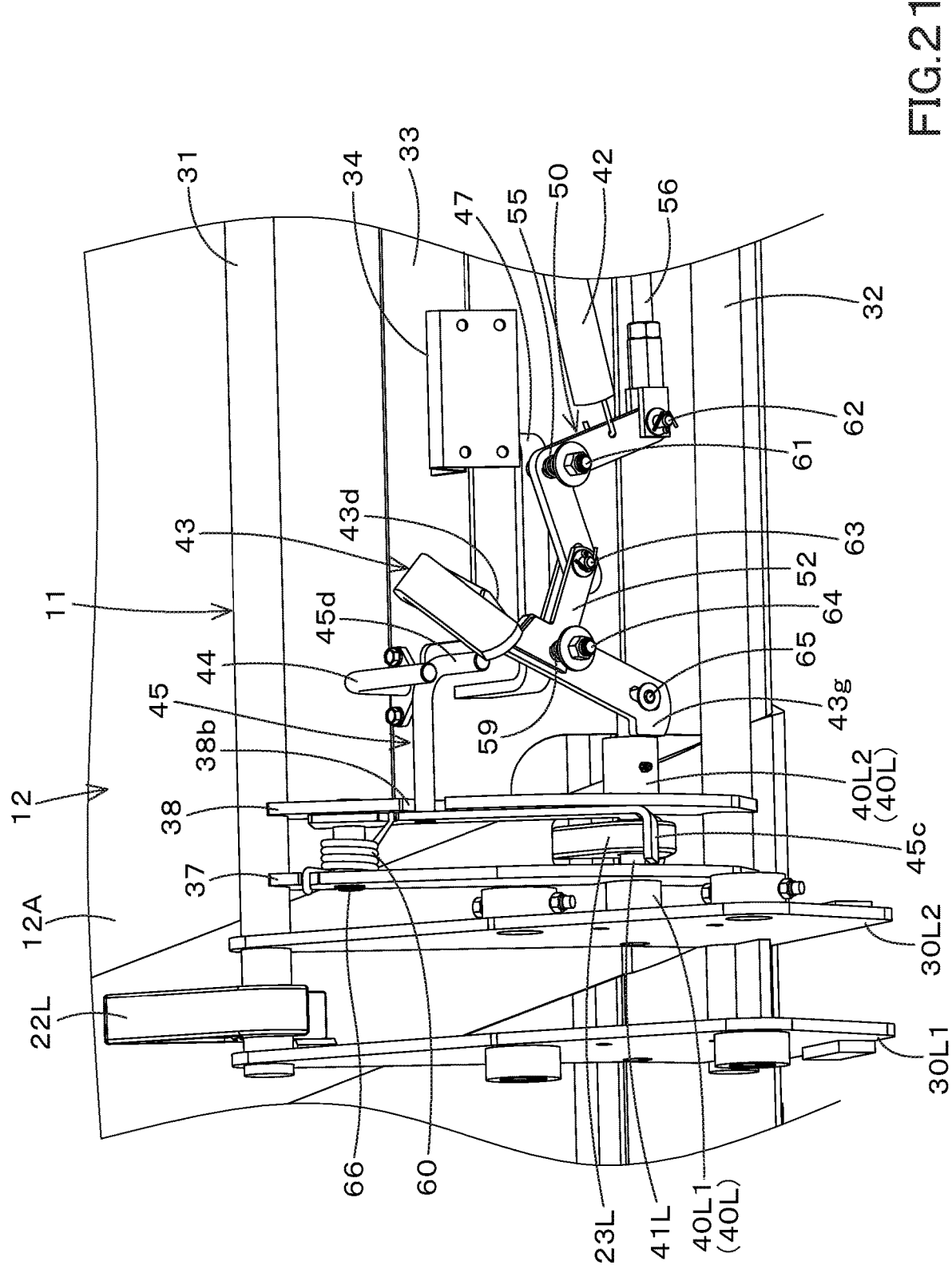
FIG. 21 is a back surface perspective view illustrating the state (the attaching state) where the working tool is attached to the attachment body according to the second embodiment.

As shown in FIG. 21, the second support plate 38 of the attachment body 11 is provided with a recess 38b for avoiding interference with the working tool detection lever 45. The second portion 45b of the working tool detection lever 45 extends through the recess 38b to the first portion 45a.

The working tool detection lever 45 of the second embodiment has an latching portion 45d at the other end side than the bent portion. The latching portion 45d is a portion extending toward the rear of the second portion 45b (toward the lock lever 43), and the lock lever 43 in the first position can be locked to the left side of the portion (see FIG. 19, FIG. 22, and FIG. 27).

As shown in FIG. 17, FIG. 22, FIG. 25, and the like, the holding member 44 and the working tool detection lever 45 intersect without touching each other in the middle portion thereof. Specifically, the intermediate portion of the holding portion 44a of the holding member 44 and the intermediate portion of the second portion 45b of the working tool detection lever 45 are separated in the vertical direction and cross each other when viewed from above. As a result, the holding member 44 and the working tool detecting lever 45 can be disposed close to each other without interfering with each other in a small space.

The operation of the cutout portion 43d and the stopper 43g will be described below with reference to FIG. 16 to FIG. 27. FIG. 16 to FIG. 18 and FIG. 21 show a state (the attached state) in which the bucket 12 is attached to the attachment body 11.

Figure 24:
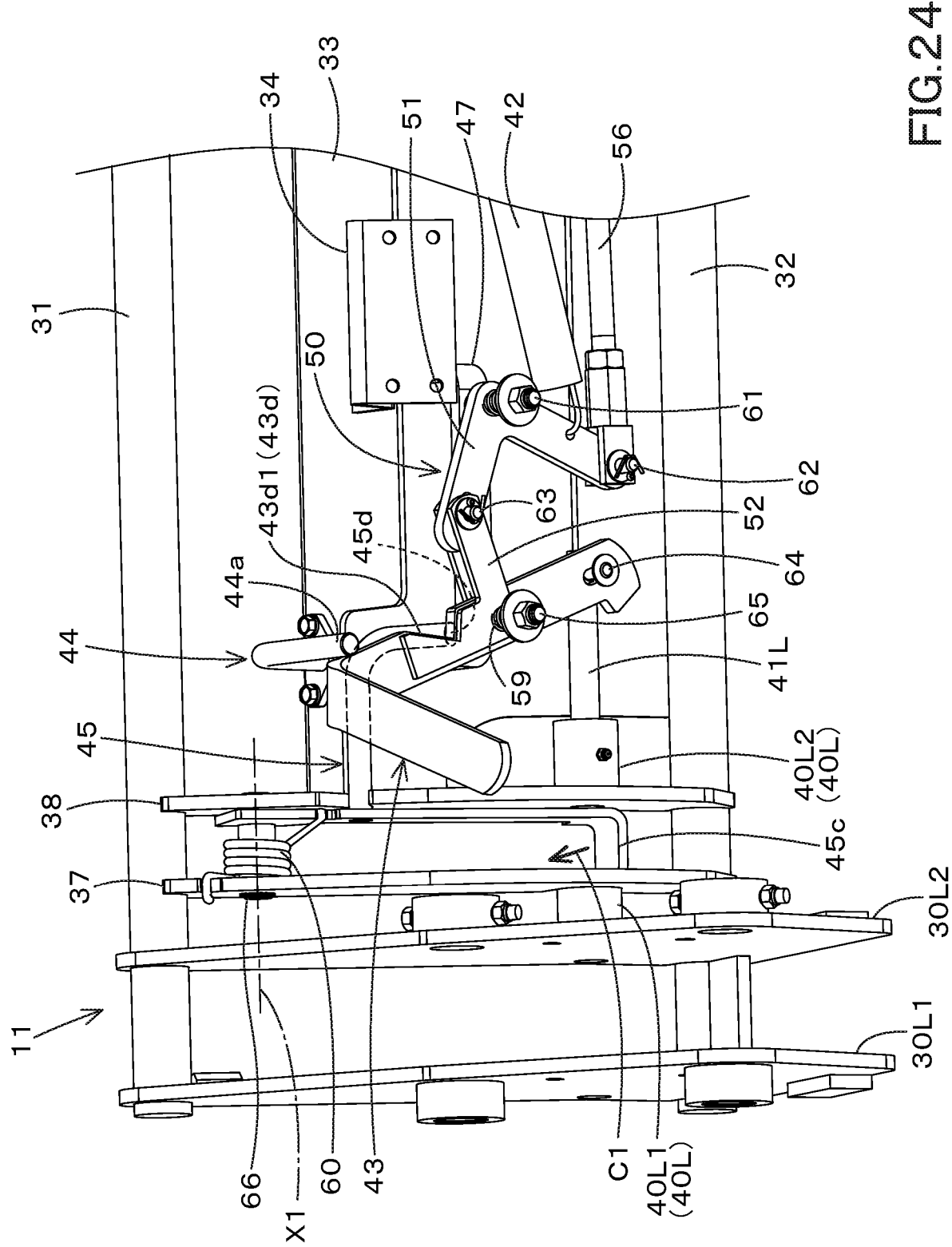
FIG. 24 is a back surface perspective view illustrating a state (a detaching state) where the working tool is detached from the attachment body according to the second embodiment.

FIG. 19, FIG. 22, and FIG. 27 show a state in which the locking mechanism is unlocked (the released state). FIG. 24 and FIG. 25 show a state (the disengaged state) in which the bucket 12 is detached from the attachment body 11.

Figure 23:
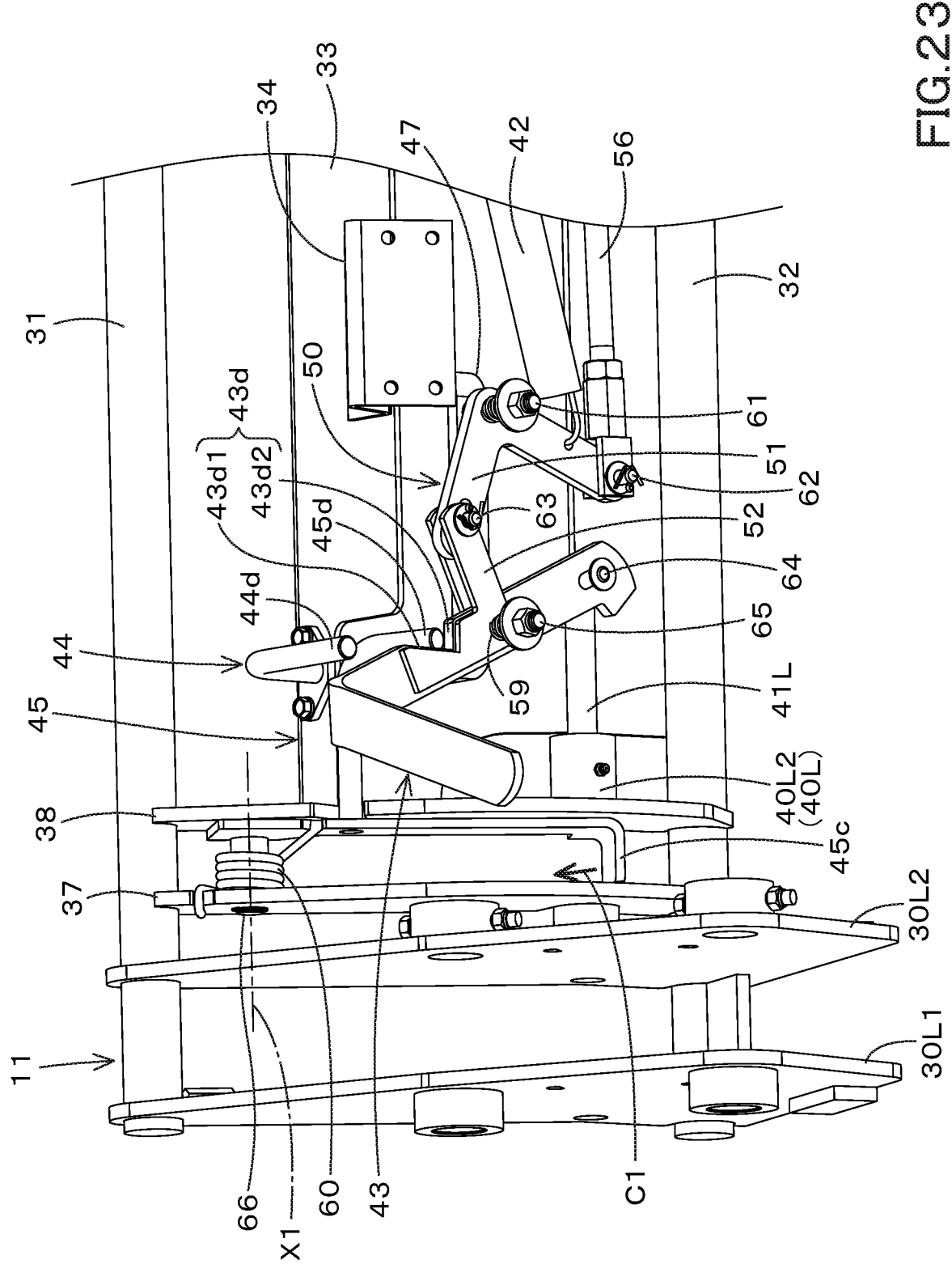
FIG. 23 is a back surface perspective view illustrating an intermediate state of transition from the released state to the detaching state according to the second embodiment.
Figure 26:
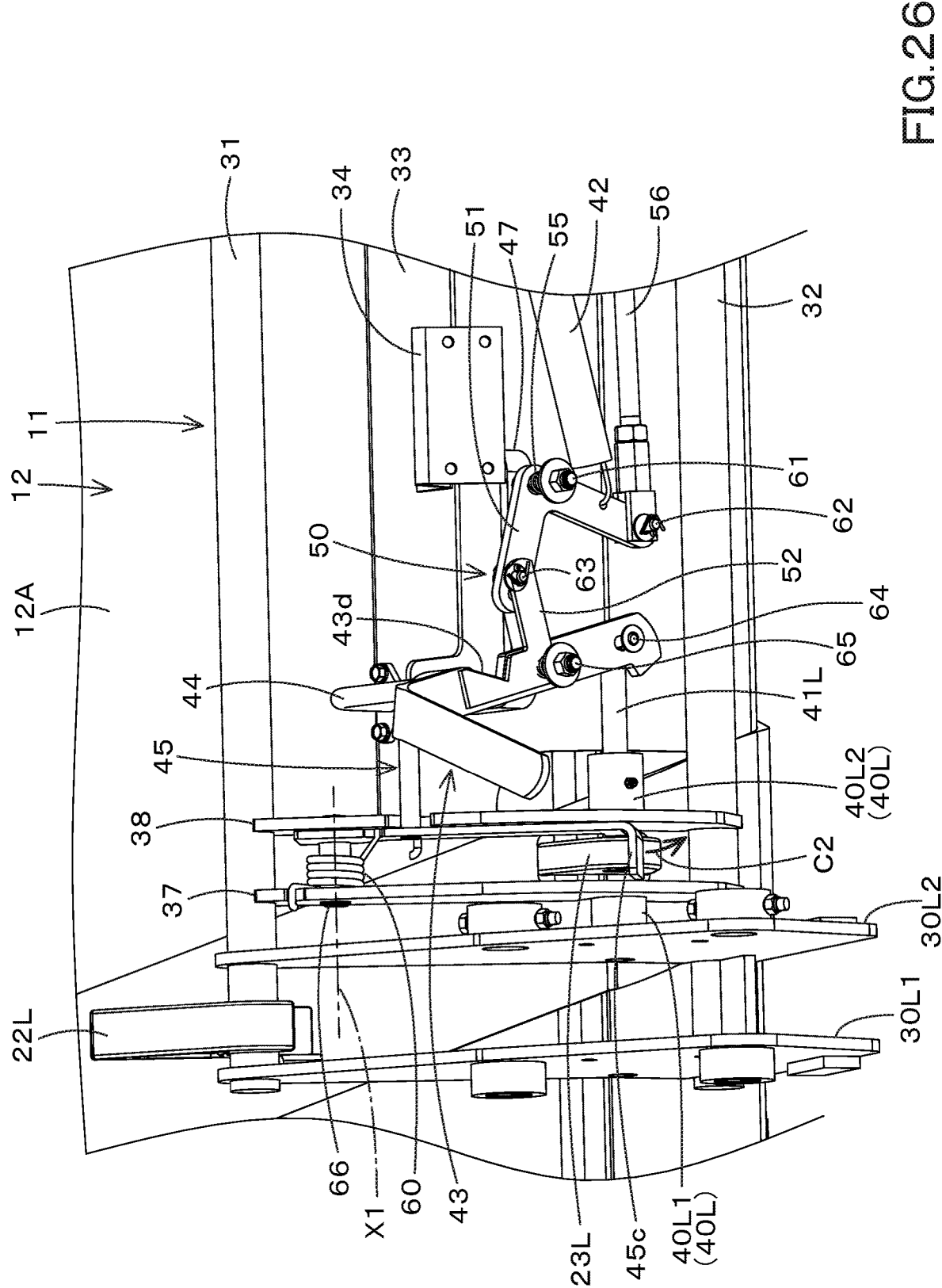
FIG. 26 is a back surface perspective view illustrating a state (an inserting state) where the working tool is inserted into the attachment body according to the second embodiment.

FIG. 23 shows a state in the course of transition from the released state to the detached state. FIG. 26 shows a state (the inserted state) in which the bucket 12 is inserted in the attachment body 11.

The action (operation) of the locking mechanism of the second embodiment is the same as the action (operation) of the locking mechanism of the first embodiment except for the points described below.

<Action of Cutout Portion>

As shown in FIG. 19 and FIG. 22, when the lock lever 43 is in the first position where the lock pin 41 is in the releasing position (that is, in the unlocked state), the latching portion 45d of the working tool detection lever 45 is disengaged and abuts on the cutout portion 43d. Specifically, when the lock lever 43 is in the first position where the lock pin 41 is in the releasing position, the latching portion 45d abuts on the upper portion of the first edge portion 43d1 of the cutout portion 43d.

When the bucket 12 is subsequently detached from the attachment body 11 from the unlocked state, as shown in FIG. 23, the working tool detection lever 45 rotates in the first direction (the direction indicated by the arrowed line C1) which is the front side of the axis X1. As a result, the latching portion 45d of the working tool detecting lever 45 moves downward while moving forward.

The cutout portion 43d guides the latching portion 45d along the cutout portion 43d when the working tool detection lever 45 rotates in the first direction. In other words, when the working tool detection lever 45 rotates in the first direction, the latching portion 45d moves along the cutout portion 43d.

Specifically, the latching portion 45d moves downward (in a direction toward the second edge portion 43d2) along the first edge portion 43d1 of the cutout portion 43d and abuts on the upper portion of the first edge portion 43d1, and the state shifts from the state (see FIG. 22) to a state in which it abuts against the lower portion of the first edge portion 43d1 (see FIG. 23).

Here, since the first edge portion 43d1 extends in the vertical direction which is a direction parallel to the moving direction of the latching portion 45d (see FIG. 19), the latching portion 45d moves along the first edge portion 43d1, and the lock lever 43 is not pushed from the latching portion 45d.

In other words, the first edge portion 43d1 guides the latching portion 45d in a direction in which the lock lever 43 in the first position is not pushed when the working tool detection lever 45 rotates in the first direction. Thus, the lock lever 43 is not pushed by the latching portion 45d and does not swing, so that the lock pins 41L and 41R can be prevented from being detached from the second engaging portions 40L2 and 40R1.

Further, since the thick portion 43f in which the cutout portion 43d and the second cutout portion 52e are overlapped is formed, in the process in which the latching portion 45d moves along the cutout portion 43d, and the latching portion 45d can be prevented from leaving from the cutout portion 43d.

On the other hand, in the case where the cutout portion 43d is not provided in the lock lever 43, the lock lever 43 is pushed to the left by the downward movement of the latching portion 45d, and is swung such that the other end side (the upper end side) moves to the left and one end side (the lower end side) moves to the right around the fourth shaft 64 serving as the fulcrum (the center).

As a result, the lock pins 41L and 41R may be disengaged from the second engaging portions 40L2 and 40R1. When the lock pins 41L and 41R are disengaged from the second engaging portions 40L2 and 40R1, that is not preferable because it is necessary to reinsert the lock pins 41L and 41R into the second engaging portions 40L2 and 40R.

<Operation of Stopper Portion>

When the bucket 12 is inserted into the attachment body 11 as shown in FIG. 26 from the detached state shown in FIG. 24, the pressure receiving portion 45c of the working tool detection lever 45 receives a pressing force from the first engaging portion 23L of the bucket 12.

As a result, the working tool detection lever 45 rotates in the second direction (the direction indicated by the arrowed line C2) around the axis X1. When the working tool detection lever 45 rotates in the second direction (rearward), the latching portion 45d pushes the lock lever 43 rearward.

As a result, the other end side (the upper end side) of the lock lever 43 moves rearward (away from the bucket 12), and the holding of the lock lever 43 by the holding portion 44a is released.

When the holding of the lock lever 43 by the holding portion 44a is released, the lock lever 43 moves toward the second position by the pushing force of the pushing member 42, and the lock pin (the first lock pin 41L and the second lock pin 41R) is the attaching position.

As a result, as shown in FIG. 21, the bucket 12 is attached to the attachment body 11, and the attached state is established.

In the process of shifting from the inserted state shown in FIG. 26 to the attached state shown in FIG. 21, the lock lever 43 pivots toward the second position. Due to the swing of the lock lever 43, one end side (the lower end side) of the lock lever 43 moves to the left.

As a result, the stopper portion 43g hits against the right surface (the other surface in the machine width direction) of the second engaging portion 40L2 (see FIG. 17 and FIG. 21), and the swinging of the lock lever 43 stops. That is, the end position of the swinging movement of the lock lever 43 is restricted.

In other words, when the lock lever 43 rocks toward the second position, the stopper portion 43g restricts the end position of the swinging.

The end position of the swinging when the lock lever 43 rocks toward the second position by the stopper portion 43g is restricted so that the lock lever 43 is prevented from excessively moving beyond the intended range.

Thereby, for example, it is possible to prevent occurrence of troubles such as breakage of the connecting portion 68 between the first lock pin 51R and the connecting member 56 hitting the second engaging portion 40R1 due to excessive movement of the first lock pin 41R.

The front loader 8 of the embodiment (the first embodiment, the second embodiment) can be expressed as follows, for example.

The front loader 8 includes the working tool 12, the attachment body 11 to which the working tool 12 is attached, the lock pin 41 for attaching and fixing the working tool 12 to the attachment body 11, and the lock lever 43 configured to switch the lock pin 41 between the releasing position and the attached position, the holding function of holding the lock lever 43 at the releasing position, and a latching portion 45d having two functions of moving the lock lever 43 to the attaching position.

That is, as shown in FIG. 3, the working tool 12 is attached to the attachment body 11. The lock pin 41 moves from the releasing position (see FIG. 8) to the attachment position (see FIG. 5), thereby attaching and fixing the working tool 12 to the attachment body 11.

By moving (swinging) the lock lever 43 to the first position shown in FIG. 8 and the second position shown in FIG. 5, the lock pin 41 can be switched between the releasing position and the attaching position. As shown in FIG. 12, the latching portion 45d of the working tool detection lever 45 has a holding function for latching and holding the lock lever 43 at the releasing position (the first position where the lock pin 41 is the releasing position).

Further, the latching portion 45d has a function to release the holding of thee lock lever 43 by the holding portion 44a by moving to backward with the rotation of the pressure-receiving portion 45c rearward from the position shown in FIG. 13 behind the pressure-receiving portion 45c (in the direction indicated by the arrowed line C2).

Meanwhile, "to change the lock lever 43 to the attachment position" specifically means "to move the lock lever 43 to the attachment position by the pushing force of the pushing member 42". Specifically, since the lock pin 41 is urged toward the attachment position by the pushing member 42, the latching portion 45d releases the holding of the lock lever 43, so that the lock lever 43 can be attached to the pushing member 42, and moves to the attachment position (the second position where the lock pin 41 is set as the attachment position) by the force.

As described above, the front loader 8 has the latching portion 45d having the two functions of the holding function of holding the lock lever 43 at the releasing position and the function of changing the lock lever 43 to the attachment position. Thus, it is possible to realize two functions of holding the lock lever 43 by the releasing position and changing to the attaching position in a simple configuration (with the small number of parts).

Further, the front loader 8 of the above embodiment can also be expressed as follows.

The front loader 8 includes the working tool 12 and the attachment body 11 to which the working tool 12 is attached, and includes the lock pin 41 configured to attach and fix the working tool 12 to the attachment body 11, a lock lever 43 configured to move the lock pin 41 between the releasing position and the attaching position and to be held at the releasing position, and the working tool detection lever 45 that releases the holding of the lock lever 43 in attaching the working tool 12.

That is, as shown in FIG. 3, the working tool 12 is mounted on the attachment body 11. By moving the lock pin 41 from the releasing position (see FIG. 8) to the attachment position (see FIG. 5), the working tool 12 can be attached and fixed to the attachment body 11. By moving (swinging) the lock lever 43 to the first position shown in FIG. 8 and the second position shown in FIG. 5, the lock pin 41 can be switched between the releasing position and the attaching position.

Further, as shown in FIG. 13, the lock lever 43 is held by the holding portion 44a at the releasing position (the first position where the lock pin 41 is the releasing position). In the working tool 12 is mounted (when it is shifted from the detached state of the working tool 12 (the left figure of FIG. 15) to the inserted state (the right figure of FIG. 15)), the working tool detection lever 45 releases the holding of the lock lever 43 (the holding by the holding portion 44a) by moving backward in accordance with the backward rotation of the pressure receiving portion 45c (in the direction indicated by the arrowed line C2).

As described above, when the working tool 12 is attached to the attachment body 11, the working tool detection lever 45 releases the holding of the lock lever 43 at the releasing position, whereby the working tool 12 is locked. That is, the working tool detection lever 45 detects the attachment of the working tool 12 to the attachment body 11, and the working tool 12 can be automatically brought into the locked state.

FIG. 28 to FIG. 38 are diagrams showing a third embodiment of the front loader 8.

The third embodiment will be described focusing on configurations different from those of the first embodiment and the second embodiment, and structures common to the first embodiment and the second embodiment will be denoted by the same reference numerals and description thereof will be omitted. The first position and the second position in the third embodiment are the same positions as the first position and the second position in the first embodiment, respectively. The first direction and the second direction in the third embodiment are the same as the first direction and the second direction in the first embodiment.

In the front loader 8 of the third embodiment, the configuration of the attachment body 11 is different from that of the first and second embodiments. Specifically, the configurations of the holding member 44 and the working tool detection lever 45 are different from those of the first and second embodiments.

As shown in FIG. 33 and the like, one end side of the holding member 44 is fixed to the second support plate 38. The holding member 44 is a bent plate-like member. The holding member 44 extends forward from the second support plate 38 and then bends and extends to the other (right side) in the machine width direction. The holding member 44 has the holding portion 44a on the other end side.

The holding portion 44a is a portion that can hold the lock lever 43 at the first position. The holding portion 44a is constituted of a protrusion protruding rearward (toward the lock lever 43 side), and the lock lever 43 can be hooked and held on the left side of the protrusion (see FIG. 32 and FIG. 35).

The lock lever 43 is urged in the direction toward the second position (see FIG. 30) by the pushing member 42, but the lock lever 43 can be held in the first position (see FIG. 32) by being held by the holding portion 44a.

As shown in FIG. 33, the working tool detection lever 45 is supported by the support shaft 66 that protrudes from the second support plate 38 in one direction (leftward) in the machine width direction. The working tool detection lever 45 has the cylindrical boss 67 and is rotatable about the axis X1 of the support shaft 66 when the boss 67 is externally fitted to the support shaft 66.

The working tool detection lever 45 is a direction of the arrowed line C1 which is one direction around the axis X1 (hereinafter referred to as a "first direction") and another direction around the axis X1 (hereinafter referred to as a "second direction"). The working tool detection lever 45 is rotatable in the direction of the arrow C2. In other words, the working tool detection lever 45 is rotatable in the first direction and in the second direction opposite to the first direction.

As shown in FIG. 33, the working tool detection lever 45 has the first portion 45a and the second portion 45b. The first portion 45a is disposed below the support shaft 66, and the second portion 45b is disposed above the support shaft 66. The first portion 45a extends downward from the support shaft 66, then bends and extends leftward.

The first portion 45a has a pressure receiving portion 45c. The pressure receiving portion 45c is a portion (the lower end portion) extending to the left of the first portion 45a. The pressure receiving portion 45c is a portion that receives a pressing force from the bucket 12 when the bucket 12 is mounted. The second portion 45b extends above the support shaft 66 and then bends and extends rightward. The second portion 45b has a latching portion 45d.

The locking portion 45d is provided in a portion extending rightward of the second portion 45b. The latching portion 45d is constituted of a protrusion projecting rearward (toward the lock lever 43 side), and is possible to lock the lock lever 43 at the first position on the left side of the protrusion (see FIG. 32 and FIG. 35).

In the present embodiment, the working tool detection lever 45 is a plate-like member, and the first portion 45a and the second portion 45b are formed by bending one sheet material, but the working tool detection lever 45 is not limited to that configuration.

For example, the working tool detection lever 45 may be formed as a bar-like member, and the first portion 45a and the second portion 45b may be formed by bending a single bar. In addition, the first portion 45a and the second portion 45b may be formed as separate members.

As shown in FIG. 33, the pressure-receiving portion 45c is disposed below the support shaft 66, and the latching portion 45d is disposed above the support shaft 66. As a result, when the working tool detection lever 45 rotates about the axis X1 of the support shaft 66, the pressure receiving portion 45c and the latching portion 45d move in opposite directions.

Specifically, when the working tool detection lever 45 is rotated in the first direction (the direction indicated by the arrowed line C1), the pressure receiving portion 45c moves forward (in a direction approaching the bucket 12) and the stopper 45d moves rearward (in the direction separating from the bucket 12).

When the working tool detection lever 45 rotates in the second direction (the direction indicated by the arrowed line C2), the pressure receiving portion 45c moves rearward (in a direction away from the bucket 12), and the latching portion 45d moves forward (in the direction approaching the bucket 12).

The latching portion 45d is disposed on the right side of the holding portion 44a. Thus, in the state (see FIG. 35) held by the holding portion 44a, the other end portion (the upper end portion) of the lock lever 43 is located on the left side of the state (see FIG. 36) engaged with the latching portion 45d.

Hereinafter, the action (operation) of the locking mechanism in the front loader 8 of the third embodiment will be described. The process of shifting from the detached state to the inserted state, which will be described below, is referred to as "in attaching", and the process of shifting from the released state to the disengaged state is referred to as "in detaching".

<Attached State of Bucket (Working Tool)>

FIG. 28 to FIG. 31 and FIG. 34 show a state in which the bucket 12 is attached to the attachment body 11 (hereinafter referred to as "attached state"). In the attached state, the hooking portions 22L and 22R of the bucket 12 are hooked on the upper rod 31 of the attachment body 11. Further, the first lock pin 41L is engaged with the first engaging portion 23L of the bucket 12 and the second engaging portion 40L of the attachment body 11.

The second lock pin 41R is engaged with the first engaging portion 23R of the bucket 12 and the second engaging portion 40R of the attachment body 11. That is, the lock pins (the first lock pin 41L and the second lock pin 41R) are in the attaching position.

Further, the first lock pin 41L and the second lock pin 41R are urged toward the attachment position by the pushing member 42. As a result, the locking mechanism is in a state (a locking state) in which the bucket 12 is attached to the attachment body 11.

Since the first lock pin 41L is in the attaching position, the lock lever 43 connected to the first lock pin 41L is in the second position. That is, the other end side (the upper end side) of the lock lever 43 is positioned on the right side, and the one end side (the lower end side) is positioned on the left side.

The working tool detection lever 45 is in a position where the pressure receiving portion 45c is in contact with the first engaging portion 23L of the bucket 12 and is pushed by the first engaging portion 23L and rotated in the second direction (rearward). Thus, the pressure-receiving portion 45c is positioned on the rear side (the side away from the bucket 12), and the latching portion 45d is positioned on the front side (the side close to the bucket 12).

The latching portion 45d is located forward of the lock lever 43, is not in contact with the lock lever 43, and does not lock the lock lever 43.

<Unlocked State>

In order to release the lock from the attached state in which the locking mechanism is in the locked state, the operator manually pivots the lock lever 43, moves the other end side (the upper end side) of the lock lever 43 to the left, and moves one end side (the lower end side) to the right side. Then, the other end side of the lock lever 43 is hooked and held by the holding part 44a of the holding member 44.

As a result, the locking mechanism is unlocked (hereinafter referred to as a "released state").

FIG. 32 and FIG. 35 show the released state. In the released state, the first lock pin 41L is disengaged from the first engaging portion 23L of the bucket 12 and the second engaging portion 40L of the attachment body 11. The second lock pin 41R is disengaged from the first engaging portion 23R of the bucket 12 and the second engaging portion 40R of the attachment body 11.

That is, the lock pins (the first lock pin 41L and the second lock pin 41R) are in the releasing position. Thus, the bucket 12 can be detached from the attachment body 11.

The lock lever 43 is in the first position and is held in the first position by the holding member 44. Here, since the lock lever 43 is pressed by the pressing force of the first pressing member 55 and the second pressing member 59 in a direction approaching the holding member 44, the holding by the holding member 44 is reliably performed.

Since the state where the pressure receiving portion 45c is in contact with the first engaging portion 23L of the bucket 12 is maintained, the working tool detection lever 45 is at the same position as the attached state and is not in contact with the lock lever 43.

<Disengaged State of Bucket (Working Tool)>

Figure 36:
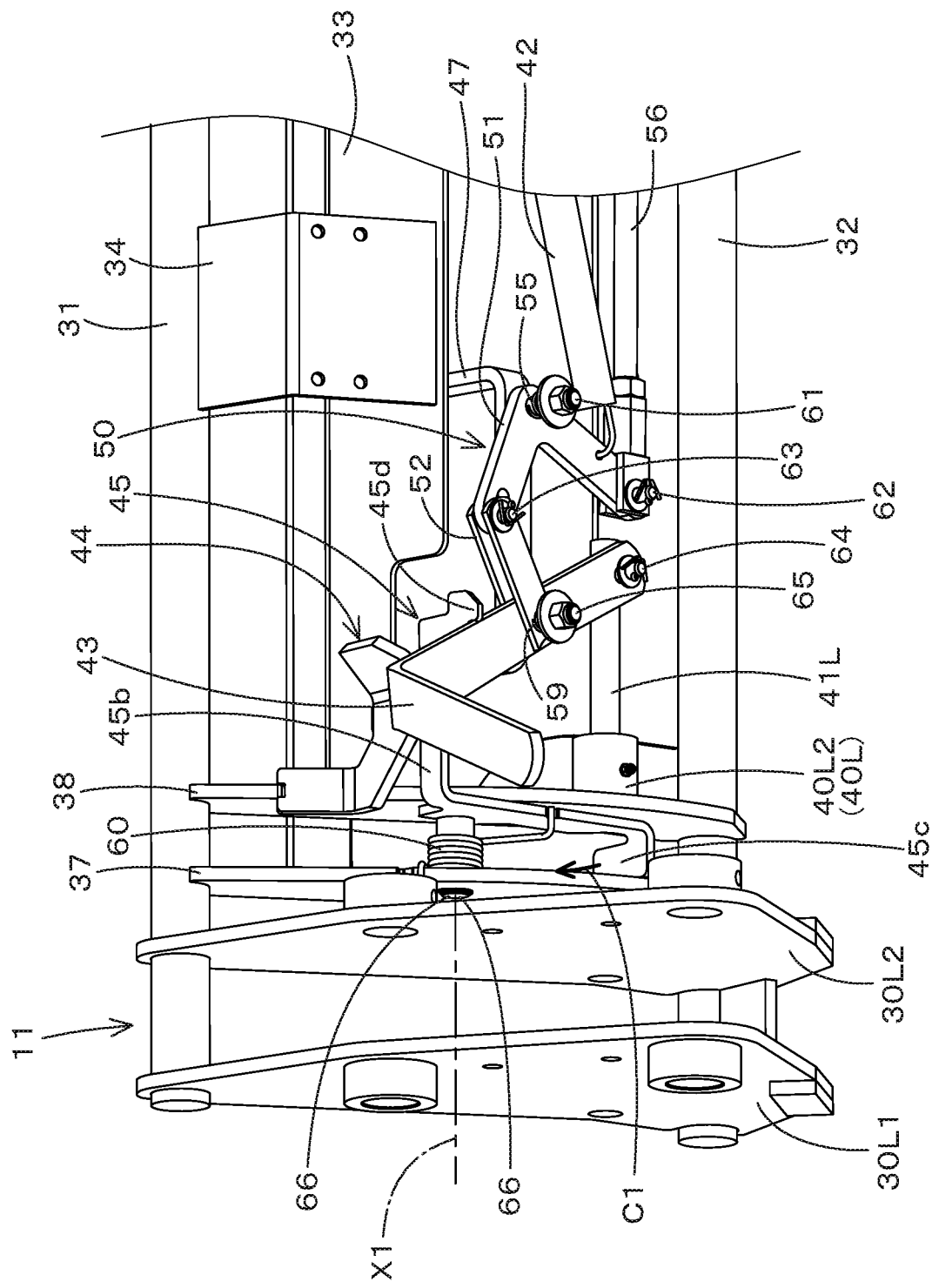
FIG. 36 is a back surface perspective view illustrating a state (a detaching state) where the working tool is detached from the attachment body according to the third embodiment.

FIG. 36 shows a state (hereinafter referred to as a "disengaged state") in which the bucket 12 is detached from the attachment body 11. When the bucket 12 is detached from the attachment body 11, the second engaging portion 40L of the bucket 12 separates from the pressure receiving portion 45c of the working tool detection lever 45.

Thus, the pressure receiving portion 45c is in a state not receiving the pressing force from the bucket 12, and rotates forward in the first direction (the direction indicated by the arrowed line C1) around the axis center X1 by the pushing force of the rotary pushing member 60. Along with this, the second portion 45b of the working tool detection lever 45 moves rearward and pushes the lock lever 43 rearward.

By being pushed by the second portion 45b, the lock lever 43 swings backward (in the direction indicated by the arrowed line B1 in FIG. 9) about the fifth shaft 65 as a fulcrum. That is, when the working tool detection lever 45 rotates in the first direction, the working tool detection lever 45 swings the lock lever 43 rearward against the pressing force of the first pressing member 55 and the second pressing member 59.

When the lock lever 43 swings rearward, the other end portion (the upper end portion) separates from the holding member 44. As a result, the lock lever 43 is disengaged from the holding by the holding portion 44a, and is locked to the latching portion 45d of the working tool detection lever 45.

That is, when the bucket 12 is detached from the attachment body 11, the working tool detection lever 45 rotates in the first direction, and the working tool detection lever 45 releases the holding of the lock lever 43 with respect to the holding portion 44a from the state where the lock lever 43 is held by the holding portion 44a at the first position, and the lock lever 43 released from the holding is latched by the latching portion 45d.

Here, since the lock lever 43 is pressed forward by the pressing force of the first pressing member 55 and the second pressing member 59 in a direction approaching the holding member 44, the locking by the latching portion 45d is performed reliably.

As described above, the lock lever 43 is disengaged by the holding portion 44a from the holding due to the rotation of the working tool detection lever 45 in the first direction, but the lock lever 43 stays at the first position by being engaged with the latching portion 45d of the working tool detection lever 45.

In other words, the lock lever 43 is pushed by the working tool detection lever 45 and moves from the holding portion 44a of the holding member 44 to the latching portion 45d of the work tool detecting lever 45, but stays at the first position and does not move to the second position.

The lock lever 43 is positioned on the first position (the other end side (the upper end side) is on the left side and the one end side (the lower end side) is on the right side) in both of the latched state by the latching portion 45d and the held state by the holding portion 44a). However, the other end side (the upper end side) is located forward than that of the holding state (see FIG. 35) by the holding portion 44a in the latched state (see FIG. 36) by the latching portion 45d.

<Inserted State of Bucket (Working Tool)>

Figure 37:
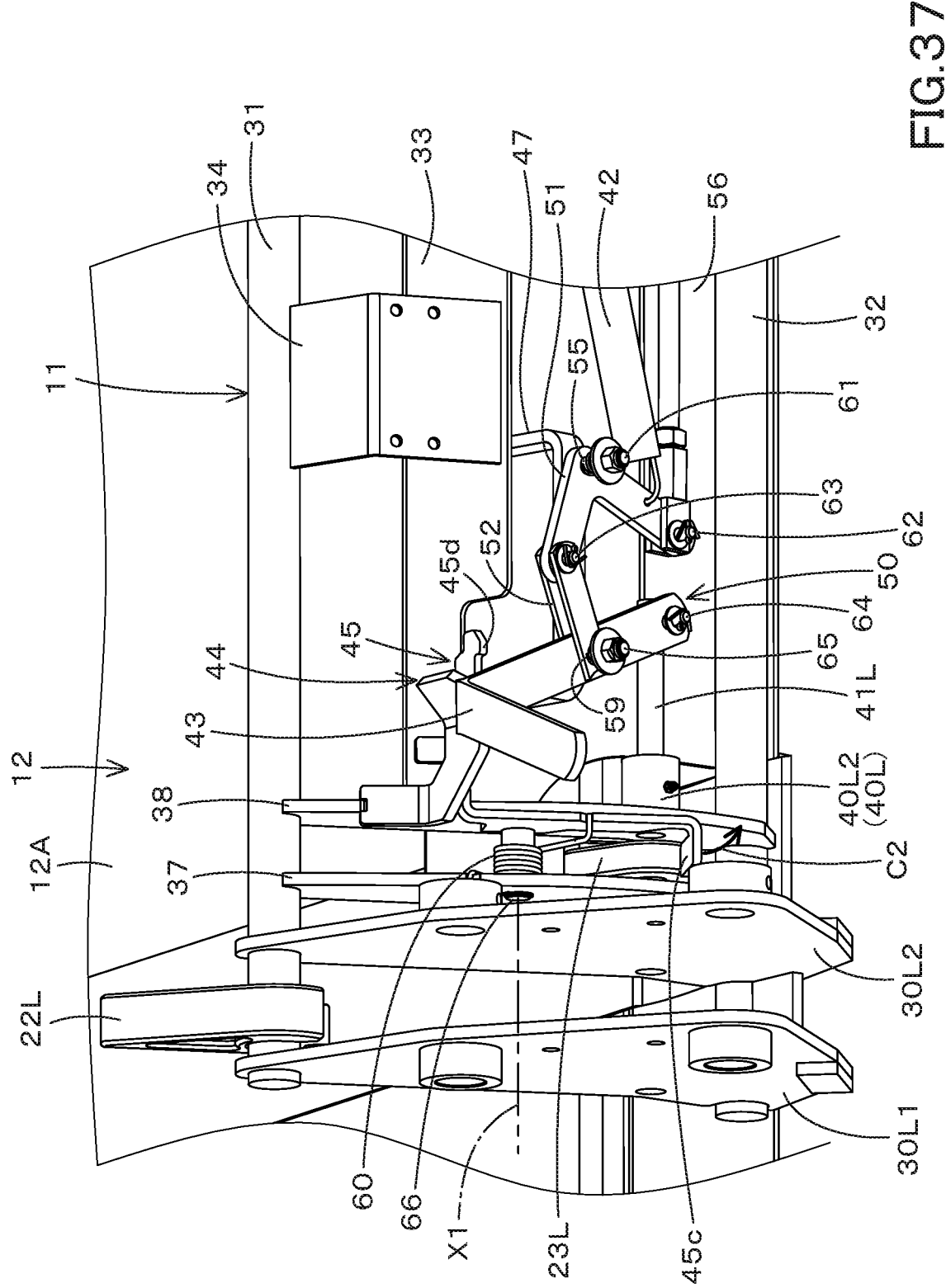
FIG. 37 is a back surface perspective view illustrating a state (an inserting state) where the working tool is inserted into the attachment body according to the third embodiment.
Figure 38:
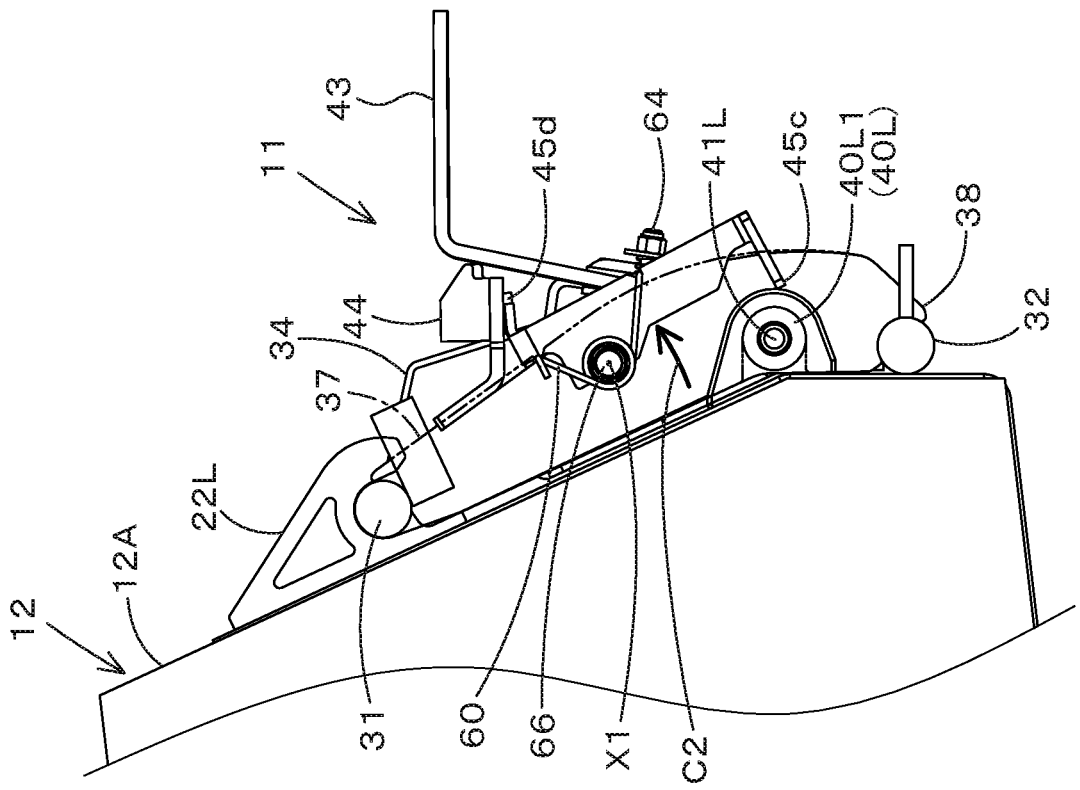
FIG. 38 is a side view illustrating the detaching state (a left drawing) and the inserting state (a right drawing) of the working tool according to the embodiment.
Figure 38:
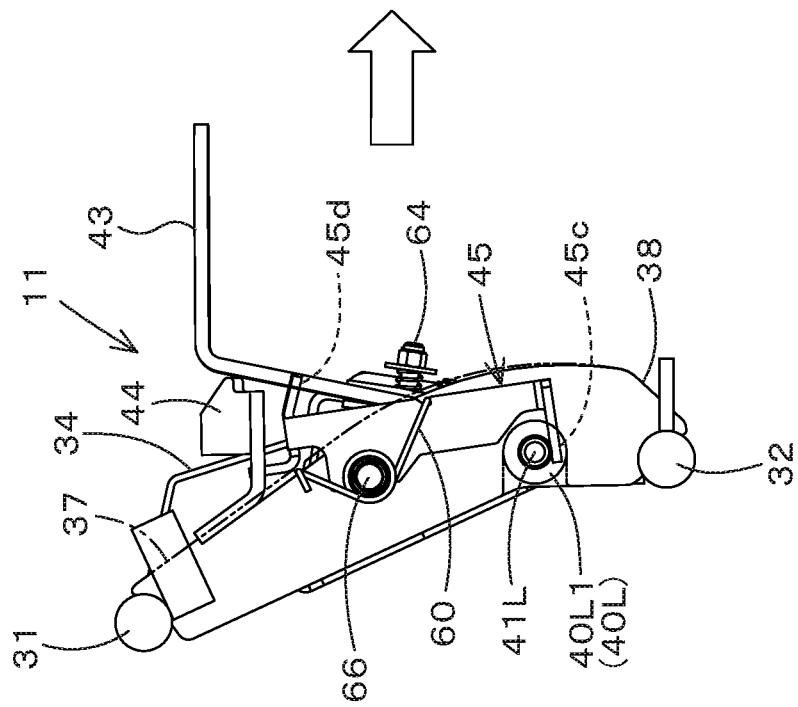

FIG. 37 shows a state in which the bucket 12 is inserted into the attachment body 11 (hereinafter referred to as an "inserted state"). FIG. 38 shows the detached state (the left drawing) and the inserted state (the right drawing) of the bucket 12. The inserted state is a state before the attachment state, in which the bucket 12 is in the same position as the attachment state but the locking by the locking mechanism is released.

When the bucket 12 is inserted into the attachment body 11, the pressure receiving portion 45c of the working tool detection lever 45 receives a pressing force from the first engaging portion 23L of the bucket 12. As a result, the working tool detection lever 45 rotates in the second direction (the direction indicated by the arrowed line C2) around the axis X1 against the pushing force of the rotary pushing member 60.

When the working tool detection lever 45 rotates in the second direction (rearward), the working tool detection lever 45 separates from the lock lever 43. Thus, the latching of the lock lever 43 by the latching portion 45d is released.

When the latching of the lock lever 43 by the latching portion 45d is released, the lock lever 43 is moved to the second position by the pushing force of the pushing member 42, and the lock pin (the first lock pin 41L and the second lock pin 41R) is located at the attachment position.

As a result, the locking mechanism is in the locked state, and the bucket 12 is attached to the attachment body 11 to be in the attached state.

The front loader 8 of the above embodiment can be expressed as follows, for example.

The front loader 8 includes the working tool 12, the attachment body 11 to which the working tool 12 is attached, the lock pin 41 configured to attach and fix the working tool 12 to the attachment body 11, the lock lever 43 configured to move the lock pin 41 between the releasing position and the attaching position, the holding mechanism configured to old the lock lever 43 at the releasing position, and the latching portion having two mechanisms to move the lock lever 43 to the attaching position.

That is, as shown in FIG. 28, the working tool 12 is mounted on the attachment body 11. By moving the lock pin 41 from the releasing position (see FIG. 32) to the attachment position (see FIG. 30), the working tool 12 is attached and fixed to the attachment body 11.

By moving (swinging) the lock lever 43 to the first position shown in FIG. 32 and to the second position shown in FIG. 30, the lock pin 41 can be switched between the releasing position and the attaching position. As shown in FIG. 36, the latching portion 45d of the working tool detection lever 45 has a holding function of locking and holding the lock lever 43 at the releasing position (the first position where the lock pin 41 is the releasing position).

Further, the latching portion 45d further includes a function to move forward from the position shown in FIG. 36 in accordance with the rotation rearward (in the direction indicated by the arrowed line C2) of the pressure receiving portion 45c, thereby releasing the latching of the lock lever 43 and moving the lock lever 43 to the attaching position (the second position where the lock pin 41 is set to the attaching position).

Meanwhile, "to change the lock lever 43 to the attachment position" specifically means "to move the lock lever 43 to the attachment position by the pushing force of the pushing member 42". Specifically, since the lock pin 41 is urged toward the attachment position by the pushing member 42, the latching portion 45d releases the holding of the lock lever 43, so that the lock lever 43 can be attached to the pushing member 42 and is moved to the attachment position (the second position where the lock pin 41 is set as the attachment position) by the force.

As described above, the front loader 8 has the latching portion 45d having the two functions of the holding function of holding the lock lever 43 at the releasing position and the function of changing the lock lever 43 to the attachment position, and thus it is possible to realize two functions of holding the lock lever 43 by the releasing position and changing to the attaching position in a simple configuration (with the small number of parts).

In addition, the front loader 8 of the above embodiment can also be expressed as follows.

The front loader 8 includes the working tool 12, the attachment body 11 to which the working tool 12 is attached, the lock pin 41 configured to attach and fix the working tool 12 to the attachment body 11, the lock lever 43 configured to move the lock pin 41 between the releasing position and the attaching position and is held at the released position, the working tool detection lever 45 configured to release the holding of the lock lever 43 in the attachment of the working tool.

That is, as shown in FIG. 28, the working tool 12 is mounted on the attachment body 11. By moving the lock pin 41 from the releasing position (see FIG. 32) to the attachment position (see FIG. 30), the working tool 12 can be attached and fixed to the attachment body 11.

By moving (swinging) the lock lever 43 to the first position shown in FIG. 32 and to the second position shown in FIG. 30, the lock pin 41 can be switched between the releasing position and the attaching position. Further, as shown in FIG. 36, the lock lever 43 is locked and held by the latching portion 45d of the working tool detection lever 45 at the releasing position (the first position where the lock pin 41 is the releasing position).

When the lock lever 43 moves (swings) between the first position shown in FIG. 32 and the second position shown in FIG. 30, the lock lever 43 can switch the lock pin 41 between the releasing position and the attaching position. In addition, as shown in FIG. 36, the lock lever 43 is latched and held by the latching portion 45d of the working tool detection lever 45.

As described above, the front loader 8 releases the holding of the lock lever 43 at the releasing position of the lock lever 43 when the working tool 12 is attached to the attachment body 11, whereby the working tool 12 is locked. That is, the working tool detection lever 45 detects the attachment of the working tool 12 to the attachment body 11, and the working tool 12 can be automatically brought into the locked state.

The front loader 8 and the working machine 1 of the above embodiment have the following effects.

The front loader 8 and the working tool 1 of the first and second embodiments have the following effects.

The front loader 8 includes the working tool (bucket) 12 having the first engaging portions 23L and 23R, and the attachment body 11 to which the working tool 12 is attached, including the second engaging portions 40L1, 40L2, 40R1, and 40R2 and including the lock pin 41 configured to move between the attaching position of being engaged to the first engaging portions 23L and 23R and the second engaging portions 40L1, 40L2, 40R1, and 40R2 and the releasing position of separating from the first engaging portions 23L and 23R and the second engaging portions 40L1, and 40R2, the pushing member 42 to push the lock pin 41 toward the attaching position, the lock lever connected to the lock pin 41 and configured to swing the lock pin between the releasing position and the attaching position, the holding member 44 having the holding portion 44a to hold the lock lever 43 at the first position, and the working tool detection lever 45 including the latching portion 45d configured to latch the lock lever 43 at the first position and to be turned in the first direction in the disengaging of the working tool, thus the working tool detection lever 45 releases the latching of the lock lever 43 to the latching portion 45d from a state where the lock lever 43 is latched to the latching portion 45d at the first position, and allows the holding portion 44a of the holding member 44 to hold the lock lever 43 released from the latching.

According to this configuration, when the working tool 12 is detached from the attachment body 11, the working tool detection lever 45 rotates in the first direction and the lock lever 43 moves to the first position. The engagement of the lock lever 43 with respect to the latching portion 45d can be released from the state of being engaged with the latching portion 45d and the lock lever 43 from which the lock is released is held by the holding portion 44a of the holding member 44.

Thus, the lock lever 43 can be held at the first position, which is the position in the released state, by the holding portion 44a.

Further, when the working tool 12 is attached, the working tool detection lever 45 rotates in a second direction opposite to the first direction to release the holding of the lock lever 43 by the holding portion 44a.

According to this configuration, when the working tool 12 is attached, the working tool detection lever 45 releases the holding of the lock lever 43 by the holding portion 44a, whereby the lock pin 41 is moved to the attachment position by the pushing force of the pushing member 42 and the lock lever 43 is moved to the second position, and the locked state in which the working tool 12 is attached to the attachment body 11 can be achieved.

In other words, it is possible to obtain the locked state by detecting the attachment operation of the working tool 12 to the attachment body 11.

Further, when the working tool detection lever 45 rotates in the second direction, the work lever detection lever 45 pushes the lock lever 43 to release the lock of the lock lever 43 by the latching portion 45d.

According to this configuration, when the working tool 12 is mounted, the working tool detecting lever 45 pushes the lock lever 43 to rotate in the second direction, thereby releasing the lock of the lock lever 43 by the latching portion 45d.

Further, the lock lever 43 is provided with a support mechanism that swingably supports the lock lever 43 in a third direction approaching the holding member 44 and a fourth direction away from the holding member 44. The support mechanism has a pressing member (first pressing member 55 and a second pressing member 59) for pressing the lock lever 43 in the third direction. When the working tool detection lever 45 rotates in the first direction, the work lever detection lever 45 pivots the lock lever 43 against the pressing force of the pressing members 55 and 59 to be detached from the holding portion 44*a*.

According to this configuration, the lock lever 43 can be reliably held by the holding portion 44*a* of the holding member 44 by the pressing force of the pressing members 55 and 59. Further, when the working tool 12 is disengaged, the work lever detection lever 45 rotates in the first direction, whereby the lock lever 43 can be detached from the holding portion 44*a*.

The front loader 8 includes the supporting shaft 66 rotatably supporting the working tool detection lever 45, and the rotationally-pushing member 60 configured to provide a pushing force to the working tool detection lever 45, the pushing force rotating the working tool detection lever 45 in the first direction that is one direction around an axis of the supporting shaft 66. The working tool detection lever 45 has the pressure receiving portion 45*c* configured to be turned in the first direction by the pushing force of the rotationally-pushing member 60 in the disengaging of the working tool 12 and to be turned in the second direction that is the other direction around an axis against the pushing force of the rotationally-pushing member 60 by a pushing force from the working tool 12 in the attaching of the working tool 12. The latching portion 45*d* disengages the lock lever 43 from the latching portion 45*d* in accordance with the turning of the pressure-receiving portion 60 in the first direction and releases the holding of the lock lever 43 caused by the holding portion 44*a* in accordance with the turning of the pressure-receiving portion 60 in the second direction.

According to this configuration, at the time of attachment and detachment of the working tool 12, the rotation direction of the working tool detection lever 45 can be switched so that the lock lever 43 is latched by the latching portion 45*d* and the lock lever 43 or held by the holding portion 44.

Also, when the working tool detection lever 45 rotates in the second direction, the pressure receiving portion 45*c* and the latching portion 45*d* move in a direction away from the working tool 12.

According to this configuration, by rotating the latching portion 45*d* of the working tool detection lever 45 and the pressure receiving portion 45*c* in the same direction, it is possible to exert action from the working tool detection lever 45 on the lock lever 43.

Further, the lock lever 43 has a cutout portion 43*d* with which the latching portion 45*d* abuts when the lock lever 43 is in the first position. The cutout portion 43*d* has a first edge portion 43*d*1 that guides the latching portion 45*d* in a direction in which the lock lever 43 in the first position is not pushed when the working tool detection lever 45 rotates in the first direction.

According to this configuration, when the working tool detection lever 45 is rotated in the first direction by the detachment of the working tool 12, the lock lever 45 is pushed and swung by the latching portion 45*d*, whereby the lock lever 45 is possible to prevent the connected lock pins 41L and 41R from moving to unintended positions.

Specifically, it is possible to prevent the lock pins 41L and 41R from being disengaged from the second engaging portions 40L2 and 40R1 when the working tool detection lever 45 is rotated in the first direction by the detachment of the working tool 12.

In addition, the lock lever 45 has a stopper portion 43*g* that regulates the end position of the swinging when it swings toward the second position.

According to this configuration, since the end position of the swinging when the lock lever 43 swings toward the second position by the stopper portion 43*g* is regulated, the lock lever 43 can be prevented from excessively moving beyond the intended range.

Thereby, for example, it is possible to prevent occurrence of troubles such as breakage of the connecting portion 68 between the first lock pin 41R and the connecting member 56 by hitting the second engaging portion 40R1.

In addition, the holding member 44 and the working tool detection lever 45 intersect each other at the midway portion without contacting to each other.

According to this configuration, it is possible to arrange the holding member 44 and the working tool detection lever 45 in a small space by approaching each other without interfering with each other.

The front loader 8 and the working machine 1 of the third embodiment have the following effects.

The front loader 8 includes the working tool (the bucket) 12 having the first engaging portions 23L and 23R, and the attachment body 11 to which the working tool 12 is attached, including the second engaging portions 40L1, 40L2, 40R1, and 40R2 and including the lock pin 41 configured to move between the attaching position to be engaged to the first engaging portion and the second engaging portion and the releasing position to be disengaged from the first engaging portion and the second engaging portion, the pushing member configured to push the lock pin 41 toward the attaching position, the lock lever 43 coupled to the lock pin 41 and configured to be swung between the first position to set the lock pin 41 at the releasing position and the second position to set the lock pin 41 at the attaching position, the holding member including a holding portion 44*a* configured to hold the lock lever 43 at the first position, and the working tool detection lever 45 is a lever to be turned in the first direction in the disengaging of the working tool 12 and to release the lock lever 43 held by the holding portion 44*a* from the state where the lock lever 43 is held at the first position by the holding portion 44*a* and including the latching portion 45*d* configured to latch the lock lever 43 released from the holding.

According to this configuration, when the working tool 12 is detached from the attachment body 11, the working tool detection lever 45 rotates in the first direction and the lock lever 43 moves to the first position. The holding of the lock lever 43 with respect to the holding portion 44*a* can be released from the state held by the holding portion 44*a*, and the lock lever 43 released from the holding is can be locked by the latching portion 45*d*.

As a result, the lock lever 43 can be held at the first position, which is the position in the unlocked state, by the latching portion 45*d*.

When the working tool 12 is attached, the working tool detection lever 45 rotates in a second direction opposite to the first direction to release the engagement of the lock lever 43 by the latching portion 45*d*.

According to this configuration, when the working tool 12 is attached, the working tool detection lever 45 releases the engagement of the lock lever 43 by the latching portion 45*d*, whereby the lock pin 41 is moved by the pushing force of the pushing member 42 to the attaching position and the lock lever 43 is moved to the second position. In this manner, the locked state where the working tool 12 is attached to the attachment body 11 can be achieved.

In other words, it is possible to obtain the locked state by detecting the attachment operation of the working tool 12 to the attachment body 11.

When the working tool detection lever 45 rotates in the second direction, the working tool detection lever 45 separates from the lock lever 43 and releases the lock of the lock lever 43 by the latching portion 45*d*.

According to this configuration, when the working tool 12 is attached, the working tool detection lever 45 rotates in the second direction and moves away from the lock lever 42, whereby the locking of the lock lever 43 by the latching portion 45*d* can be released.

Further, the lock lever 43 is provided with a support mechanism that swingably supports the lock lever 43 in a third direction approaching the holding member 44 and a fourth direction away from the holding member 44. The support mechanism has a pressing member (the first pressing member 55 and the second pressing member 59) for pressing the lock lever 43 in the third direction. When the working tool detection lever 45 rotates in the first direction, the work lever detection lever 45 pivots the lock lever 43 against the pressing force of the pressing members 55 and 59 to be detached from the holding portion 44*a*.

According to this configuration, the lock lever 43 can be reliably held by the holding portion 44*a* of the holding member 44 by the pressing force of the pressing members 55 and 59.

Further, when the working tool 12 is disengaged, the work lever detection lever 45 rotates in the first direction, whereby the lock lever 43 can be detached from the holding portion 44*a*.

The front loader 8 includes the supporting shaft 66 rotatably supporting the working tool detection lever 45, and the rotationally-pushing member 60 configured to provide the pushing force to the working tool detection lever 45, the pushing force rotating the working tool detection lever 45 in the first direction that is one direction around an axis of the supporting shaft 66. The working tool detection lever 45 has the pressure receiving portion 45*c* configured to be turned in the first direction by the pushing force of the rotationally-pushing member 60 in the disengaging of the working tool 12 and to be turned in the second direction that is the other direction around an axis against the pushing force of the rotationally-pushing member 60 by the pushing force from the working tool 12 in the attaching of the working tool 12. The latching portion 45*d* latches the lock lever 43 in accordance with the turning of the pressure-receiving portion 45*c* in the first direction and releases the latching of the lock lever 43 in accordance with the turning of the pressure-receiving portion 45*c* in the second direction.

According to this configuration, at the time of attaching and detaching the working tool 12, the rotation direction of the working tool detection lever 45 is switched so that the locking of the lock lever 43 by the latching portion 45*d* and the release of the locking of the lock lever 43 can be switched.

Further, when the working tool detection lever 45 rotates in the second direction, the pressure receiving portion 45*c* moves in a direction away from the working tool 12, and the latching portion 45*d* moves in the direction approaching the working tool 12.

According to this configuration, by rotating the latching portion 45*d* of the working tool detection lever 45 in the direction opposite to the pressure receiving portion 45*c*, it is possible to exert action from the working tool detection lever 45 on the lock lever 43.

Further, the working machine 1 of the above embodiment includes the front loader 8 according to any one of the first to third embodiments, and the vehicle body 2 supporting the front loader 8. Thus, the front loader 8 included in the working machine 1 is a front loader having the locking mechanism capable of obtaining the locked state by detecting the attachment operation of the working tool 12 to the attachment body 11.

In the above description, the embodiment of the present invention has been explained. However, all the features of the embodiment disclosed in this application should be considered just as examples, and the embodiment does not restrict the present invention accordingly. A scope of the present invention is shown not in the above-described embodiment but in claims, and is intended to include all modifications within and equivalent to a scope of the claims.

What is claimed is:

1. A front loader comprising:
a working tool having a first engaging portion; and
an attachment body to which the working tool is attached, having a second engaging portion,
the attachment body comprising:
a lock pin configured to move between an attaching position to be engaged to the first engaging portion and the second engaging portion and a releasing position to be disengaged from the first engaging portion and the second engaging portion;
a biasing member configured to bias the lock pin toward the attaching position;
a lock lever coupled to the lock pin and configured to be swung between a first position to set the lock pin at the releasing position and a second position to set the lock pin at the attaching position;
a holding member fixed to the attachment body, the holding member including a holding portion configured to hold the lock lever at the first position; and
a working tool detection lever including a latching portion configured to latch the lock lever at the first position,
wherein the working tool detection lever is turned in a first direction when the working tool is disengaged from the attachment body so that the lock lever latched by the latching portion at the first position is released from the latching portion, and then held by the holding portion of the holding member.

2. The front loader according to claim 1,
wherein the working tool detection lever is turned in a second direction opposite to the first direction when the working tool is attached to the attachment body, so that the lock lever is released from the holding portion.

3. The front loader according to claim 2,
wherein the working tool detection lever pushes the lock lever when being turned in the second direction, thereby to release the lock lever from the holding portion.

4. The front loader according to claim 1, further comprising a support mechanism configured to support the lock lever and to swing the lock lever in a third direction approaching the holding member and in a fourth direction separating from the holding member,
wherein the support mechanism has a pushing member configured to push the lock lever in the third direction, and
wherein the working tool detection lever swings the lock lever against a pushing force of the pushing member when being turned in the first direction, and is disengaged from the holding portion.

5. The front loader according to claim 1, comprising:
a supporting shaft rotatably supporting the working tool detection lever; and
a rotationally-pushing member configured to provide a pushing force to the working tool detection lever, the pushing force rotating the working tool detection lever in the first direction that is one direction around an axis of the supporting shaft, wherein the working tool detection lever has a pressure receiving portion configured to be turned in the first direction by the pushing force of the rotationally-pushing member in the disengaging of the working tool and to be turned in the second direction that is the other direction around the axis against the pushing force of the rotationally-pushing member by a pushing force from the working tool in the attaching of the working tool, and wherein the latching portion releases the lock lever from the latching portion in accordance with the turning of the pressure-receiving portion in the first direction and releases the lock lever from the holding portion in accordance with the turning of the pressure-receiving portion in the second direction.

6. The front loader according to claim 5, wherein the pressure receiving portion and the latching portion are separated from the working tool when the working tool detection lever is turned in the second direction.

7. The front loader according to claim 1, wherein the lock lever has a cutout portion to which the latching portion contacts when the lock lever is positioned at the first position, wherein the cutout portion has a first edge portion to guide the latching portion in a direction in which the lock lever positioned at the first position is free from being pushed when the working tool detection lever is turned in the first direction.

8. The front loader according to claim 1, wherein the lock lever has a stopper to define an end position of swinging of the lock lever in the swinging toward the second position of the lock lever.

9. The front loader according to claim 1, wherein the holding member and the working tool detection lever intersect each other without contacting at intermediate portions of the holding member and the working tool detection lever.

10. A working machine comprising:
the front loader according to claim 1; and
a vehicle body supporting the front loader.

11. A front loader comprising:
a working tool having a first engaging portion; and
an attachment body to which the working tool is attached, having a second engaging portion
the attachment body comprising:
a lock pin configured to move between an attaching position to be engaged to the first engaging portion and the second engaging portion and a releasing position to be disengaged from the first engaging portion and the second engaging portion;
a biasing member configured to bias the lock pin toward the attaching position;
a lock lever coupled to the lock pin and configured to be swung between a first position to set the lock pin at the releasing position and a second position to set the lock pin at the attaching position;
a holding member fixed to the attachment body, the holding member including a holding portion configured to hold the lock lever at the first position; and
a working tool detection lever including a latching portion configured to latch the lock lever at the first position,
wherein the working tool detection lever is turned in a first direction when the working tool is disengaged from the attachment body so that the lock lever held by the holding portion of the holding member at the first position is released from the holding portion, and then latched by the latching portion.

12. The front loader according to claim 11, wherein the working tool detection lever is turned in a second direction opposite to the first direction when the working tool is attached to the attachment body, so that the lock lever is released from the latching portion.

13. The front loader according to claim 12, wherein the working tool detection lever is separated from the lock lever when being turned in the second direction, thereby to release the lock lever from the latching portion.

14. The front loader according to claim 11, comprising a support mechanism configured to support the lock lever and to swing the lock lever in a third direction approaching the holding member and in a fourth direction separating from the holding member, wherein the support mechanism has a pushing member configured to push the lock lever in the third direction, and wherein the working tool detection lever swings the lock lever against a pushing force of the pushing member when being turned in the first direction, and is disengaged from the holding portion.

15. The front loader according to claim 11, comprising:
a supporting shaft rotatably supporting the working tool detection lever; and
a rotationally-pushing member configured to provide a pushing force to the working tool detection lever, the pushing force rotating the working tool detection lever in the first direction that is one direction around an axis of the supporting shaft, wherein the working tool detection lever has a pressure receiving portion configured to be turned in the first direction by the pushing force of the rotationally-pushing member in the disengaging of the working tool and to be turned in the second direction that is the other direction around an axis against the pushing force of the rotationally-pushing member by a pushing force from the working tool in the attaching of the working tool, and wherein the latching portion latches the lock lever in accordance with the turning of the pressure-receiving portion in the first direction and releases the latching of the lock lever in accordance with the turning of the pressure-receiving portion in the second direction.

16. The front loader according to claim 15, wherein the pressure receiving portion is separated from the working tool and the latching portion approaches the working tool when the working tool detection lever is turned in the second direction.

17. A working machine comprising:
the front loader according to claim 11; and
a vehicle body supporting the front loader.

18. An attachment arrangement for detachably attaching a working tool to a front loader, the working tool including a first engaging portion having a first through-hole,
the attachment arrangement comprising:
a second engaging portion having a second through-hole;
a lock pin for attaching the working tool to the attachment arrangement by inserting the lock pin through the first through-hole and the second through-hole, and for releasing the working tool from the attachment arrangement by removing the lock pin from the first through-hole and the second through-hole;

a lock lever that moves the lock pin for inserting the lock pin through the first through-hole and the second through-hole and for removing the lock pin therefrom;

a spring connected to the lock lever for biasing the lock pin to insert the lock pin through the first through-hole and the second through-hole;

a working tool detection lever configured to swing around an axis in a first direction when the working tool is disengaged away from the attachment arrangement, and in a second direction when the working tool is attached to the attachment arrangement, the working tool detection lever having a latching portion; and a holding member fixed to the attachment arrangement having a holding portion, wherein the lock lever is latched by the latching portion of the working tool detection lever when removing the lock pin from the first through-hole and the second through-hole, and held by the holding portion of the holding member after the working tool is disengaged away from the attachment arrangement in accordance with the working tool detection lever swinging in the first direction.

19. The attachment arrangement according to claim 18, wherein when the working tool is disengaged away from the attachment arrangement and is again attached to the attachment arrangement, the latching portion pushes the lock lever in accordance with the working tool detection lever swinging in the second direction, so that the lock pin is biased by the spring to be inserted through the first through-hole and second through-hole.

* * * * *